United States Patent [19]
Farinelli et al.

[11] Patent Number: 5,666,428
[45] Date of Patent: *Sep. 9, 1997

[54] AUDIO DISTRIBUTION SYSTEM

[75] Inventors: Robert Farinelli; Thomas Patrick Carrin, both of Lexington, Ky.; H. Richard McCollister, Lincoln, Nebr.; Jason K. Dunaway, Nashville, Tenn.

[73] Assignee: Elan Home Systems, L.L.C., Lexington, Ky.

[*] Notice: The term of this patent shall not extend beyond the expiration date of Pat. No. 5,131,048.

[21] Appl. No.: 253,833

[22] Filed: Jun. 3, 1994

Related U.S. Application Data

[63] Continuation of Ser. No. 956,901, Oct. 2, 1992, which is a continuation-in-part of Ser. No. 818,664, Jan. 9, 1992, Pat. No. 5,363,434, which is a continuation-in-part of Ser. No. 639,507, Jan. 9, 1991, Pat. No. 5,131,048.

[51] Int. Cl.⁶ .................................................. H04B 3/00
[52] U.S. Cl. ........................ 381/81; 379/159; 379/171; 379/102.02
[58] Field of Search .................................. 381/77, 80, 81; 379/105, 171, 202, 50, 87, 103, 221, 159, 167

[56] References Cited

U.S. PATENT DOCUMENTS

| | | | |
|---|---|---|---|
| 4,260,854 | 4/1981 | Kolodny | 381/81 |
| 4,338,493 | 7/1982 | Stenhuis et al. | 379/50 |
| 4,530,090 | 7/1985 | Priamo et al. | 370/58.3 |
| 4,538,031 | 8/1985 | Benning et al. | 379/103 |
| 4,554,411 | 11/1985 | Armstrong | 379/87 |
| 4,710,917 | 12/1987 | Tompicins et al. | 379/202 |
| 4,924,303 | 5/1990 | Brandon et al. | 379/105 |
| 4,941,187 | 7/1990 | Slater | 381/86 |
| 5,131,048 | 7/1992 | Farenelli et al. | 379/170 |
| 5,173,933 | 12/1992 | Jabs et al. | 379/221 |

*Primary Examiner*—Forester W. Isen
*Attorney, Agent, or Firm*—Merchant, Gould, Smith, Edell, Welter & Schmidt, P.A.

[57] ABSTRACT

A signal distribution and communication arrangement includes an electronic processor-based master control unit which controls the broadcast of different types of signals through speakers located in various zones. The system includes a telephone interfaced with a door speaker controller to allow communication between the telephone and a door speaker. A page may be broadcast over the speakers and subsequently muted to allow private communication when the page is answered. Also included is a doorbell interface circuit that responds to a doorbell source. The doorbell source may be activated by any one of a plurality of doorbell switches.

12 Claims, 53 Drawing Sheets

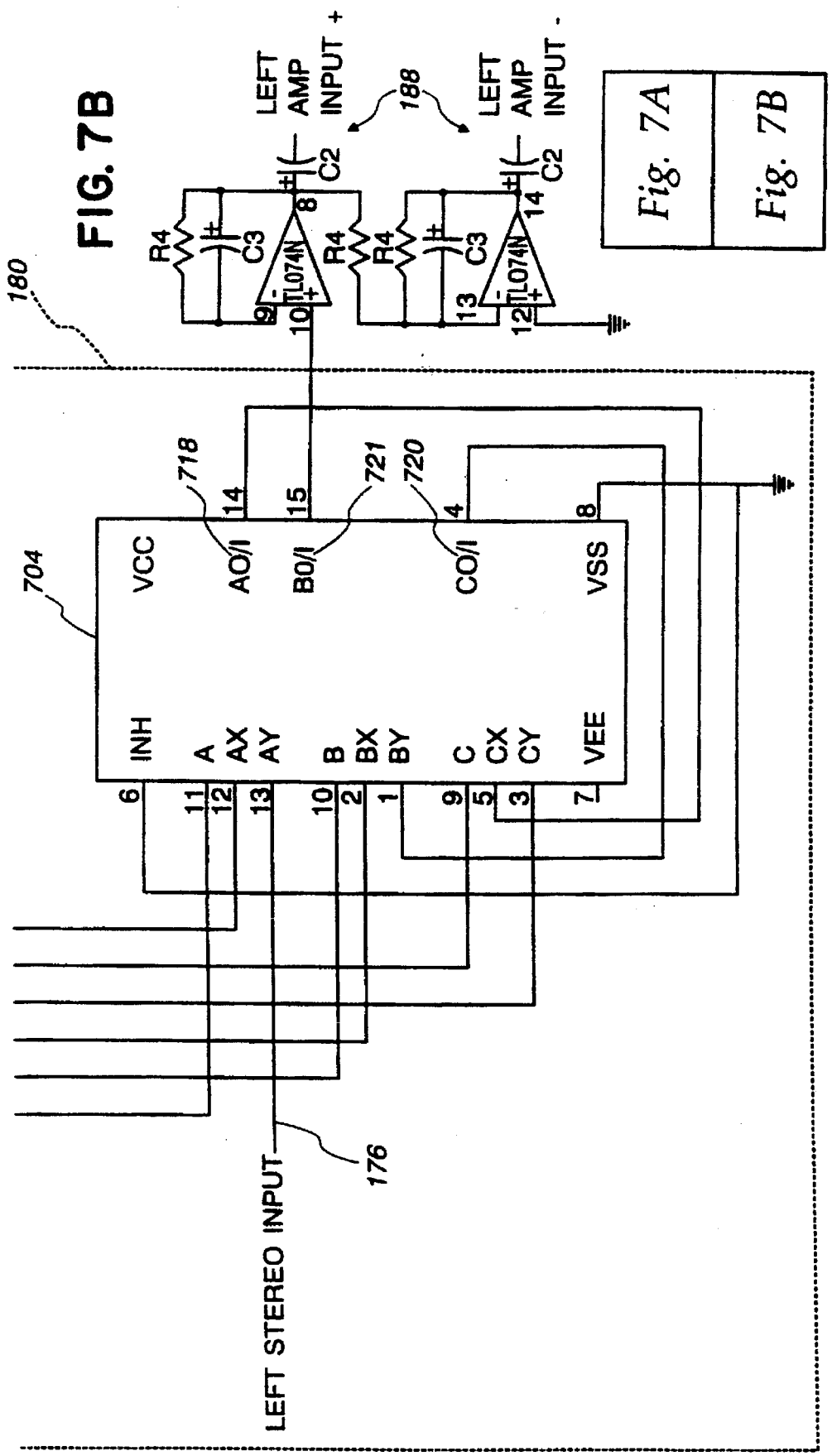

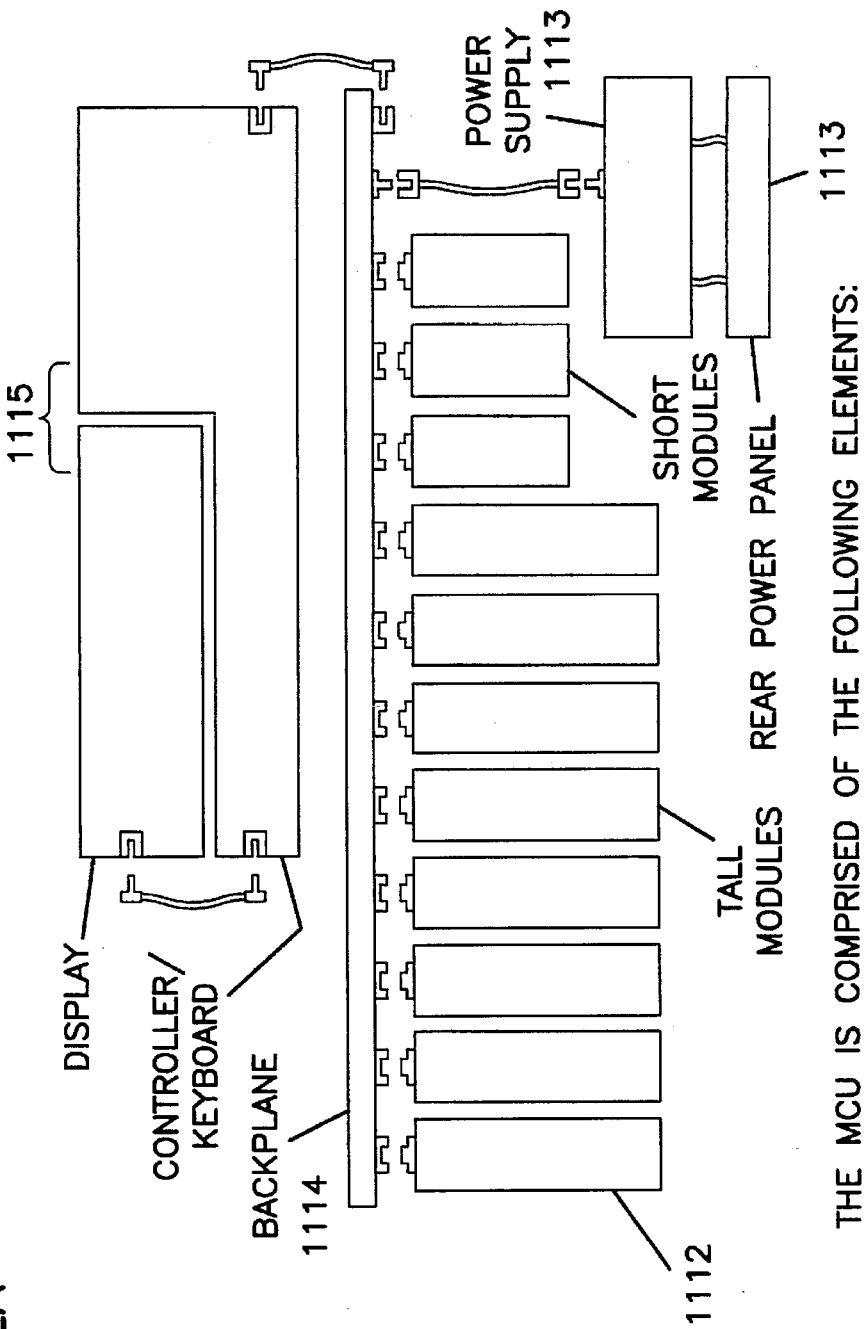

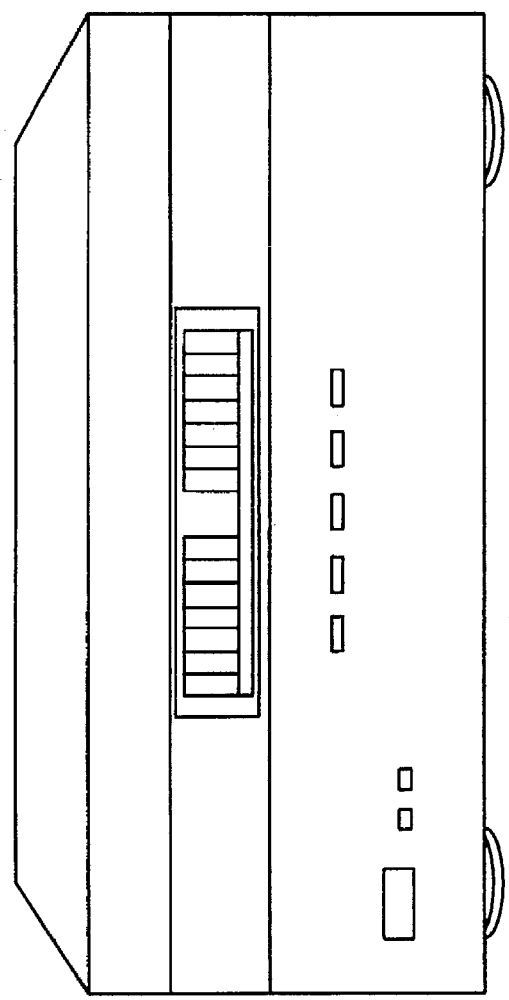

MCU-REAR VIEW

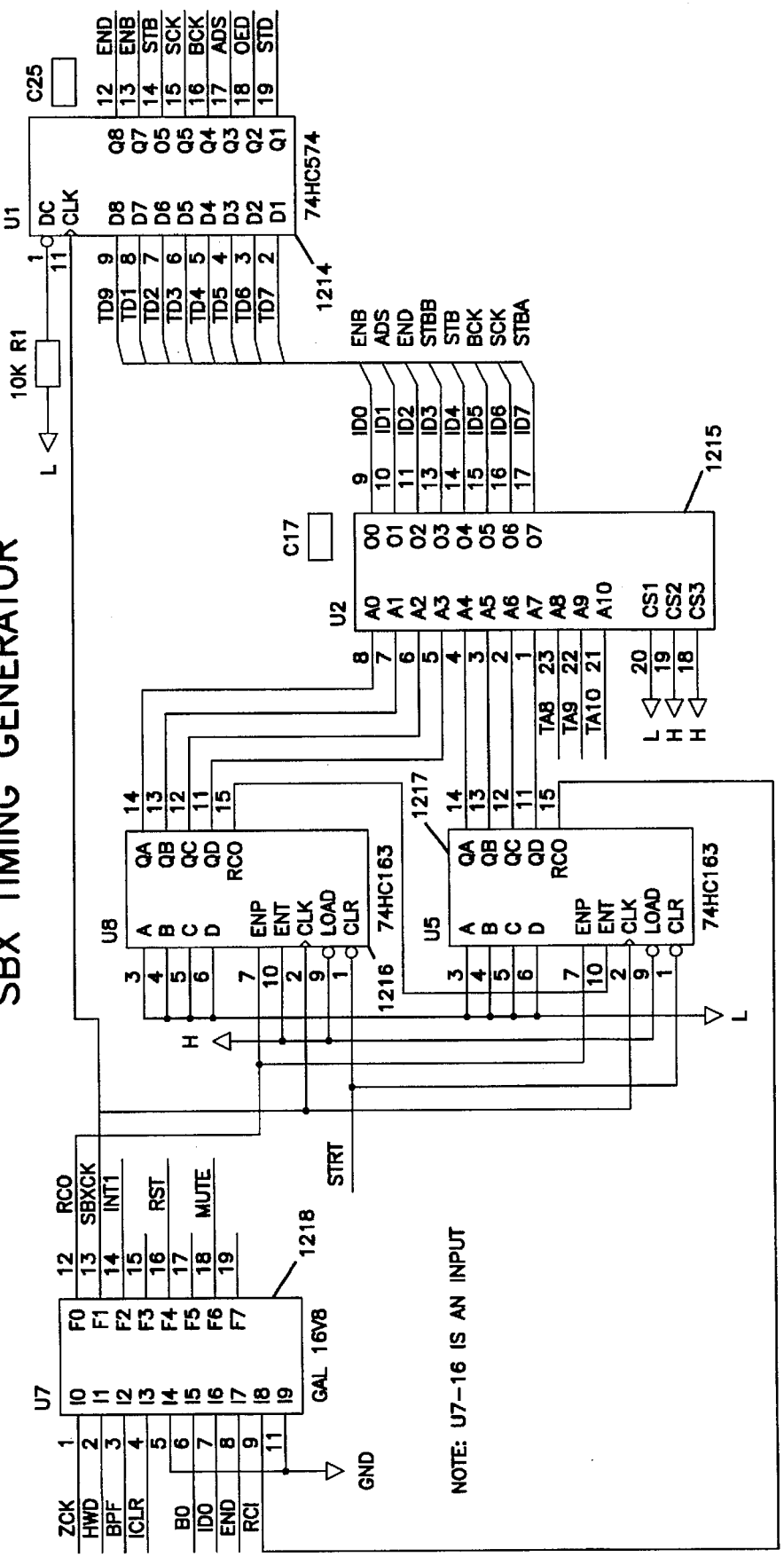
FIG. 12G  SBX TIMING GENERATOR
NOTE: U7-16 IS AN INPUT

QUAD SOURCE MODULE

DUAL SOURCE MODULE

1400

DUAL ZONE LAND
INWALL INTERFREE

TELEPHONE FIRM WARE STATE TABLE

STANDBY MODE

FIG. 26    NORMAL MODE

WHM MODE

FIG. 31     SBX "A" THREAD

SBX "B" THREAD

AUDIO DISTRIBUTION SYSTEM

REFERENCE TO RELATED APPLICATION

This is a file wrapper continuation of application U.S. Ser. No. 07/956,901, filed Oct. 2, 1992, which is a continuation-in-part of U.S. application Ser. No. 07/818,664 filed Jan. 9, 1992 (SQUC-094), now U.S. Pat. No. 5,363,434, which is a continuation in part of U.S. application Ser. No. 07/639,507 filed Jan. 9, 1991 (SQUC-068), which issued on Jul. 14, 1992 as U.S. Pat. No. 5,131,048.

FIELD OF THE INVENTION

The present invention relates generally to routing schemes for routing signals to designated facility areas (or "zones") and, more particularly, to signal distribution control arrangements for routing and controlling audio signals, paging signals, etc.

BACKGROUND OF THE INVENTION

Home owners are rapidly becoming aware of the benefits of home audio distribution systems. These benefits include convenient access to audio signals throughout the home, more efficient use of space and savings in the form of fewer system components.

Audio distribution systems range from those distributing stereo signals only, to those incorporating other functions such as doorbells and intercoms. These systems frequently utilize a switching matrix to distribute a signal, generated and amplified by a stereo system, to various rooms throughout the house. Speakers in the various rooms typically receive the amplified signal through a distribution panel co-located in the room with the stereo system.

Prior an systems offering integrated functions such as distribution of stereo, doorbell and intercom signals have several setbacks. For example, many of these prior art systems seeking to improve sound quality have utilized the home owner's high power stereo system and a switching matrix to distribute a pre-amplified stereo signal. Unfortunately, these systems are unable to effectively integrate other important features, such as doorbell and paging.

Another setback of prior art systems is the inconvenience of using the intercom. These systems typically have the page button and speaker/receiver located on the audio distribution wall unit. This requires the intercom user to go to the location of the intercom system, as opposed to accessing it from a more convenient location.

Accordingly, there is a need for an audio distribution system that can be implemented without the aforementioned shortcomings.

SUMMARY OF THE INVENTION

A general object of the present invention is to provide a signal distribution and communication arrangement which overcomes the above deficiencies.

Another object of the present invention is to provide an arrangement for controlling the broadcast of a plurality of different types of signals through speakers located in various zones, using a control circuit which responds to various signal interface circuits by selecting which of the music, audio, page and doorbell signals from the interface circuits should be broadcast through the speakers.

Still another object of the present invention is to provide an arrangement for a front door intercom, a telephone extension conferencing circuit and an incoming telephone line hold circuit that is activated through any home touch tone telephone extension by dialing a code on the telephone handset.

The present invention is a signal distribution and communication arrangement for controlling the broadcast of a plurality of different types of signals through speakers located in various zones. The system includes a telephone interfaced with a door speaker controller to allow communication between the telephone and a door speaker. A page may be broadcast over the speakers and subsequently muted to allow private communication when the page is answered. Also included is a doorbell interface circuit that responds to a doorbell source. The doorbell source may be activated by any one of a plurality of doorbell switches.

In one preferred embodiment, these and other objects of the present invention are realized using a signal distribution and communication arrangement for controlling the broadcast of a plurality of different types of signals through speakers located in various zones. The arrangement includes an audio receiver for receiving a substantially continuously generated signal. A tone generator circuit is employed to respond to at least one doorbell generator signal from either a lighted or non-lighted doorbell button. The tone generator circuit produces one of two separate tone sequences. The arrangement also employs a home telephone interface circuit that will permit access to a front door intercom from any home extension by the dialing of a touch tone code. Similarly, a door latching circuit can be activated from any home extension by dialing a touch tone code. Telephone calls may be placed on hold by dialing another predetermined code. A paging interface circuit can be accessed from any home extension by dialing a different touch tone code. An amplifier circuit is coupled to speakers and slave amplifiers to amplify the substantially continuously generated signal, the predetermined tone and the page signal. A control circuit prioritizes, selects and couples the substantially continuously generated signal, the predetermined tone and the page signal to the amplifier circuit for broadcast through the speakers.

BRIEF DESCRIPTION OF THE DRAWINGS

Other objects and advantages of the invention will become apparent upon reading the following detailed description and upon reference to the drawings in which.

Figure 1:
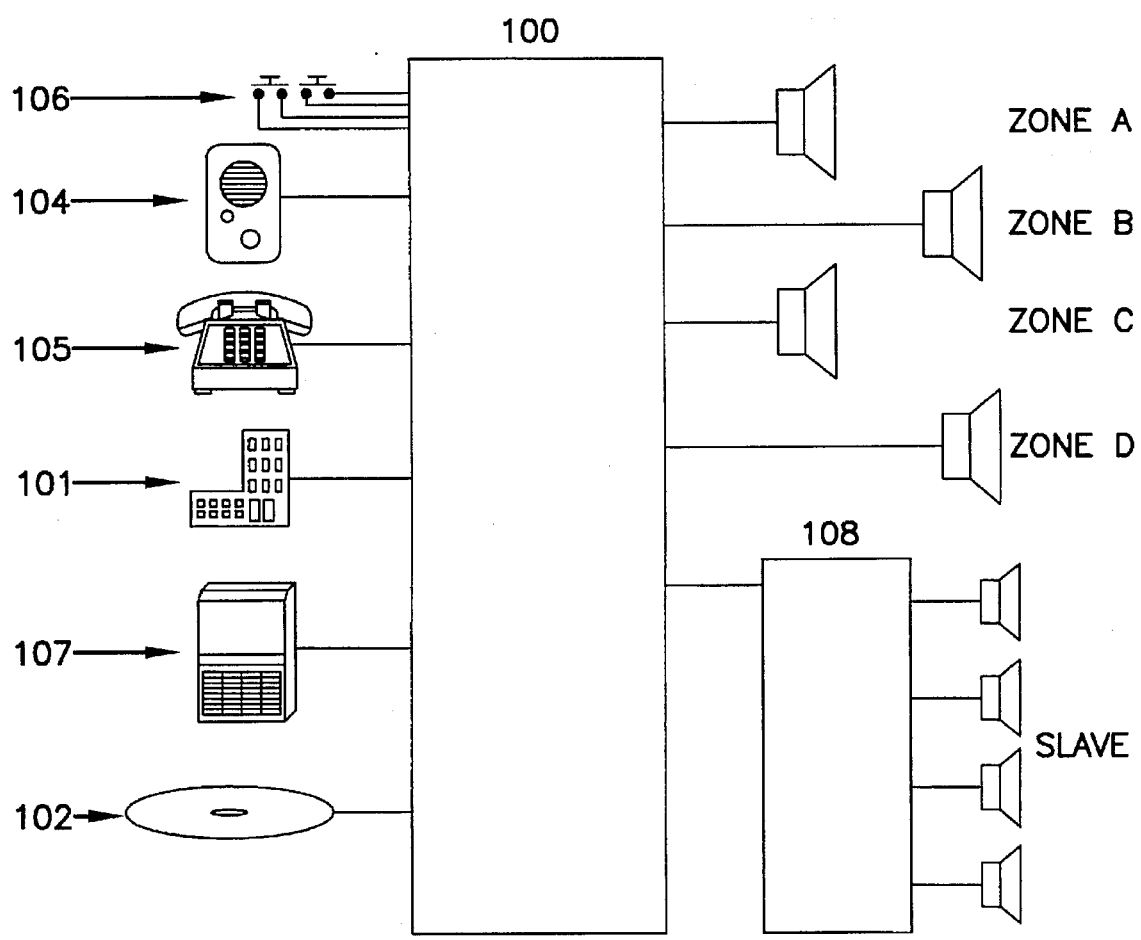
FIG. 1 is a block diagram of an audio distribution amplifier system, according to the present invention.

While the invention is susceptible to various modifications and alternative forms, a specific embodiment thereof has been shown by way of example in the drawings and will be described in detail. It should be understood, however, that it is not intended to limit the invention to the particular form described. On the contrary, the intention is to cover all modifications, equivalents and alternatives falling within the spirit and scope of the invention as defined by the appended claims.

DESCRIPTION OF THE PREFERRED EMBODIMENTS

FIG. 1 illustrates the basic configuration of the present invention in a typical application. The audio distribution amplifier (ADA) system 100 receives as inputs left and right line level signals from the home owner's personal stereo 102, substantially continuously generated audio signals from the incoming telephone line 101, a telephone handset 105, a home owner's personal key system 107, a door speaker controller 104 or an intermittently generated doorbell signal from at least one doorbell source. The doorbell source may be activated by doorbell switches 106. The ADA system 100 generates, as outputs to speakers located in a plurality of different zones A–D and a slave ADA 108, any of the following: (1) a triple or dual tone doorbell signal for which switch activated the doorbell source; (2) a voice paging message originating by dialing a predetermined code on the telephone handset 105; (3) through the key system 107 after a page command is initiated; or (4) amplified left and right stereo signals corresponding to line level signals received from the homeowner's personal stereo 102. The present system will also be interfaced with a door speaker controller 104 to allow communication between the door speaker controller 104 and the telephone handset 105 when a predetermined code is dialed on the telephone handset 105.

Other predetermined codes may be pressed to mute the output of the ADA 100 when the page is answered to allow a private conversation. To accomplish this, the muted page prevents the conversation from being broadcast over the remainder of the paging system. Other functions that can be accomplished include operation of a door latching device through the door speaker controller 104 and placing a call on hold to permit the call to be picked up from another telephone location.

Figure 2:
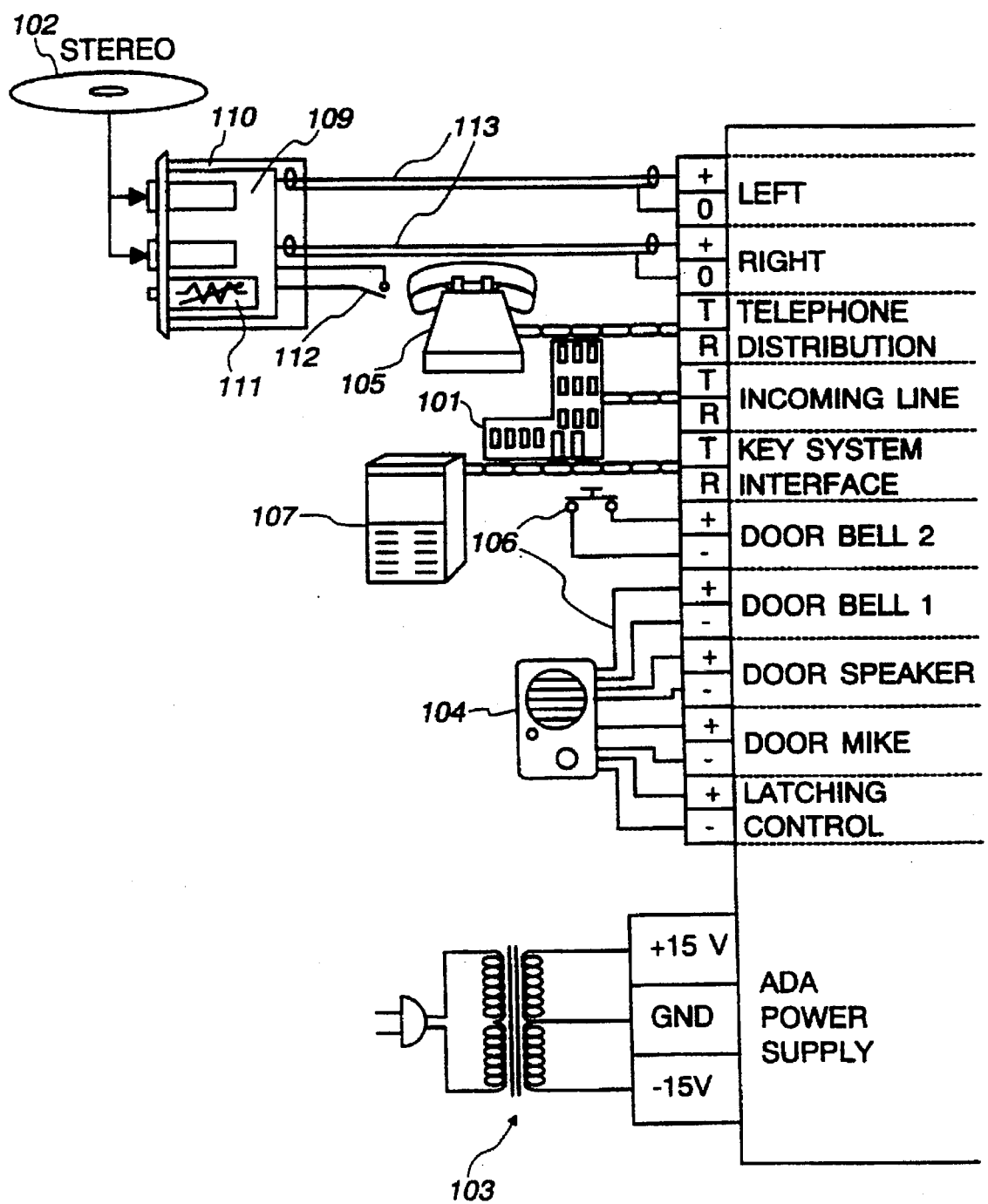
FIG. 2 is a diagram illustrating, in more detail, various inputs to the audio distribution amplifier system of FIG. 1.

The interface between the ADA system 100 and the output of the stereo 102 is illustrated in FIG. 2. The interface includes a wall plate interface circuit 110 which receives and buffers left and right signals from a typical consumer music system, such as a stereo amplifier or radio receiver 102. The range of stereo output signal levels and impedances is preferably from 0.1 V to 1.0 V (peak to peak) and 10 k$\Omega$ to 100 k$\Omega$, respectively. A remote master gain control 111 (FIG. 2) in the wall plate interface circuit 110 (mounted on printed circuit board 109, shown in FIG. 2) provides volume control. Ideally, the wall plate interface circuit 110 and the gain control 111 are located near the associated stereo so that the stereo signal may be properly distributed without degradation.

The interface illustrated in FIG. 2 also includes a remote stereo defeat control switch 112 which disables the stereo signals presented to the ADA system 100 when closed. When the defeat control switch is open, the left and right signals from the stereo 102 are delivered to the ADA system 100 via two signal cables 113. Each signal cable preferably consists of a single 22 A.W.G. conductor with a bell foil shield and drain wire. The cable lengths are desirably between 20 and 200 feet.

FIG. 2 also illustrates the incoming telephone line 101, which is connected to the telephone handset 105 through the ADA 100. Whenever a telephone feature is activated by dialing a predetermined code on the telephone handset 105, a hold function is applied to the telephone to prevent disconnection of an active conversation.

In a preferred embodiment, a communications module 192 (FIG. 4) monitors a continuously generated signal to detect when the telephone handset is taken "off hook." This monitoring function also detects appropriate predetermined codes used to activate paging, muting, door intercom, latching and hold features. When a predetermined code is dialed by the user, the communications module 192 preforms the functions necessary to permit the handset to be used to page, hold a private conversation with another handset, converse with someone at the door speaker controller 104, operate a latching device from the door speaker controller 104 or put the incoming telephone line 101 on hold.

An interface is provided for the homeowner's personal key system 107, which can initiate a paging signal. In the preferred embodiment, the key system 107 activates the interface by presenting a continuously generated signal and the ADA 100 responds by activating the paging control circuit to permit the key system 107 to be used for paging.

An interface is provided for the door speaker controller 104 so that the telephone handset 105 can be used to converse with someone at the door intercom location and operate a latching device associated with the door speaker controller 104. Whenever a door button 106 on the door speaker controller 104 is pressed, a multiple tone is broadcast over the paging system. Upon taking the telephone handset "off hook" and dialing the predetermined code to access the door speaker controller 104, the communications module 192 places the incoming telephone line 101 on hold and connects the telephone handset 105 to the door speaker controller 104, allowing the user to converse with someone at the door intercom location. While the connection is completed between the telephone handset 105 and the door intercom unit, the user can dial a predetermined code to activate a door latching device associated with the door speaker controller 104 through the telephone handset 105.

Power to the ADA system 100 may be provided using a conventional AC domestic power source (not shown) and a transformer 103 providing +15 V and −15 V AC power levels to the ADA system 100. Power to the wall plate interface circuit is provided by a power supply in the ADA 100 (wires not shown).

Figure 3:
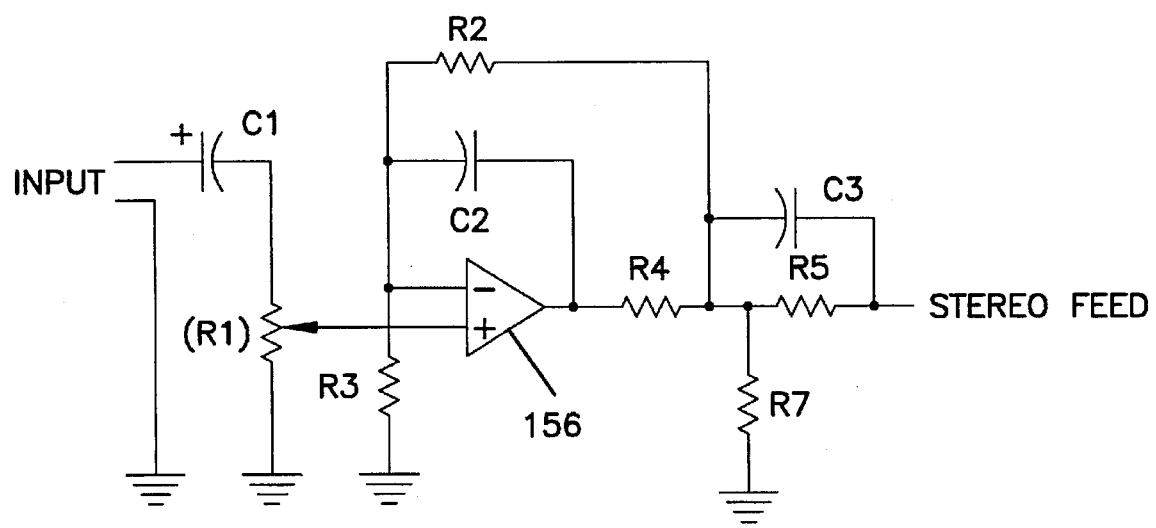
FIG. 3 is a circuit diagram illustrating a preferred embodiment of one of two identical wall plate interface circuits, in accordance with the present invention, which may be used as a buffer between the stereo system and the audio distribution amplifier if FIG. 2.

Referring now to FIG. 3, there is illustrated one of two identical wall plate interface circuits which may be used for converting and buffering a respective one of the left or right stereo signals from a single-ended to a balanced signal. The circuit includes a conventionally arranged stereo feed amplification circuit based around a TL074-type operational amplifier 156. The resistor and capacitor values in the circuit of FIG. 3 may be implemented using typical values well-known in the art.

Figure 4:
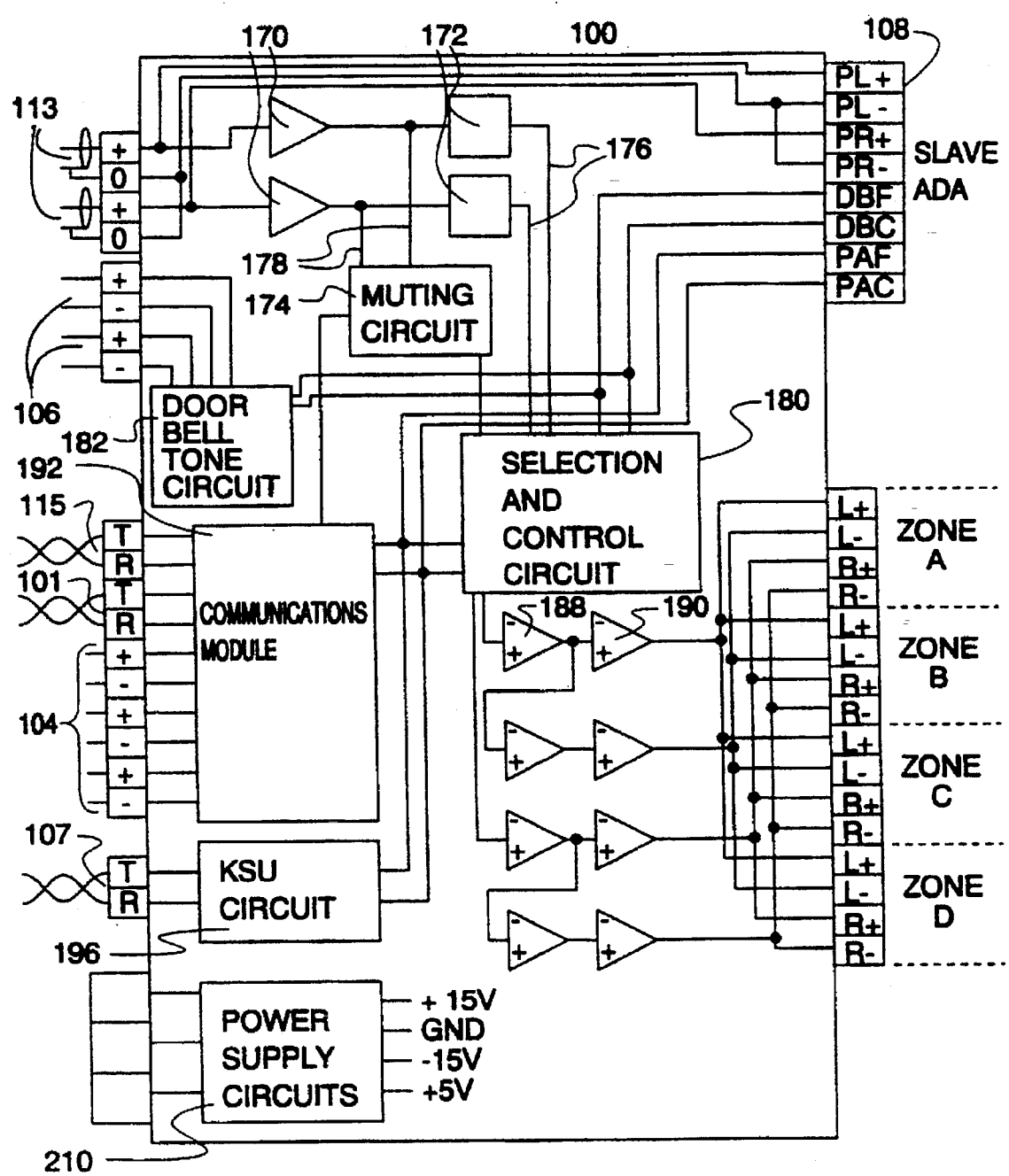
FIG. 4 is a block diagram, according to the present invention, illustrating the basic functional circuits internal to the audio distribution amplifier of FIG. 2.

FIG. 4 illustrates, in block diagram form, the basic functional circuits internal to the ADA system 100 of FIG. 2. From the stereo signal cables 113 provided by the wall plate interface circuit of FIG. 3, the stereo (or music) signal is received by conventional pre-amplification and equalization circuit stages 170 and 172 and by threshold detection circuitry 174, the latter of which monitors the left and right stereo signal feeds 176 for low level audio signals. If the stereo signals are absent or at a negligible level, the detection circuitry 174 initiates a control signal, over feed 178, which instructs a selection/control circuit 180 to block any noise at the output of the equalization stages 172 from reaching the speakers.

A momentary closure of one of the two doorbell switches 106 will cause an intermittent doorbell signal to be received by the doorbell tone circuit 182. The doorbell tone circuit 182 will then generate two signals. The first is either a two-tone or three-tone sequence which will identify the doorbell switch 106 that initiated the doorbell signal. The second is a doorbell control signal that the selection/control circuit 180 uses to mute the stereo signal inputs 176 and unmute the two- or three-tone sequence 184 so that it can be coupled to the preamplifiers 188 and power amplifiers 190.

The incoming line 101 and the telephone distribution line 115 to the extensions are connected to the communications module 192. The incoming line 101 is normally bridged to the telephone distribution line 115. Upon the receipt of a predetermined DTMF code over the telephone distribution line 115, the communications module 192 performs the functions necessary to permit the handset 105 to be used to page, hold a private conversation with another handset, converse with someone at the door speaker controller 104, operate a latching device from the door speaker controller 104 and to put an incoming telephone call on hold. Upon receipt of the appropriate DTMF code (for example, #7) over the telephone distribution line 115, the communications module 192 uncouples the incoming telephone line 101 from the telephone distribution line 115 and couples the telephone distribution line 115 to the paging feed 130. The communications module 192 also generates a page control signal 129 to unmute the page signal input 130 into the selection and control circuit 180, so that it can be coupled to the preamplifiers 188 and power amplifiers 190.

Upon receipt of a second DTMF code after the initial code has been processed, the communications module deactivates the page control signal 129, muting the paging feed 130. The telephone distribution lines 115 remain coupled to the communication module's internal SLIC 610 (FIG. 6A), allowing the handset 105 to converse with another extension.

Upon receipt of a different DTMF code (for example, #3) over the telephone distribution lines 115, the communications module 192 uncouples the incoming telephone line 101 from the telephone distribution lines 115 and couples the telephone distribution lines 115 to the SLIC 610, allowing communication with the door speaker controller 104.

Upon receipt of a still different DTMF code (for example, *) after the previous code has been processed, the communications module activates a latching control signal to activate the door latching device connected to the door speaker controller 104. The door latching device remains active as long as the appropriate DTMF code is sent over the telephone distribution line 115.

Upon receiving a paging signal from the key system 107, the SLIC interface 610 generates a page control signal 129 that the selection/control circuit 180 uses to mute the stereo signal and unmute the page signal input 130 into the selection and control circuit 180, so that it can be coupled to the preamplifiers 188 and power amplifiers 190.

A conventional power supply/rectification circuit 210 may be used to convert the AC power levels to complementary DC power levels for the above described circuitry.

FIG. 4 further illustrates the signal selection/control circuit 180, which couples the selected stereo 176, unique tone sequence 184 and page signal 130 to the output amplifiers 188 and 190. When more than one control signal is presented to the selection/control circuit 180 simultaneously, the input signal with the highest priority is coupled to the speakers. The signal priorities for the illustrated embodiment are (from highest to lowest): page, doorbell, stereo and mute.

The output amplification stages 188 and 190 and the slave ADA output stage 108 are also illustrated by FIG. 4. The arrangement bridges the stereo signal cables 133, the doorbell feed and control 184, the paging feed 130 and paging control 129 leads to the slave ADA output leads. The arrangement uses conventional audio pre-amplification and power amplification circuitry 188 and 190 to distribute the selected information signal to speakers in a plurality of different zones A–D.

Figure 5:
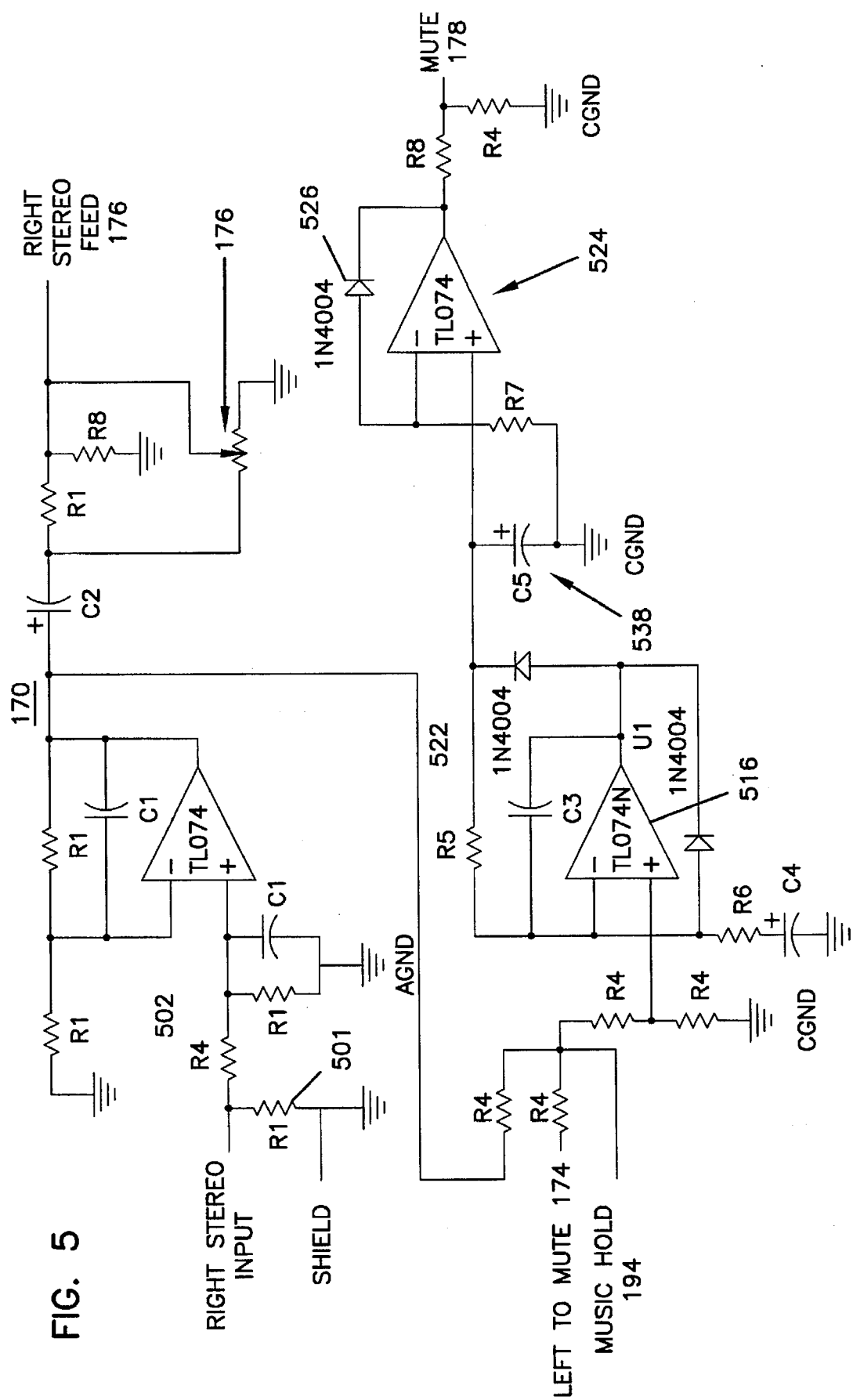
FIG. 5 is a circuit diagram illustrating a preferred embodiment of the stereo signal pre-amplification and equalization stages and the threshold detection circuitry of FIG. 4.

FIG. 5 illustrates a preferred circuit for implementing the stereo pre-amplification and equalization stages 170 and 172 and the threshold detection circuit 174 of FIG. 4. The illustrated stereo pre-amplification circuit 170 is one of two identical circuits used to convert a respective one of the left or right stereo signals from a balanced signal to a single-ended signal. The circuit includes a balanced termination resistor 501 and a conventionally arranged amplification circuit based around a TL074-type operational amplifier 502. The resistor and capacitor values in the pre-amplification circuit 170 of FIG. 5 may be calculated using 100Ω for R1, 499Ω for R2, 10 KΩ for R3 and 47 pf for C1.

The threshold detection circuit 174 monitors the left and right stereo signal lines 176 for low level audio signals. As previously noted, the DC control line 178 goes high when the stereo signal levels are absent or their levels become negligible. This instructs the selection/control circuit (180) to mute the stereo channel.

The threshold detection circuit 174 includes two summation resistors 512 and 514 and a TL074-type operational amplifier 516 in a buffered voltage-follower configuration. A capacitor 522 connected between the amplifier's output and negative input provides noise reduction for the stereo signal.

The final stages of the threshold detection circuit 174 includes a TL074 type operational amplifier 524, arranged for signal rectification and amplification. The diode 526 provides for rectification, while the capacitor 538 provides additional noise reduction. The resistor and capacitor values for the threshold detection circuit are 10 KΩ for R4, 3.3 MΩ for R5, 301Ω for R6, 2.21 KΩ for R7, 20 KΩ for R8, 10 pf for C3, 22 µf for C4 and 10 µf for C5.

Figures 1, 6A:
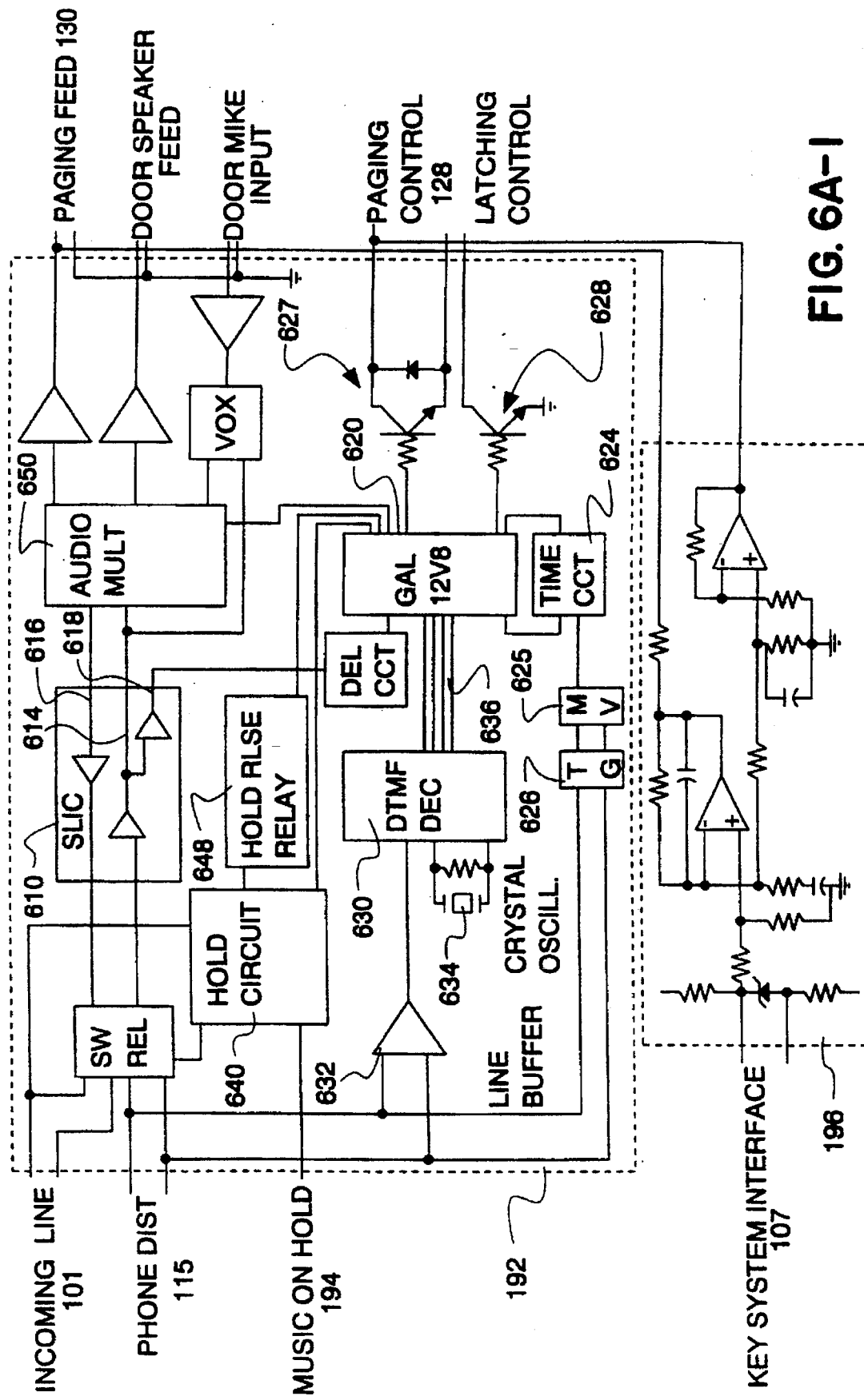
FIG. 6A is a circuit diagram illustrating a preferred embodiment of the communications module and doorbell circuit including interfaces for a telephone line, telephone station and key system, doorbell, door intercom, paging feed and control and the signalling, timing and control functions of FIG. 4.
Figures 2, 6A:
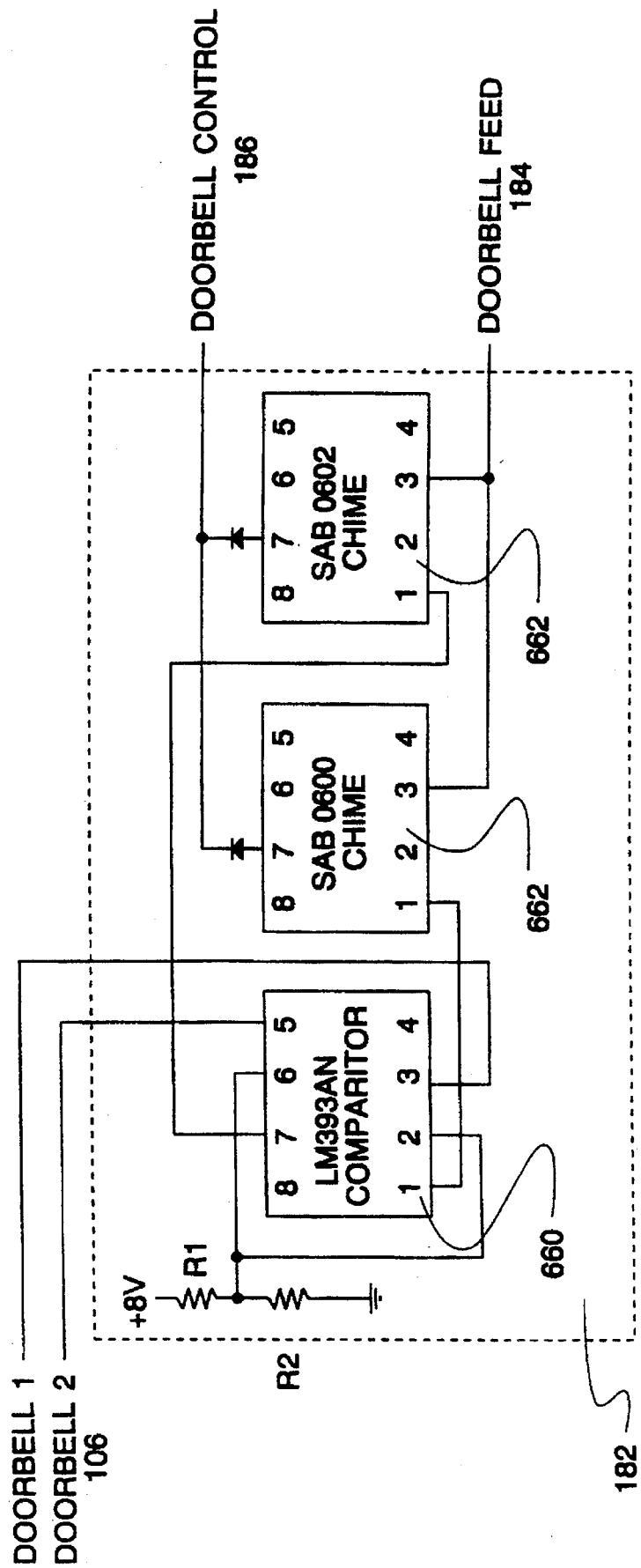

FIG. 6A illustrates in block diagram form the basic functional connections between the ADA mother board 100 and the communications module 192, key systems interface circuit 196 and the doorbell generator board 182. The communications module 192 embodies a line interface circuit (SLIC) 610, a control circuit 620, a DTMF receiver 630, a hold and release circuit 640 and an audio multiplexor 650.

The SLIC 610 processes the audio signal received through the lines 115 by passing the signal through a Tx output 614 to the audio multiplexor 650 and the SHO output 618 to the control circuit 620. Signals received from the audio multiplexor 650 over an Rx input 616 are passed through the lines 115 to the telephone handset 105.

The control circuit 620 embodies a programmable logic device that processes signals received from the DTMF receiver 630. Also included is a delay and timing circuit 624 to activate a hold and switching relay circuit 640, the outputs to the paging control 128 and latching control 628 circuits. The tone circuit 626 is used to signal the handset 105 when a digit time-out occurs.

The DTMF receiver 630 processes DTMF signals from the handset 105 and passes these signals to the control circuit 620 in a hexadecimal format through output leads 636. A buffer 632 is placed between the lines 115 and the DTMF receiver for protection.

The release and hold circuit 640 includes a switching relay 642, a hold circuit with "music on hold" capability 194, a hold release relay 648 and a hold decay circuit.

The audio multiplexor 650 is used to switch voice and control signals between the SLIC circuitry 610, the paging and control circuits 652, as well as the door speaker, mike and control circuits 656. The VOX circuit 654 is used to control feedback on the front door intercom associated with the door speaker controller 104.

Figure 6B:
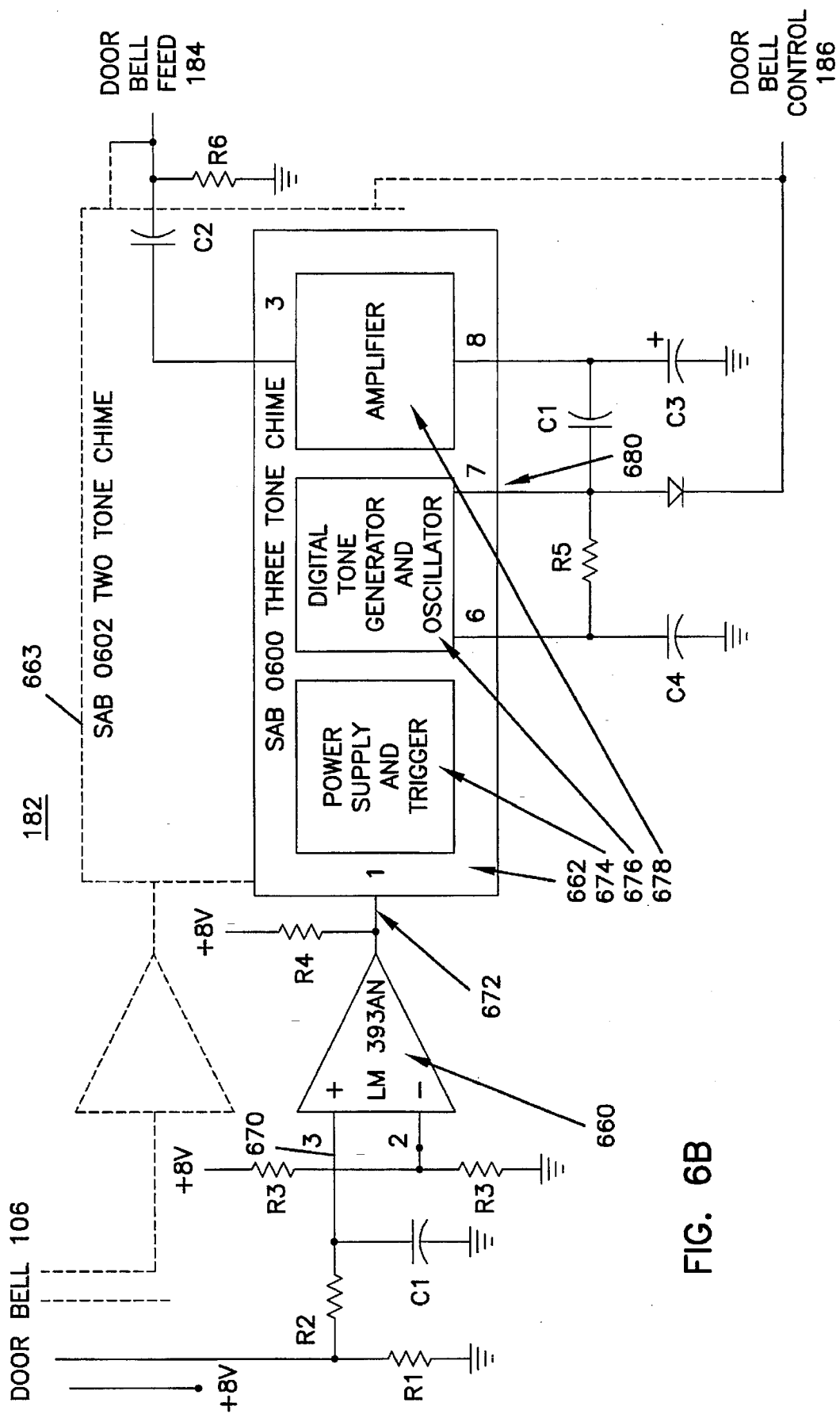
FIG. 6B is a circuit diagram illustrating the doorbell generator circuit of FIG. 4.

FIG. 6B, which illustrates a preferred circuit embodiment of the doorbell generator board 182, includes an LM 393AN Comparitor 660, an SAB0060 Three Tone Chime 662 and/or an SAB0062 Two Tone Chime 663. With the intermittent closure of one of the two doorbell switches 106, the power provided to input 670 of the comparitor 660 is increased over the reference voltage at input 672, transmitting a triggering voltage into the chime 662. The trigger 674 activates the digital tone generator 676, which applies tones to an amplifier 678. The output of the amplifier 678 is transmitted to the doorbell feed 184. Simultaneously, the trigger 674 applies voltage to tone generator pin 680, which is held for the duration of the tone sequence. This voltage is used as the doorbell control voltage 186. When the tone sequence is completed, the output voltage from 680 is lowered to 0 volts, disabling the control signal 186 and the Chime 662.

The Chime 662, which is manufactured by Siemens AG of Germany, is a single chip that produces a sound signal according to the tempo, rhythm and tones programmed by the manufacturer when triggered by a DC signal. The SAB 0600 emits a three tone chime when triggered and the SAB 0602 emits a two tone chime when triggered. As will be apparent to one of ordinary skill in the art, the SAB 0602 may be used in place of the SAB 0600. Similarly, the SAB 0602 may be used to produce the tone associated with one doorbell button 106 and the SAB 0600 may be used to produce the tone associated with a different doorbell button 106 in the same system. Resistor and capacitor values in the doorbell circuit illustrated in 6B are 68Ω (1 watt) for R1, 47.5Ω for R2, 100Ω for R3, 1 kΩ for R4, 37.5 kΩ for R5, 10 kΩ for R6, 0.1 μf for C1, 0.22 μf for C2, 0.47 μf for C3 and 0.0047 μf for C4. An LM317T is provided in the doorbell circuit to reduce the +15 V DC input voltage to the required +8 V DC operating voltage.

The following examples are given to clarify the operation of the system of the present invention. When a handset 105 is taken "off hook" and a predetermined code is dialed on the telephone handset (for example, #), signals are sent from the DTMF receiver 630 to the GAL 620 (FIG. 6A), which starts a timer 624. The timer 624 counts a timing period of 4 seconds within which a second digit must be received from the handset 105. If the second digit is not received within the 4 second period, the tone circuit signals the extension user that time has expired and the GAL 620 will reset. If a second digit is received within 4 seconds and is one of a predetermined group (for example, a 1,2,5,6,8,9, 0,#,*), the GAL 620 will reset.

If the second digit is, for example, a 3, and the PH1 lead is in a Hi state, the GAL 620 will signal the DRM which signals the SLIC 610. The GAL 620 also fires an SCR in the Hold Circuit 640, and activates a line relay to switch the extensions to the internal SLIC 610.

If the second digit is, for example, a 7, and the PH1 lead is in a Hi state, the GAL 620 will set the TX input 614 from the SLIC 610 to the Audio Multiplexor 650 to the Page 654 circuit. The GAL 620 will also fire the SCR in the Hold Circuit 640 and activate a line relay to switch the extensions to the internal SLIC 610.

If the second digit is, for example, a 4, and the PH1 lead is in a Hi state the GAL 620 will disable the possible activation of the release circuit 646 whenever the extension goes "on hook." The GAL 620 will fire the SCR in the Hold Circuit 640 and activate a line relay to switch the handset 105 to the internal SLIC 610.

If a third digit is dialed and is, for example, a 1,2,5,6,8,9, or #, the GAL 620 will reconnect the handset 105 to the telephone line 101.

If the third digit is, for example, a 3 and the GAL 620 is in the DRM state, no change will occur. If the GAL 620 is not in the DRM state it will reset, clear the PGM, DRM, PGC, INT and HLD leads and reconnect the handset 105 to the telephone line 101.

If the third digit is, for example, a 4 and the GAL 620 is in the HLD state, no change will occur. If the GAL 620 is not in the HLD state, it will reset, clear the PGM, DRM, PGC, INT and HLD leads and reconnect the handset 105 to the telephone line 101.

If the third digit is, for example, a 7 and the GAL 620 is in the PGM state, no change will occur. If the GAL 620 is not in the PGM state, it will reset, clear the PGM, DRM, PGC, INT and HLD leads and reconnect the handset 105 to the telephone line 101.

If the third digit is, for example, a 0 and the GAL 620 is in the PGM state, the PGC lead will go Lo, disabling the page control 626. If the GAL 620 is not in the PGM state, it will reset, clear the PGM, DRM, PGC, INT and HLD leads and reconnect the handset 105 to the telephone line 101.

If the digit is, for example, a * and the GAL 620 is in the DRM state, the DRL lead goes from Lo to Hi, activating the Latch Control 628 as long as the "*" button is depressed. If the GAL 620 is not in the DRM state it will reset, clear the PGM, DRM, PGC, INT and HLD leads and reconnect the handset 105 to the telephone line 101.

If an extension goes "on hook," a multivibrator fires over the HKP lead. If the HLY lead is Lo (normal state), the CLR lead sets form Hi to Lo, disabling the hold release relay 648.

The GAL 620 will reset, clear the PGM, DRM, PGC, INT and HLD leads and reconnect the handset 105 to the telephone line 101.

If the HLY lead is Hi the CLR lead will not change state and the hold release relay 648 will remain active. The GAL 620 will reset, clear the PGM, DRM, PGC, INT and HLD leads.

The Hold Circuit 640 is released whenever one of four conditions occurs: (1) the other party disconnects (2) the Central Office releases the line (3) an extension goes "off hook" or (4) a default digit is dialed.

Figure 7A:
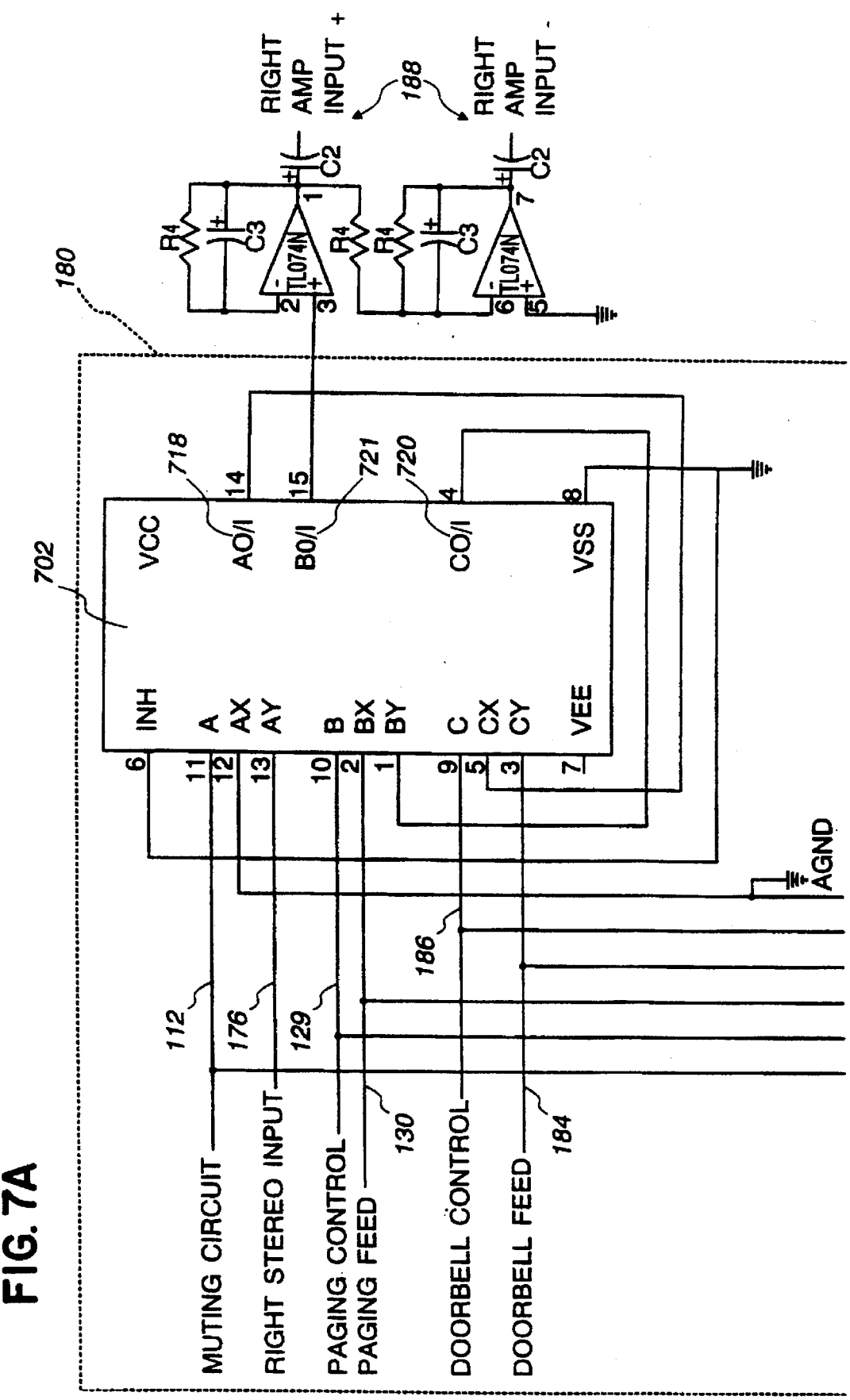
FIG. 7 is a circuit diagram illustrating a preferred embodiment of a control circuit used to implement the threshold detection, mute and audio signal output pre-amplification functions of FIG. 4.

Referring now to FIG. 7, the signal selection/control circuit 180 is illustrated as including two 4053-type multiplexors 702 and 704 and the pre-amplifiers 188. If no stereo signals are present, the threshold detection circuitry 174 of FIGS. 4–5 will supply a threshold control signal 178.

Each identical left and right multiplexor 702 and 704 is controlled by the mute function, the doorbell control signal 186 and the page control signal 129 by the respective A 0/1, B 0/0 and C 0/1 control inputs. As feed inputs, each multiplexor 702 and 704 receives left or right stereo signal feeds 176 (FIG. 4) at the Ay input, ground at the Ax input, the page signal 130 at the Bx input and the doorbell tone sequence 184 at the Cy input. The Cx input receives the A 0/1 output and the By input receives the C 0/1 output, with the B 0/1 output being provided to the pre-amplification circuit 188 for priority control. Any audio received at the output (B 0/1) 720 of the multiplexors is converted from a single-ended signal to a balanced signal using the conventional pre-amplification circuitry 188 shown in FIG. 7. In accordance with this configuration, if the mute switch 112 is closed, the multiplexors 702 and 704 will choose input Ax and effectively mute the stereo inputs. Otherwise, the multiplexors will pass the stereo signals through to the output (A 0/1) 718, to the output (C 0/1) 720 and then to the output (B 0/1) 721 of the multiplexors.

If a doorbell control signal 186 is present, the multiplexors will pass the doorbell tone sequence 184 to the output (C 0/1) 720 and then to the output (B 0/1) 721 of the multiplexor (provided the page control signal 186 is not present). If a doorbell control signal 186 is not present, the multiplexors will pass the output (A 0/1) 718 to the output (B 0/1) 720.

If a page control signal 129 is present, the multiplexors will pass the page signal 130 to the output (B 0/1) 721 of the multiplexor (regardless of the presence of any other signals). If a page control signal 129 is not present, the multiplexors will pass the output (C 0/1) 720 to the output (B 0/1) 720.

Figure 8:
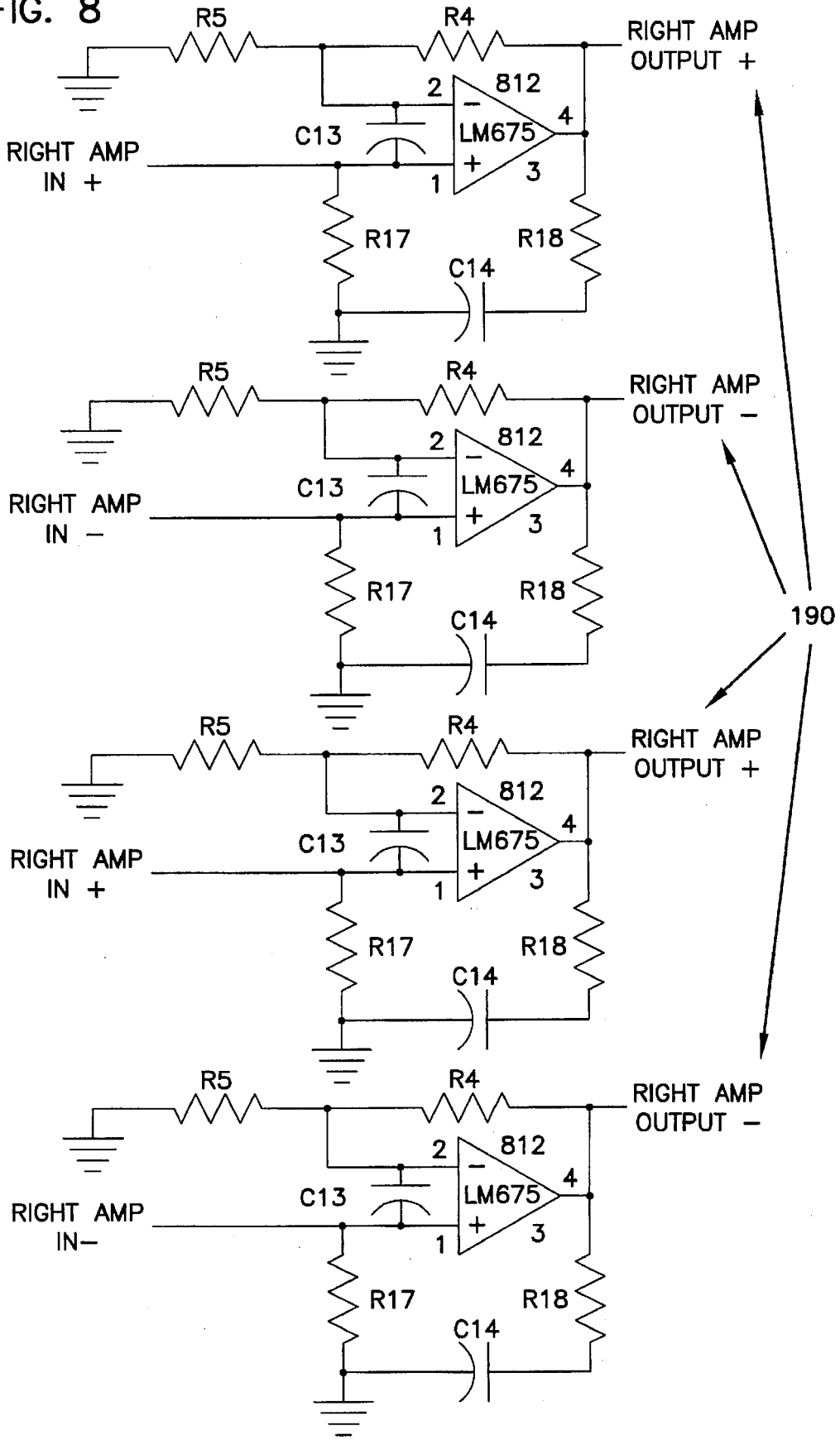
FIG. 8 is a circuit diagram illustrating a preferred embodiment of the audio signal output power amplification circuit of FIG. 4.

FIG. 8 illustrates the power amplification circuit 190 of FIG. 4 as including four identical LM675-type power amplifiers 810, 812, 814 and 816. The gain of each amplifier is 20. The resistor and capacitor values in the power amplification circuit 190 of FIG. 4 are preferably as follows: 10 k$\Omega$ for R4, 1 k$\Omega$ for R5, 22 k$\Omega$ for R17, 1$\Omega$ (1 Watt) for R18, 0.1 micro-farad for C14 and 100 pf for C13.

Figure 9:
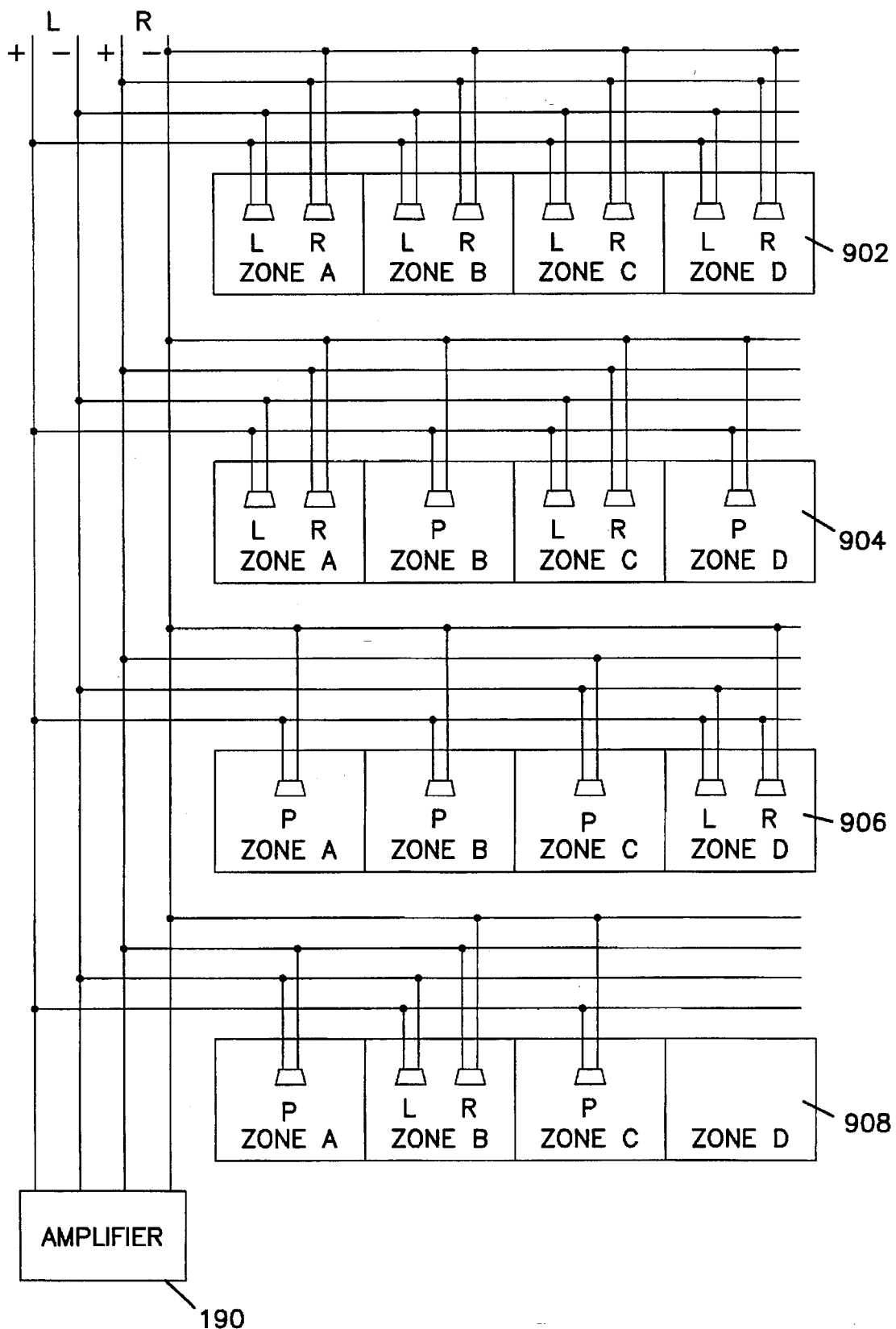
FIG. 9 is a diagram illustrating four preferred speaker hook-up configurations.

FIG. 9 demonstrates four exemplary alternative hook-up configurations 902, 904, 906, 908 for lines running from the amplifiers 190 to the speakers located in each of the zones A–D. Because the output amplifiers 109 are in a balanced bridgeable output configuration, the bridgeable left and right output amplifiers 109 can accommodate left, right and left plus right speaker hook-up configurations. Preferably, each speaker has its own volume control located within the room where that speaker is placed.

Figure 10:
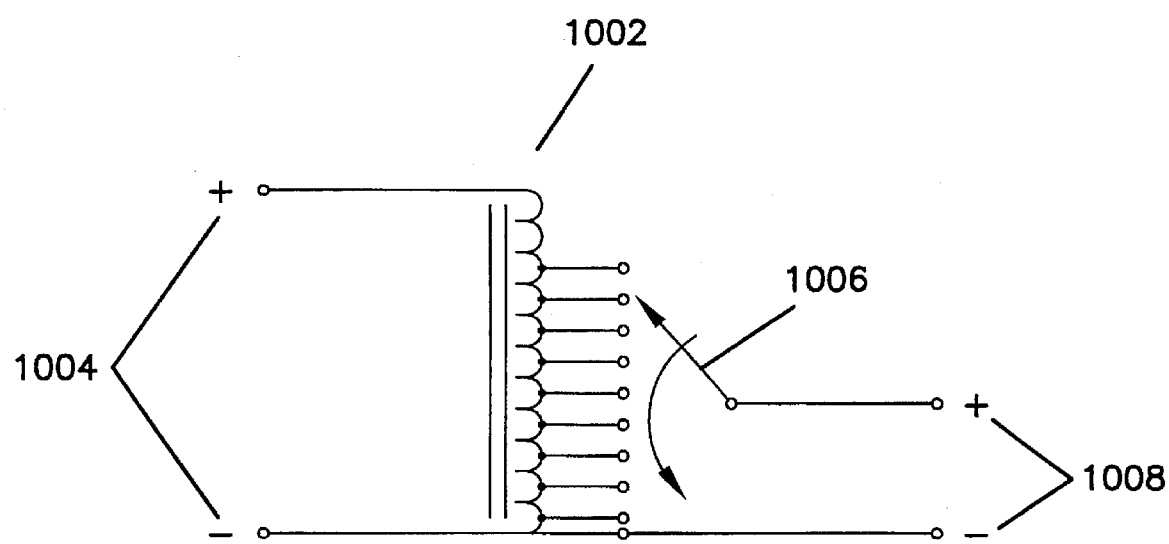
FIG. 10 is a diagram illustrating a volume control audio transformer in accordance with the present invention.

As shown in FIG. 10, an audio transformer configuration 1002 is preferably used to provide volume control. The amplifiers 109 connect to the inputs 1004 of the audio transformers 1002. The 10 position selector switch 1006 provides adjustability from zero to full volume. The output of each audio transformer 1008 then feeds a corresponding speaker. Due to the use of four $\Omega$ speakers, the volume control audio transformer has a built-in six decibels of attenuation so that the impedance presented to the ADA system from each transformer with a four $\Omega$ speaker is not less than sixteen $\Omega$. Unless otherwise indicated, component values represented by the same notation from the different figures (e.g., R1, C50) are the same.

Electronic Distribution Networking System

Figure 11:
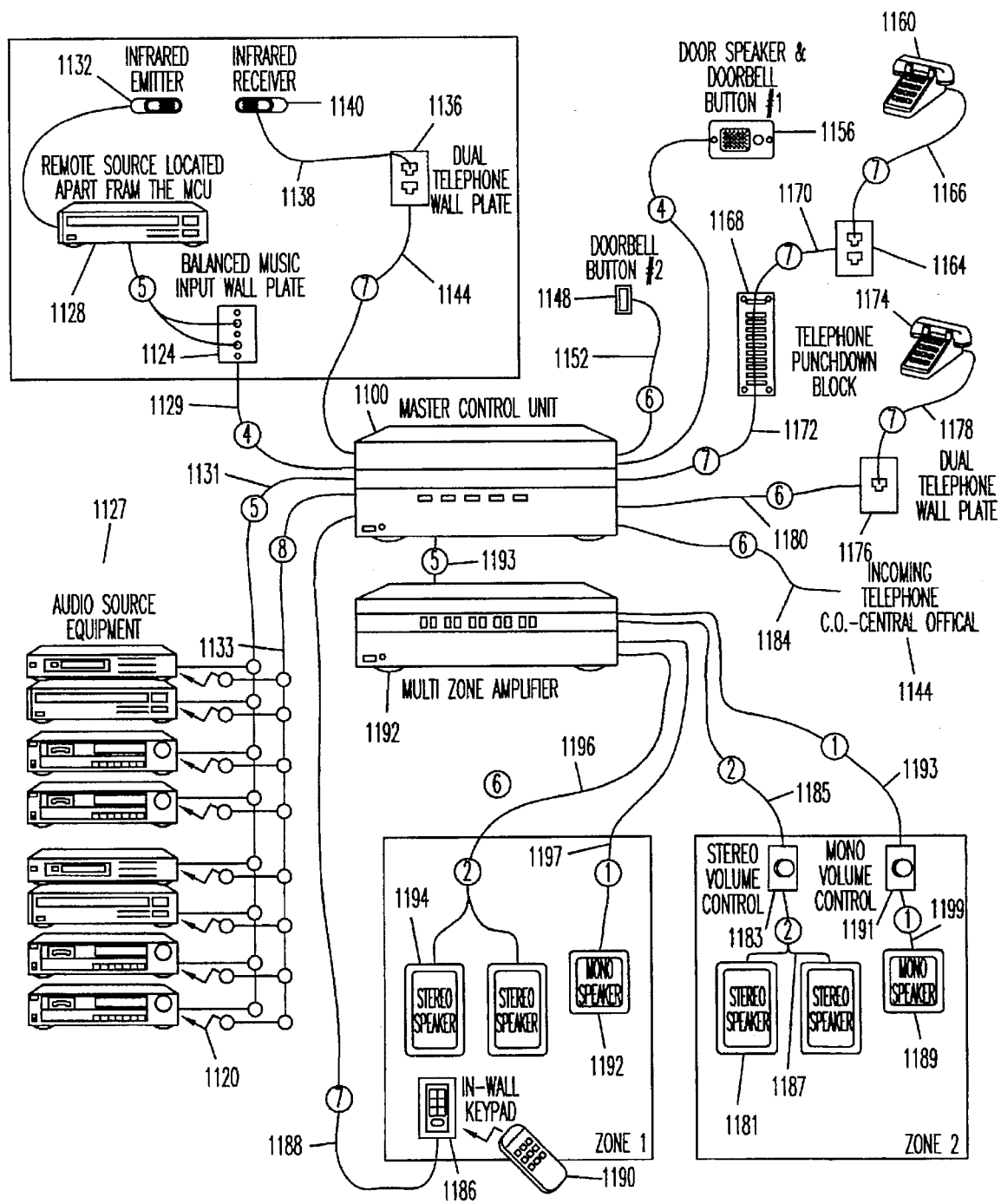
FIG. 11 is a system block diagram of an embodiment of an electronic processor-based signal distribution system, also in accordance with the present invention.

FIG. 11 provides a schematic overview of an electronic distribution networking system ("the EDN system"), which provides a single, open-wiring format for coordinating audio, telephone and doorbell equipment throughout virtually any facility. Because the system is primarily situated for use in a house, or home, the system will be discussed in this context.

The open-wiring network is based around a master control unit ("the MCU") 1100, which is the system's hub. Through the open-wiring network, the MCU 1100 provides the control and framework for multiple system functions, including telephone, audio and door entry functions. The open-wiring arrangement also facilitates connection of existing source equipment to EDN system components and permits, via remote control of relay devices, control of peripheral items such as lights and appliances.

System telephone functions are implemented using telephones 1160 and 1174, which are wired through eight-conductor wiring 1166 and 1178 to provide a telephone interface for up to two incoming lines. Telephone connections to the system can be facilitated through the use of a conventional dual telephone wall plate 1164 and a telephone punchdown block 1168. Similarly, the telephone 1174 is connected to the MCU 1100 using a single telephone wall plate 1176. The punchdown block 1168 is conventional and may be implemented using the type available from The Siemon Company, 76 Westbury Park Road, Watertown, Conn. 06795.

Also, a direct connection is made between an incoming telephone service line 1182 and the MCU 1100, again using a conventional four conductor telephone wire 1184. This enables the EDN to use home telephones (1160, 1178) for paging, intercom functions and general office communication functions. During normal operation, the MCU 1100 isolates the telephone service line 1182 from the remainder of the system and monitors the telephones and telephone service line 1182 for commands or incoming calls.

A homeowner can perform many functions through his/her telephones by dialing certain key combinations. For example, by dialing # plus P(7), making an announcement, and then dialing (0), the station will accept a sound station for a private conversation. Other functions that can be performed through the telephones include access to door speakers, activation of a door latch, and putting an incoming call on hold. The MCU 1100 provides the necessary control for performing these functions.

Control for the audio functions is provided using an audio wiring network which uses ceiling and/or wall mounted speakers to distribute high quality background music, foreground music, paging and doorbell chimes throughout the home. Audio input to the MCU 1100 is provided from any of a number of sources, including the homeowner's existing source equipment 1127, 1128, the telephones 1160, 1178 and various intercom components such as the door speaker 1156. This audio is selectively routed throughout predefined zones, according to programming in the MCU 1100. A zone is a specified area inside and/or outside the house which provides a communication section to which the MCU 1100 is coupled. For example, an isolated room is typically designated as a single zone.

Another type of signal that can be routed throughout the house is initiated by a doorbell button 1148, which is directly connected to the MCU 1100. The MCU 1100 monitors the doorbell button 1148 and, when it is depressed, the MCU 1100 sends an audio signal to designated zones. Doorbell signals can be preprogrammed at installation or subsequently by the user, for both amplitude in the zone as well as doorbell sound tone.

An audio source 1128 may also be located remote from the other audio source equipment, as shown in the upper left corner of FIG. 11. A balanced music input wall plate 1124 serves as a connection point between the remote audio source 1128 and the MCU 1100. The balanced music input wall plate 1124 is powered by the MCU 1100 to allow long runs without signal degradation, and is connected to the MCU 1100 with a four-wire twisted pair, shielded cable 1129 (with drain wire). The balanced music input wall plate 1124 is mounted in a gang box behind the remote audio source 1128, and provides for easy connection to any stereo preamplifier audio source.

An infrared emitter 1132, such as model #390-10 by Video Link, Division of Xantech Corporation of Sylmar, Calif., provides remote control capability to the remote audio source 1128. Control is initiated using a hand-held infrared remote control 1190 (the electrical construction of which is conventional), which transmits control signals to an infrared receiver 1140, such as model #290-10 manufactured by Video Link. The control signals are sent from the infrared receiver 1140 (co-located with an in-wall keypad 1186) to the MCU 1100 through a dual telephone wall plate 1136. The MCU 1100. interprets the signal based on the in-wall keypad, which is connected to a particular port in a zone module, and the source selection information programmed at the in-wall keypad. From the MCU 1100, the control signals are sent to the targeted remote source 1128 through the infrared emitter 1132, which is placed in front of the internal infrared receiver of the remote source 1128. The infrared receiver 1140 is connected to the dual telephone wall plate 1136 through a plug-ended telephone cord 1138, and the dual telephone wall plate 1136 is connected to the MCU 1100 via an eight conductor telephone wire 1144.

By transmitting, via a hand-held remote control 1190 or inwall keypad 1186, control signals to the MCU 1100, the user has access and control of any electronic source equipment from any zone. For illustrative information on a suitable hand-held remote control device, reference may be made to U.S. patent application Ser. No. 07/817,850, entitled "Remote Control" and filed on Jan. 8, 1992.

The inwall keypad 1186, which is coupled to the MCU 1100 via an eight conductor telephone wire 1188, provides remote system control from within one of the different zones of the EDN system. Referring to zone 1 of FIG. 11, for example, the inwall keypad 1186 is capable of controlling such MCU functions as "Zone On/Off" and "System On/Off" for controlling the overall operation of the zone or system; "Source Select" for displaying the sources controlled by the MCU 1100, "Volume Up/Down" for controlling volume level on a particular audio source, "Do Not Disturb On/Off" and "Mute" for temporarily shutting off communication at a particular zone or audio source. The in-wall keypad 1186 is also capable of controlling source equipment for such functions as "Play/Stop," "Rewind," "Fast Forward," "Skip Track ±," "Skip Disk ±," and "Tuner Preset ±." The in-wall keypad 1186, however, will not initiate source feature commands that the source is not capable of handling. The in-wall keypad 1186, which has a built-in infrared receiver, can also be operated by the hand-held infrared remote control 1190.

Sound signals produced by electronic source equipment are routed through the MCU 1100 to a multi-zone amplifier 1192 via an RCA patch cord 1193, and to stereo and mono speakers. For detailed information on a multi-zone amplifier which may be used to implement the illustrated amplifier 1192, reference may be made to U.S. patent application Ser. No. 07/819,087, entitled Multi-zone Audio Distribution System, filed on 9 Jan. 1992 and incorporated herein by reference. The stereo speakers 1194 in zone 1 of FIG. 11 are connected to the multi-zone amplifier 1192 using a four conductor, twisted pair 18 AWG cable 1196, and a mono speaker 1195 is connected to the multi-zone amplifier 1192 using a two conductor, twisted pair 18 AWG cable 1197.

In zone 2 of FIG. 11, wall-mounted volume controls are illustrated in conjunction with speakers 1181 and 1189. A stereo volume control 1183 provides a user with adjustable volume control for stereo speakers 1181. The cables 1187 and 1185, which are implemented using four conductor, twisted pair 18 AWG cables, are connected directly to the multi-zone amplifier 1192. Similarly, a mono volume control 1191 provides a user with adjustable volume control for the mono speaker 1189. The mono volume control 1191 is coupled between the multi-zone amplifier 1192 and the speaker 1189 using two conductor, twisted pair 18 AWG cables 1193 and 1199. The volume controls 1183 and 1191 may be implemented using models available from Russound/FMP, Inc. of Newmarket, N.H. 03857.

The audio source equipment 1127 can include such devices as a compact disc player, a receiver/tuner, and a cassette deck. The MCU 1100 is connected to a homeowner's existing audio source equipment 1127 via conventional RCA Patch Cord 1131. Control of the individual pieces of the audio source equipment 1127 may be achieved through close infrared coupling. Such infrared coupling may be supplied by an emitter wire 1133 which connects the MCU 1100 to infrared emitters 1120. The infrared emitters 1120 then couple to infrared receivers on the audio source equipment 1127 to operate the equipment. The infrared emitter 1120 may be implemented using model #282-00 type Mini Emitter manufactured by Video Link, Division of Xantech Corporation.

Because the audio source equipment 1120 is routed to the stereo speakers 1194 and 1181 via the MCU 1100, a homeowner in one zone can control audio source equipment in another zone using either the remote control 1190 or the inwall keypad 1186. For example, the homeowner can command "skiptrack" to a CD to replay a previous track without having to leave a zone in which the homeowner is located.

As with the audio source equipment 1127, a homeowner in one of the zones can control the doorbell equipment from within that zone. For example, if zone 2 encompasses a nursery where a baby may be sleeping, a homeowner may not want the doorbell to sound through the mono speaker 1189 in zone 2. The homeowner has the options of adjusting the mono volume control 1191 in zone 2 so that the sound in the mono speaker 1189 is inaudible, or muting the doorbell sound signals being transmitted from the doorbell 1148 to zone 2 by initiating a "do not disturb" command to the MCU 1100 using the remote control 1190 or the inwall keypad 1186 in zone 1.

The MCU

Figure 12:
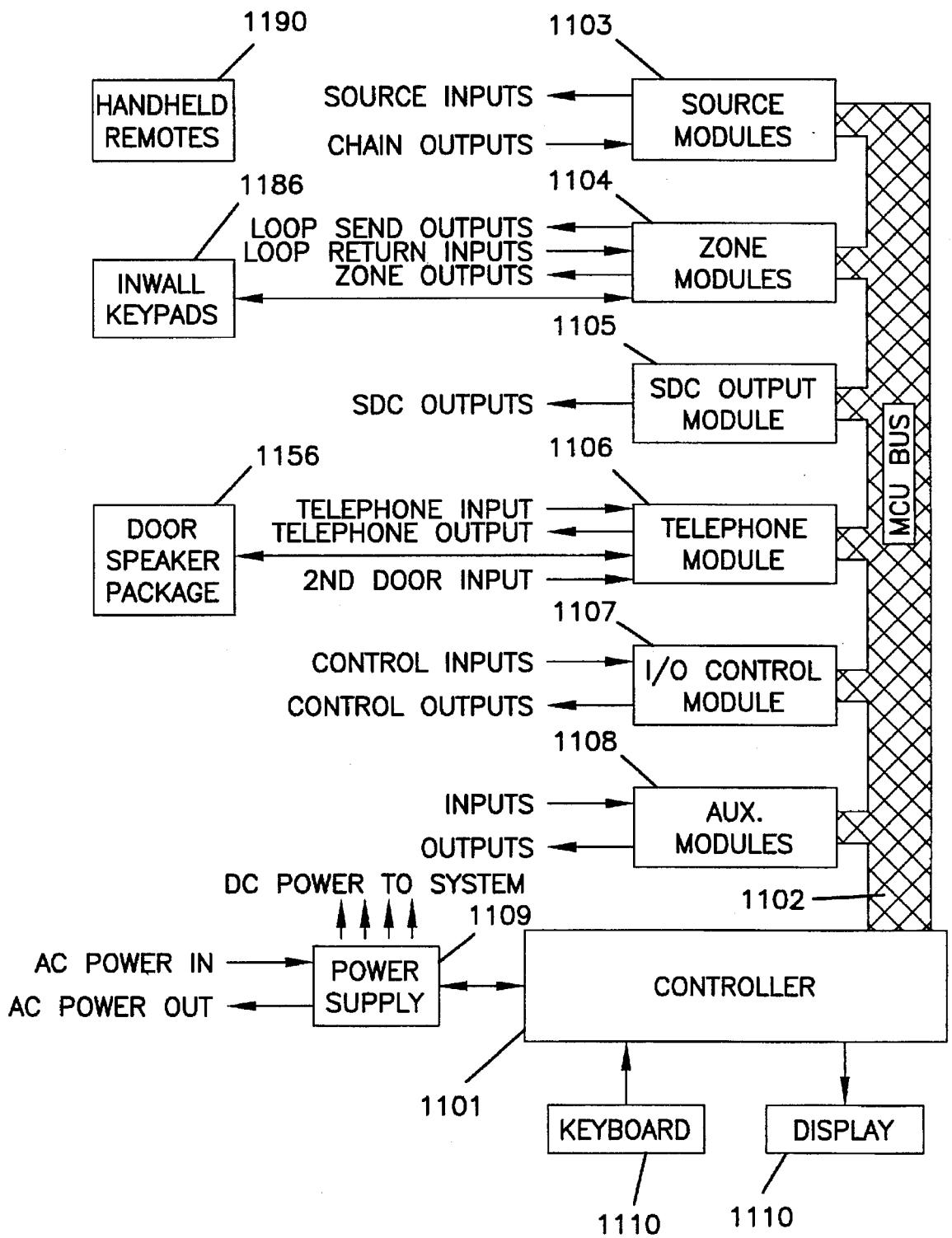
FIGS. 12–23b are diagrams showing, in expanded form, the operation of the master control unit portion of the system of FIG. 11 and its operation.

In FIG. 12, the Master Control Unit ("MCU") is shown to include a microcomputer (or controller) 1101 which serves as the central intelligence for the EDN system illustrated in FIG. 11. The controller 1101 is used to manage the control and user-interface requirements and to provide software-based flexibility to the signal controlling and routing MCU. The controller 1101 is designed to communicate over a bus-oriented MCU backplane (or MCU bus) 1102 with other MCU components using modular architecture. This facilitates hardware maintenance and increases hardware reliability.

The architecture of the MCU also permits a multitude of different external signals to be connected to the MCU, thereby providing a feature-packed system with high functional density. For example, one hundred, forty-four or more different external signals can be connected to, controlled by and routed through the MCU illustrated herein. The vast majority of these different external signals are carried from one of the MCU interface modules over the MCU bus 1102 and back out the same, or another, MCU interface module.

The MCU interface modules include source modules 1103, zone modules 1104, serial data control ("SDC" or "IR") output modules 1105, a telephone module 1106, an input/output (I/O) control module 1107 and auxiliary modules 1108.

The source modules 1103 provide inputs to the MCU for external audio sources. Depending on the manner in which they are connected, audio inputs are either routed through the source modules to the MCU bus or they are returned in a loop fashion as a chained output. The chained output arrangement is useful, for example, when desiring to repeat signals from one audio source to a surround sound processor in a home theater and simultaneously connect to the MCU bus 1102.

The zone modules 1104, as their name indicates, are used to transmit signals from the MCU bus 1102, or from loop return inputs, to the various zones within the EDN system. The zone modules 1104 also provide an interface to the system for the previously discussed hand-held remotes 1190 and inwall keypads 1186. The loop return inputs and loop send outputs are used for special effects within each zone, for example, equalization and reverb-type sound effects.

Similar to the zone modules 1104, the SDC output module 1105 is used to transmit control signals from the MCU bus 1102 to the various pieces of electronic equipment within the EDN system. Unlike the zone modules, however, the signals transmitted from the SDC output module 1105 are sent to infrared emitters for transmission from infrared emitters to infrared receivers, as previously discussed.

The telephone module 1106 provides the interface for: the home's telephones and external telephone line; and the door speaker package 1156. Each of these have been discussed in connection with FIG. 12.

The I/O control module 1107 is used for miscellaneous peripheral control, such as lights and appliance, via dry contact relay connections. As with the previously discussed modules, the interface provided by the I/O control module 1107 is controlled by the controller 1101 communicating therewith over the MCU bus 1102.

The auxiliary modules 1108 provide modular adaptability and flexibility to the MCU implementation. For example, using a conventional serial communication interface circuit and the MCU bus protocol (discussed separately, infra), the auxiliary module provides the additional hardware necessary to expand the EDN system by bringing all MCU backplane signals to the rear side of the MCU (FIG. 12c-2) for interface with additional modules. This is accomplished, for example, by replacing the first quad source module with an expansion module.

A serial interface type auxiliary module 1108 is used to virtually double the signal connection and processing capabilities of the system. This is accomplished by using the serial interface type auxiliary module 1108 in place of one of the modules 1106, 1107, 1108, which are installed in the three upper right (from a rear view) compartments of the MCU chassis of FIG. 12c-2. With one MCU 1100 programmed as the master MCU and another MCU 1100 programmed as the slave MCU, the EDN system operates using two MCUs, which is especially advantageous for larger facilities requiring more than 10 zones.

The MCU also includes a power supply 1109 having various power outputs dependent on a conventional residential AC power input.

Figure 12B:
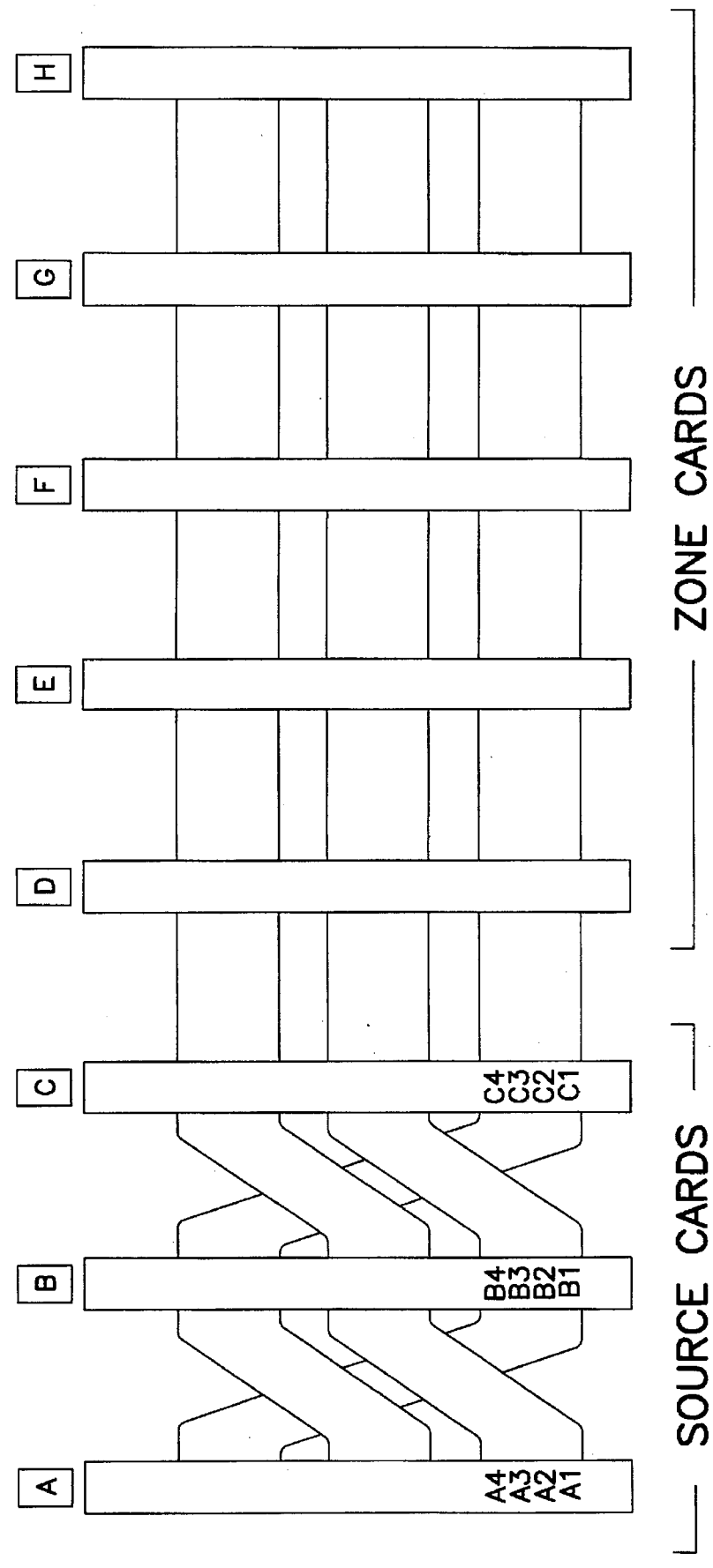
Figures 2, 12C:
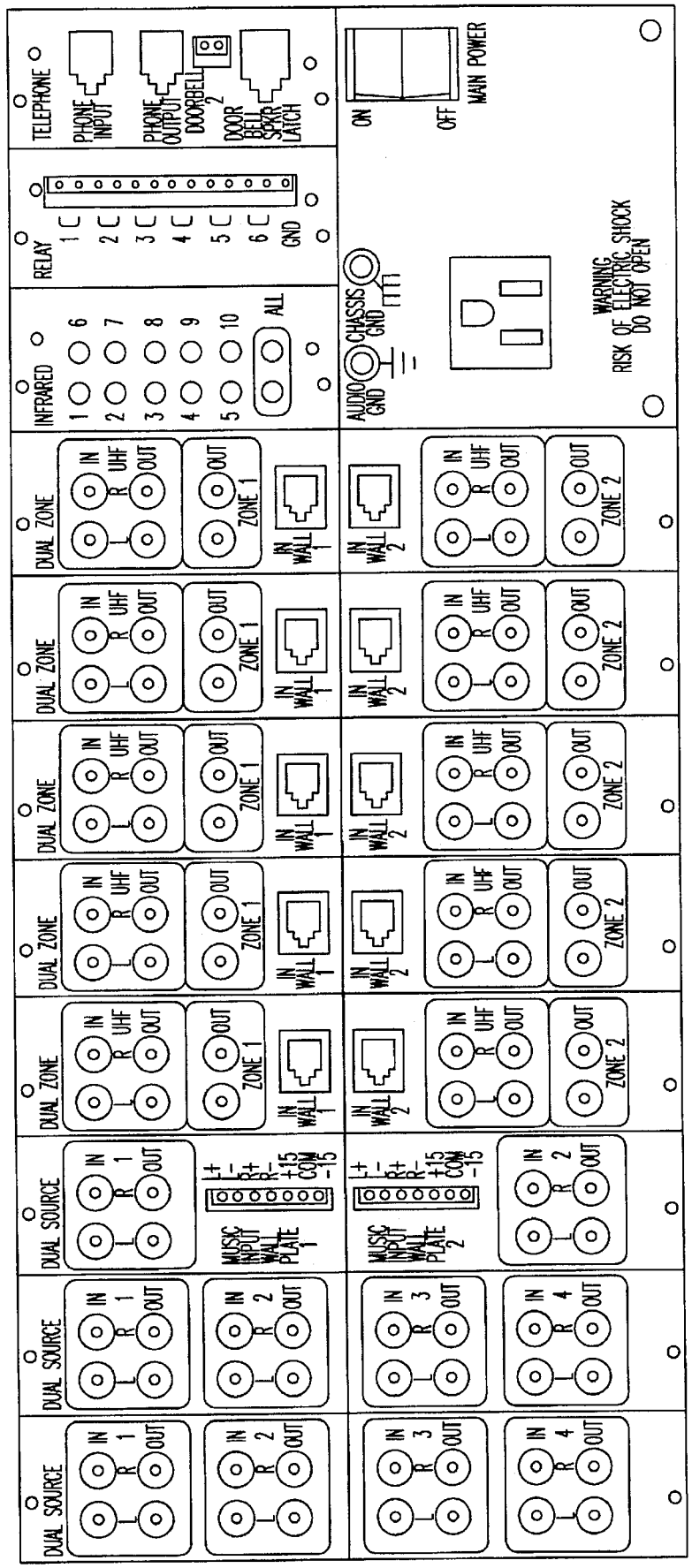

A keyboard and display 1110, which is illustrated in FIG. 12c-1, provides for programming the MCU and determining the status of the EDN system. The system is programmed as follows. First, a homeowner identifies zone locations within his/her home and the uses for each zone. The homeowner determines what type of rooms are in each zone and what zones will use page, telephone mute, or doorbell. The homeowner then assigns each zone a name and programs the features he/she wants to be available there. Next, the homeowner identifies source equipment to be used in the EDN system and programs these into the MCU. Also, the homeowner sets the paging, doorbell and audio volume levels in each zone. The volume levels are initially set at a factory default value, such as 30% volume. Finally, the homeowner establishes what low-voltage relay control features he/she wants included in the EDN system and how he/she will be using them. These features are then programmed into the MCU. For further information regarding a suitable method of programming and for general information regarding uses and operation of the inventive system described herein, reference may be made to "HD Installation Manual," Square D Company 1992, attached as appendix A and incorporated herein by reference.

The physical layout of the MCU is illustrated in FIG. 12a. The physical structure of the MCU includes several integral parts, including: the above-described MCU modules 1103–1108 of FIG. 12 (depicted as 1112 comprising tall and short modules); a chassis/power-supply/rear-power-panel 1113; a backplane 1114 which carries the signal bussing and power supply signals; and a front panel/display/keyboard/controller assembly 1115.

The chassis (chassis/power-supply/rear-power-panel) 1113 is the structural and electrical anchor of the MCU. The frame consists of extruded and machined aluminum and steel members. The front cavity of the chassis is partitioned by a solid plate. All high-speed digital circuitry is contained on the front panel assembly 1115, which is enclosed within this front cavity. The plate also supports the backplane 1114 and shields delicate audio signals in the rear of the MCU from digital noise.

All exposed metal surfaces and internal structural elements of the chassis are electrically connected to "safety ground," which is the third wire and ground prong of the AC line cord. Further, all potentially hazardous voltages are entirely contained within the power supply compartment. No MCU internal circuits contact or reference the chassis.

The power supply 1113a is located in a compartment in the lower right corner of the chassis (as viewed from the back, FIG. 12c-2). A switching power supply is preferred due to its high volumetric and energy conversion efficiency.

Four power supply voltages are furnished by the power supply, which also may include an "international" AC input. The supply outputs are connected to the rest of the system through a single cable harness which mates to the backplane.

The rear power panel 1113 covers the power supply compartment and includes an AC line cord, fuses, and ground posts. A "switched AC" outline is also located on this panel, operated by pair of power relays within the compartment, and governed by the controller under software through a dedicated line. The chassis ground and system ground are available at separate binding posts to allow maximum flexibility upon installation.

The backplane 1114 is the connecting point for the electronic elements of the MCU. No active circuitry is located on the backplane 1114; that is, the backplane 1114 is entirely passive. The backplane includes thirteen connectors: eight tall-slot receptacles (addressed A–H of FIG. 12b), three short-slot receptacles, the power supply connector, and the front panel connector. These modules are accessed via circuit board guide slots from the back of the MCU as shown in FIG. 12c-2.

MCU Bus

The signals on the MCU Bus may be divided into five groups: Power, Audio, IR, Control, and Auxiliary.

The MCU Bus has four power rails and three return rails available for use within the system.

DV+ (DIGITAL +5 V) This supply is used by digital logic circuits throughout the MCU. The return for DV+ is DGND. The maximum current available from DV+ is eight amps.

PV+ (POWER +12 V) This rail is provided for powering noisy logic or utility circuits. It also is used to power accessories outside the MCU chassis, such as Inwall Keypads. PV+ returns to PGND. The power supply can provide up to four amps of current on PV+.

AV+ (ANALOG +12 V) Analog +12 V is a quiet, linear-regulated supply rail for powering audio circuits in the MCU. One amp of current can be delivered on the AV+ rail.

AV– (ANALOG –12 V) This linear-regulated rail is the negative complement of AV+, and is also used to power audio circuitry. Current is available to minus one amp on this supply. AV+ and AV– return to AGND.

There are 26 audio channels present on the MCU bus including 24 channels provided for distributing SOURCE audio across the backplane. The remaining 2 channels carry SECONDARY audio signals through the system.

SA1 ... SA4 (SOURCE A1 ... A4) This group carries four stereo Source channels from the A module slot to the remaining "tall" modules in the chassis. On the backplane, each Source signal line is paired with a dedicated AGND line for shielding and to minimize crosstalk.

SB1 ... SB4 (SOURCE B1 ... B4) This group distributes the four stereo Source channels from the module B slot.

SC1 ... SC4 (SOURCE C1 ... C4) SC1 through SC4 carry the four stereo source channels from module slot C.

As shown in FIG. 12b, SOURCE signal bus positions "cross over" between slots B and C, and again between slots A and B. This is done so that standard quad or dual source modules can be plugged directly into any of these three slots without requiting hardware configuration. Standard source modules present their feeds to the same group of pins on each connector; the crossovers on the backplane direct the modules' signals to the appropriate source busses in the system. Note that it would be possible for a special high-density source module to feed eight, or even all twelve stereo source busses from any one of the three slots.

There are two secondary audio signals on the MCU bus. TNPG is a mono line that carries Tone, Paging, and other special audio signals across the backplane. TNPG is normally driven from slot K by the Special Function Module. All slots except slot I can access the TNPG bus.

MOH is a mono line intended to carry a "Music On Hold" signal from a selected source to the Special Function Module. Again, this bus is available to all slots in the chassis except slot I.

The MCU Bus includes eleven dedicated IR signal lines. These lines are intended to conduct IR signals from each zone to the IR Output Module (slot I).

IR1 ... IR10 (IR channels 1–10) These lines carry discrete signals bound for a single IR channel.

IRC (IR Common) This bus carries a mix of all IR signals, for use by "IR blasters" or other common-access devices.

The IR busses are normally driven by the zone modules in "open-collector" fashion; pullups are located on the IR module. All slots in the chassis have access to the IR signals except slots J and K. Thus, additional source cards can be implemented to provide integrated IR/audio connections.

THE MCU MODULES

Control of the MCU Modules

In total, there are three control networks available on the MCU Bus for communication with modules in the MCU chassis. First, there is the aforementioned SBX system which provides medium-speed synchronous bidirectional serial protocol. Second, an ICM system provides a low-speed asynchronous serial protocol. Third, there is a dedicated RESET line available for immediate shutdown of critical circuit elements during power-up and power-down.

The SBX (Serial Bus Exchange) system uses a five-line bus. The SBX bus is always controlled by a microcomputer located in the MCU front panel. All modules in the MCU have access to the SBX bus. Data may be sent to and received from a module simultaneously.

All SBX signals are carried on the bus in inverted ("buffered") form. A description of each SBX signal follows:

SCK (Serial Clock)—The serial clock is used to transfer information to and from modules in the system. Data transfer occurs on the rising edge of SCK. There are 24 SCK cycles in a standard SBX transaction.

ADS (Address/Data Select)—This line is used to signal a select phase of an SBX transaction to the modules in the MCU.

ENB (Enable)—The Enable line is used as a gate and/or strobe to activate a module's data transfer circuitry during a data phase of an SBX transaction.

SDO (Serial Data Out)—The controller's select and data information is passed from the controller to the modules over this line.

SDI (Serial Data In)—This line carries data from the modules to the controller. SDI is active only during the data phase of an SBX transaction.

There are sixteen addresses available in the MCU, which are encoded on the ID lines (ID0, ID1, ID2, ID3). Three ID lines (ID0, ID1, ID2) are presented from the MCU backplane to each physical module position, while the fourth ID signal (ID3) is hard-wired high or low on each card, depending on its size and type.

A standard SBX transaction consists of two phases: a select phase, and a data phase. The select phase begins with the ADS line going low. Four address bits are placed on the SDO line by the controller to select the physical address of a module targeted for this transaction. Since all SBX signals are carried on the MCU bus in inverted form, the address bits are passed through an inverter (e.g., 1221 of FIG. 12e). The other SBX signals are also passed through inverters, e.g., using a 74HC240 type integrated circuit chip.

The following table lists the addresses currently allocated in the MCU:

| Address | Slot | Size | SBX | ICM | Description |
| --- | --- | --- | --- | --- | --- |
| 0 | A | Tall | | | Reserved (Sources A1 . . . A4) |
| 1 | B | Tall | | | Reserved (Sources B1 . . . B4) |
| 2 | C | Tall | | | Reserved (Sources C1 . . . C4) |
| 3 | D | Tall | X | | Dual Zone Module (Zones 1/2) |
| 4 | E | Tall | X | | Dual Zone Module (Zones 3/4) |
| 5 | F | Tall | X | | Dual Zone Module (Zones 5/6) |
| 6 | G | Tall | X | | Dual Zone Module (Zones 7/8) |
| 7 | H | Tall | X | | Dual Zone Module (Zones 9/10) |
| 8 | A | Tall | | | Reserved (Expansion Link Card) |
| 9 | B | Tall | | | Reserved |
| A | C | Tall | | | Reserved |
| B | D | Tall | | | Reserved |
| C | I | Shrt | X | X | IR Control Module |
| D | J | Shrt | X | | Relay Control Module |
| E | K | Shrt | X | | Special Function Module |
| F | H | Tall | | | Reserved |

Figure 12D:
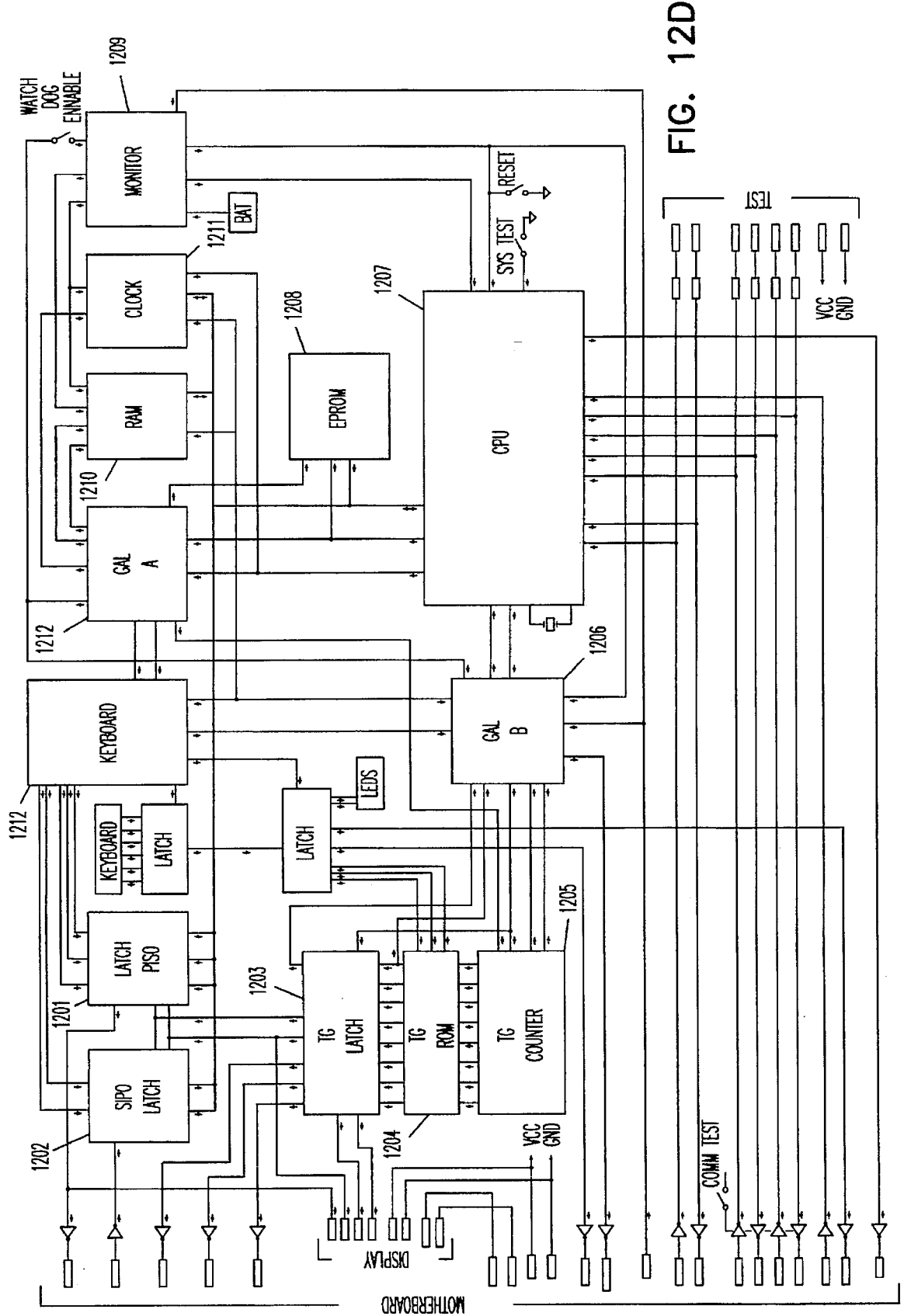
Figure 12E:
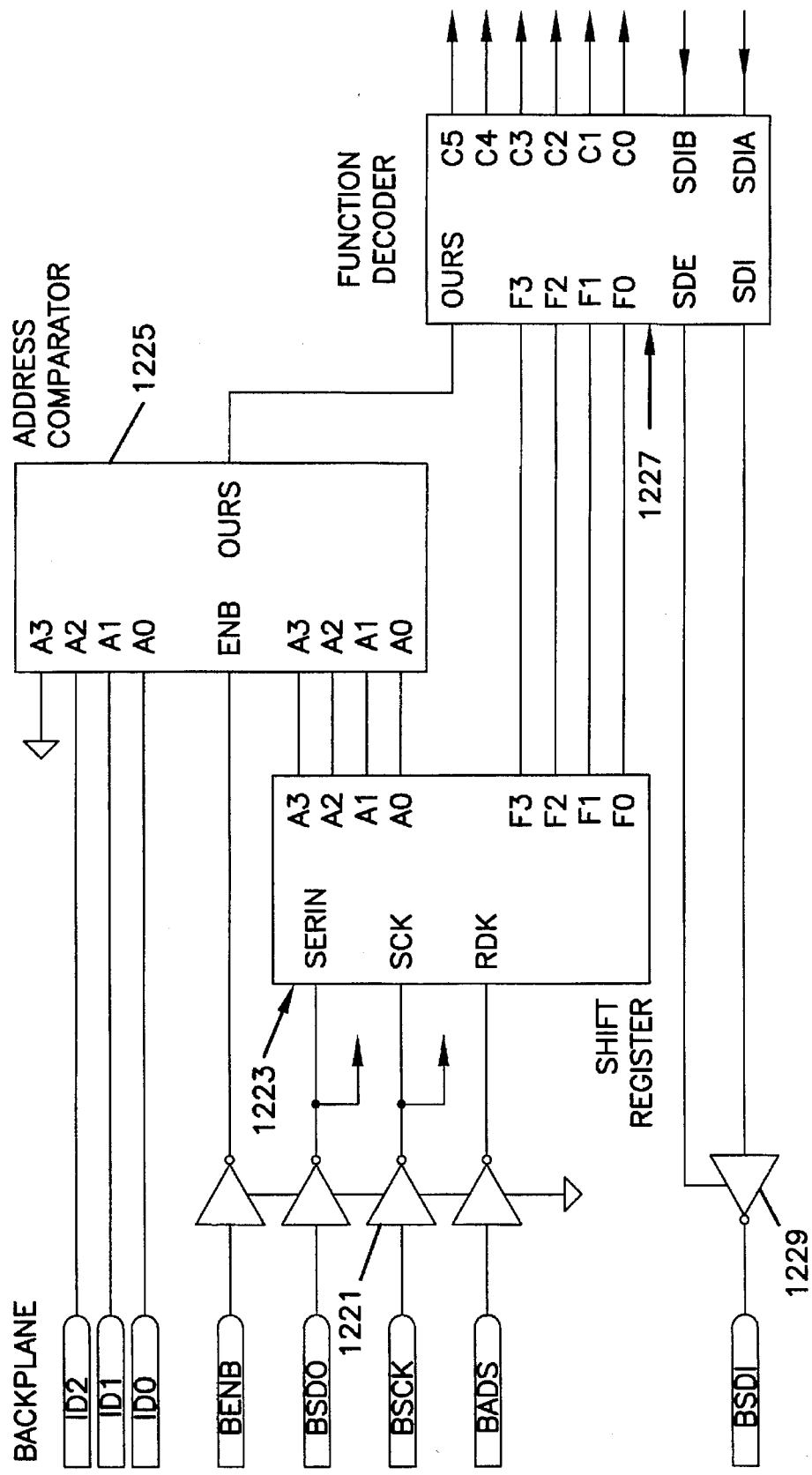
Figure 12F:
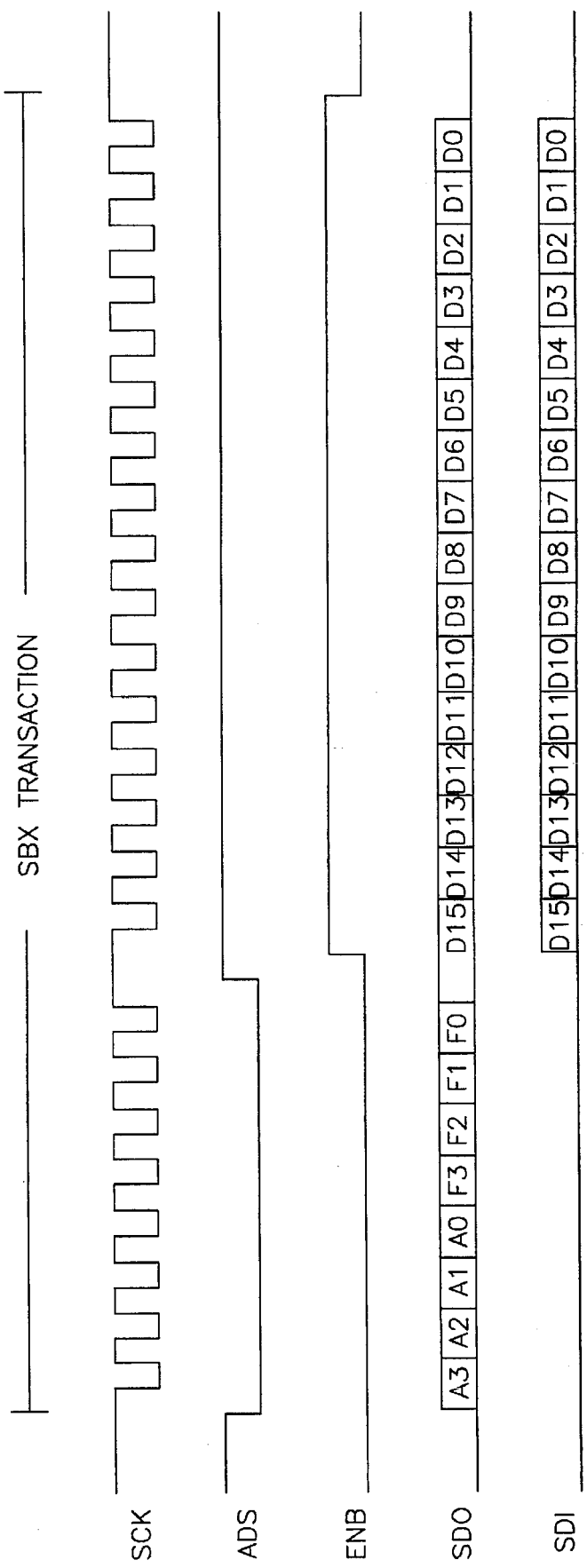

FIG. 12e shows a typical SBX interface circuit used on each MCU module to interface with the SBX bus, and FIG. 12f shows an accompanying timing diagram for the SBX control signals sent through the SBX interface circuit.

Referring to FIGS. 12e and 12f, the address bits are passed from inverters 1221 to a shift register 1223, e.g., using a 74HC595 chip, in response to ADS going low. After four clock cycles on the SCK line, the four address bits are presented to the inputs A3 . . . A0 of an address comparator 1225, such as a 74HC85 chip. On each module, the four ID signals are compared to the four address bits sent by the controller. If a match is found by comparing the four ID signals to the four address bits, that module is then activated for the remainder of the transaction. The selected module is activated by an OURS signal presented from the address comparator 1225 to a function decoder 1227, such as a 74HC85 chip. Modules which do not match the address sent by the controller ignore the rest of the transaction.

The next four bits sent by the controller via the SDO line are function bits which select the desired function on the targeted module. The function bits are passed through the shift register 1223 during the next four clock cycles on the SCK line, and are presented to the inputs F3 . . . F0 of the function decoder 1227. After the address and function bits have been sent, ADS goes high and the select phase is complete.

The data phase starts when ENB goes high. Sixteen bits of data are then transferred from the controller to the targeted module on the SDO line. The data transfer takes place by routing the data through the inverter 1221, through the shift register 1223, and finally to the function decoder 1227. Simultaneously, 16 bits of data may be placed on SDI by the module to be returned to the controller. Returned data is routed through the function decoder 1227 and an inverter 1229 to the controller. The inverter 1229 may be implemented using a 74HC240 chip. After the data has been transferred, ENB falls, which concludes the data phase of the transaction.

The timing of the control signals SCK, ADS and ENB fed into the SBX interface circuit is determined by an SBX timing generator shown in FIG. 12g. These control signals SCK, ADS and ENB along with other control signals are shown at the output of an octal D flip-flop chip 1214, which latches control words sequentially provided by memory lookup ROM 1215. The protocol desired is selected by high-order address lines TA8, TA9 and TA10. The individual control words are accessed by eight low-order address bits generated by a synchronous counter (two cascaded four-bit type 74HC163 chips). Counter operation is controlled by line RCO, which originates at gate array logic chip 1218.

The ICM or Intercom system is provided as an alternate method of communication between the controller and other elements in the MCU. The ICM system operates at 9600 baud, with 8 data bits, 1 stop bit, and no parity. The ICM system operates over two lines on the MCU backplane. All module slots in the MCU have access to these ICM system lines.

Although the SBX and ICM systems are independent, modules use the same address for both SBX and ICM communications. An ICM transaction consists of a command message on an intercom transmit (TXI) bus originating at the controller, followed by a response message on an intercom receive (RXI) bus from a target module. TXI carries command messages from the controller to the modules, and RXI provides a return path for response messages from the modules back to the controller. Only one module may respond on the RXI bus at a time.

All ICM command messages begin with an address character, followed by a function character, optionally followed by one or more argument characters. Command messages end with a carriage return.

After receiving a command message, the selected module must return a response message to the controller. A response message consists of the address character, followed by a status character, optionally followed by one or more value characters. Response messages also terminate with a carriage return.

For both the SBX system and the ICM system, there are sixteen addresses available in the MCU, as determined by the ID lines (ID0, ID1, ID2, ID3). On the module, these four previously discussed ID signals are compared against the address sent by the controller during an SBX or ICM transaction. If a match is found, that module is then activated for the remainder of the transaction. Modules which do not match the address sent by the controller ignore the rest of the transaction.

Some modules, such as the dual zone module, must support multiple channels within a single address. In this case, the most significant bit(s) of the function code acts as a "sub-address" to select the desired channel.

Finally, the RESET line is provided to all modules for use as a "shutdown" warning during power-up and power-down transitions. The modules use this signal to activate mute relays, to reset slave controllers, and to inform other important circuits that the MCU's normal power and control signals may be invalid.

FIG. 12d illustrates the controller 1101 of FIG. 12 in expanded form, with the SBX signals shown as the first five bus signals at the upper left of FIG. 12d. At the top, the SDO and SDI signals are respectively shown being generated and received by a PISO (parallel-in-serial-out) latch 1201 and a SIPO (serial-in-parallel-out) latch 1202. These latches are implemented using conventional converters. For example, the SIPO (serial-in-parallel-out) latch 1202 can be implemented using a pair of cascaded 74HC595 type chips translating the serial input data to 16 parallel output bits, and the PISO (parallel-in-serial-out) latch 1201 can be implemented in a similar fashion using three cascaded 74HCT597 type chips translating the 24 parallel output bits (4 address bits, 4 function bits and 16 bits of data) to the SDO serial data stream.

The serial clock (SCK), address/data select (ADS) and enable (ENB), located just below the SDO and SDI signals, are outputs generated by a timing generator circuit, which includes a timing generator latch 1203, a timing generator ROM 1204 (acting as a look-up code map) and a timing generator counter 1205. Responsive to a gate array logic chip 1206 such as a GAL16V8A manufactured by Lattise, the timing generator counter 1205 controls the address lines at the input of the timing generator ROM 1204 so that the appropriate signals appear on the serial clock (SCK), address/data select (ADS) and enable (ENB) leads in accordance with the timing protocol illustrated in FIG. 12f. In a like manner, the timing generator latch 1203 generates the control for the display of FIGS. 23a and 23b.

At the heart of the controller is the CPU 1207, which may be implemented using an 8-bit microcomputer such as a Hitachi HD64180 type microcomputer running at about 18.4 Mhz. Supporting the CPU 1207 are the program memory in EPROM 1208, a watchdog monitor circuit 1209 for maintaining controller sanity, and read-write memory CRAM) 1210. A clock circuit 1211, using for example a 72421 type chip, is used in conjunction with a decoding circuit 1212 such as a GAL16V8A manufactured by Lattise, for making the current date and time of day available to the operating system firmware.

Auxiliary

A second full serial port is provided in the MCU, dedicated to interfacing the system to an outside device such as a personal computer or modem. Six signal lines are brought from the controller to pins at slots J and K for the auxiliary port. They are:

TXD (Transmit Data) This line carries data from the controller to the auxiliary device.

RXD (Receive Data) RXD is a data line from the auxiliary device to the controller.

CTS (Clear to Send) CTS is a status line, allowing the auxiliary device to notify the controller that it is ready to accept data.

RTS (Request to Send) The controller asserts this status line to signal the auxiliary device that it is prepared to accept data.

DTR (Data Terminal Ready) The controller activates this status line to indicate the auxiliary device that is present.

DCD (Data Control Carrier Detect) If the auxiliary device is a modem, the DCD status line will be asserted while the communications link is good, i.e., "carrier" is present.

The software protocol for the auxiliary port includes automated testing, linking to a full screen menu-driven installation software package running on a laptop computer, and linking to a graphical user interface software package running under Windows or the Mac for deluxe home control. In addition, the auxiliary port is capable of linking with an internal or external modem to provide "dial-up" control and monitoring and other home electronics network products, third-party supervisors, slaves, etc.

Source Modules

Quad Source Modules

A quad source module may be added to the MCU to provide four source input capability per module. Each module accepts line level audio inputs from up to four sources, and provides source loop outputs to route signals to other devices.

Figure 13:
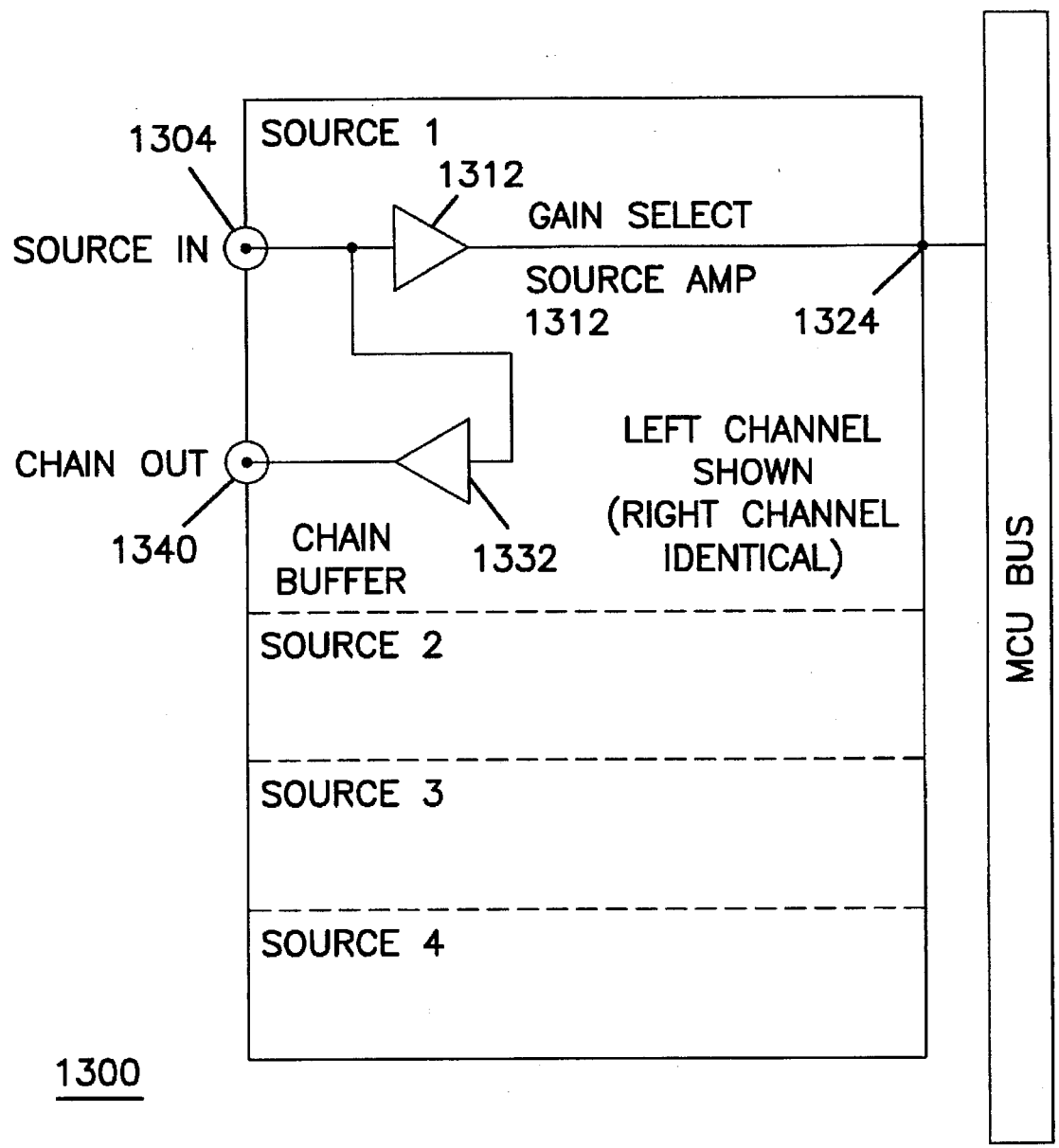

Referring to FIG. 13, there is shown a quad source module generally designated by the reference numeral 1300. Circuitry for each of four possible sources is identical, and circuitry for a right channel of a source is the same as circuitry for a left channel of the source. Therefore, only the left channel circuitry is illustrated in FIG. 13.

The left channel of a source connects to a left channel source input 1304 of the quad source module 1300, and the source input 1304 is connected to a source amplifier 1312 with adjustable gain. The source amplifier 1312 is implemented using conventional operational amplifier circuitry. The gain for the amplifier 1312 is set by hard-wired jumpers to +3 Db, 0 or −3 Db gain. An amplified signal is then routed from the source amplifier 1312 to the MCU bus, where the signal is available for use by other modules connected to the MCU bus.

In addition to being amplified and routed to the MCU bus, a signal entering the source input 1304 can be routed to other electronic devices. The signal is routed to a chain buffer 1332, implemented using a conventional operational amplifier circuit. The chain buffer 1332 is a unity-gain amplifier, so that the input of the chain buffer 1332 draws negligible current and power from the source signal, while the output supplies reasonable current and power to an electronic device connected to a chain output 1340. After passing through the chain buffer 1332, the signal is looped out of the quad source module 1300 at the chain output 1340.

Dual Source Modules

Dual source modules may be added to the MCU to provide input capability for two sources located in areas distant from the MCU. Each dual source module accepts line level audio inputs or twisted pair stereo inputs from two sources, and provides source loop outputs to route signals to other devices.

Figure 14:
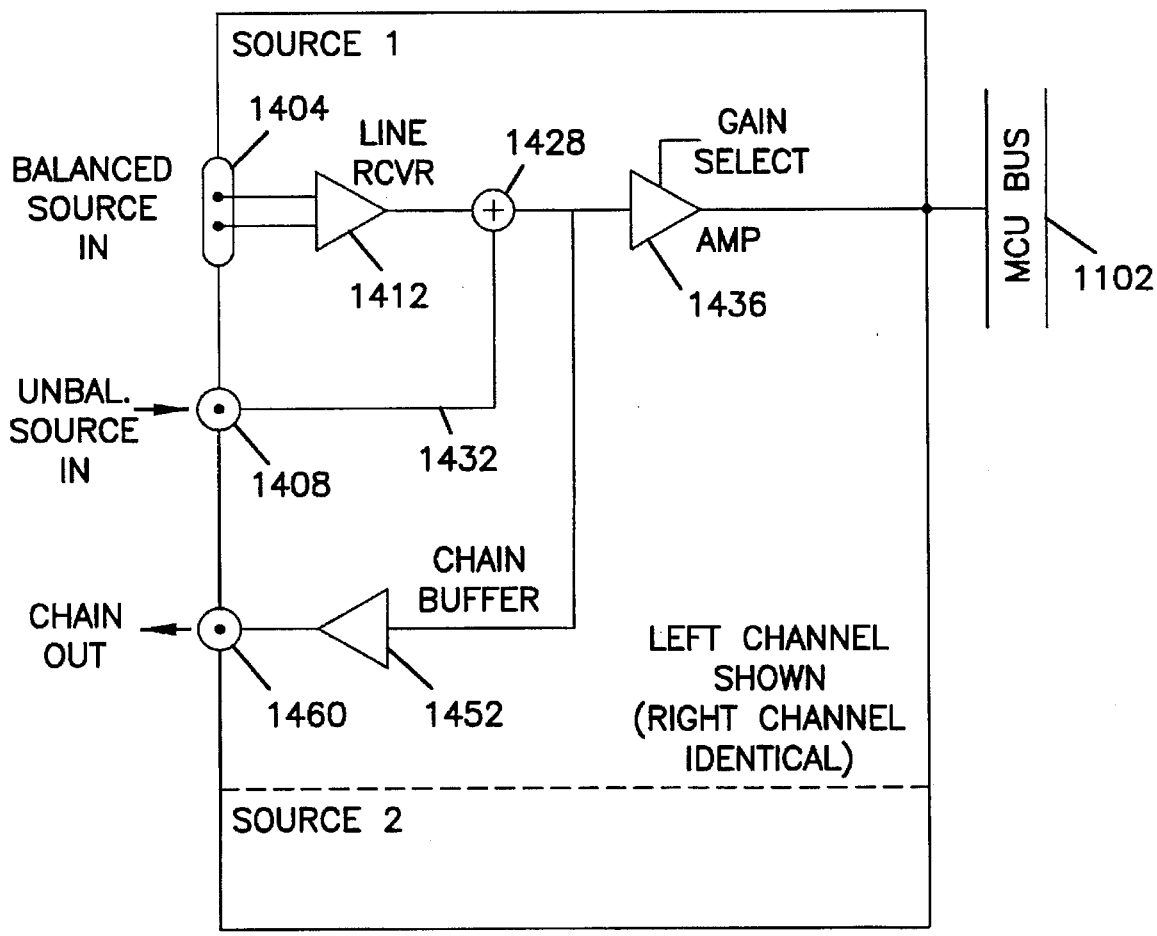

Referring to FIG. 14, there is shown a dual source module generally designated by the reference numeral 1400. Circuitry for each of two possible sources is identical, and circuitry for a right channel of a source is the same as circuitry for a left channel. Therefore, only the left channel circuitry is illustrated in FIG. 14.

A left channel of a source connects to either a left channel balanced source input 1404 or a left channel unbalanced source input 1408, depending on the type of connection line extending from the source to the dual source module. A twisted pair stereo line connects to the balanced source input 1404, while a line level audio connector couples to the unbalanced source input 1408.

The signals from a twisted pair stereo line are fed into a line receiver 1412 for filtering and converting the signals to a single line 1422. The signal is routed through a summer 1428, where the signal is added to any signal along a line 1432. Since no signal is being received at the unbalanced source input 1408, the signal along the line 1422 is unchanged by the summer 1428 and is routed to a source amplifier 1436 with adjustable gain. The source amplifier 1436 is implemented using conventional operational amplifier circuitry. The gain for the amplifier 1436 is set by hard-wired jumpers to +3 Db, 0 or −3 Db gain. The signal is then routed from the source amplifier 1436 to the MCU bus, where the signal is available for use by other modules connected to the MCU bus.

Alternatively, the dual source module 1400 accepts line level audio inputs at unbalanced source inputs. A signal received by the unbalanced source input 1408 is routed to the summer 1428, where the signal is added to any signal along the line 1422. Since no signal is being received at the balanced source input 1404, the signal sent through the unbalanced source input 1408 is unchanged by the summer 1428 and is routed to the source amplifier 1436. Finally, the signal is routed to the MCU bus, where it is available for use by other modules connected to the MCU bus.

In addition to being routed to the MCU bus, a signal entering the balanced source input 1404 or the unbalanced source input 1408 can be routed to other electronic devices. After passing through the summer 1428, the signal is routed to a chain buffer 1452. The chain buffer 1452 is a unity-gain amplifier, so that the input of the chain buffer 1452 draws negligible current and power from the source signal, while the output supplies reasonable current and power to an electronic device connected to a chain output 1460. After passing through the chain buffer 1452, the signal is looped out of the dual source module 1400 at the chain output 1460.

Dual Zone Modules

Each dual zone module sends pre-amp signal levels to amplifiers for two zones. It offers a loop-through needed for any type of signal processing desired, and it receives control signals from inwall keypads for control of zone and source functions. The dual zone modules provide independent remote control in each zone for a multitude of functions. Remote control in each zone is achieved by interfacing the zone modules with inwall keypads. Also, the zone modules provide a transparent channel from an inwall keypad in one zone to a source emitter in the same or another zone for infrared control of individual source components.

A dual zone module supports all processing needed for two zones in the MCU system. Circuit groups on this module include power, audio, inwall/IR, and control.

Power

The dual zone module uses power from all four supply rails of the MCU bus. Separate analog and digital power networks extend across the module. Local regulators provide each zone with isolated VDD/VEE power for the active analog circuits, which preferably use CMOS technology.

Audio

Figure 15:
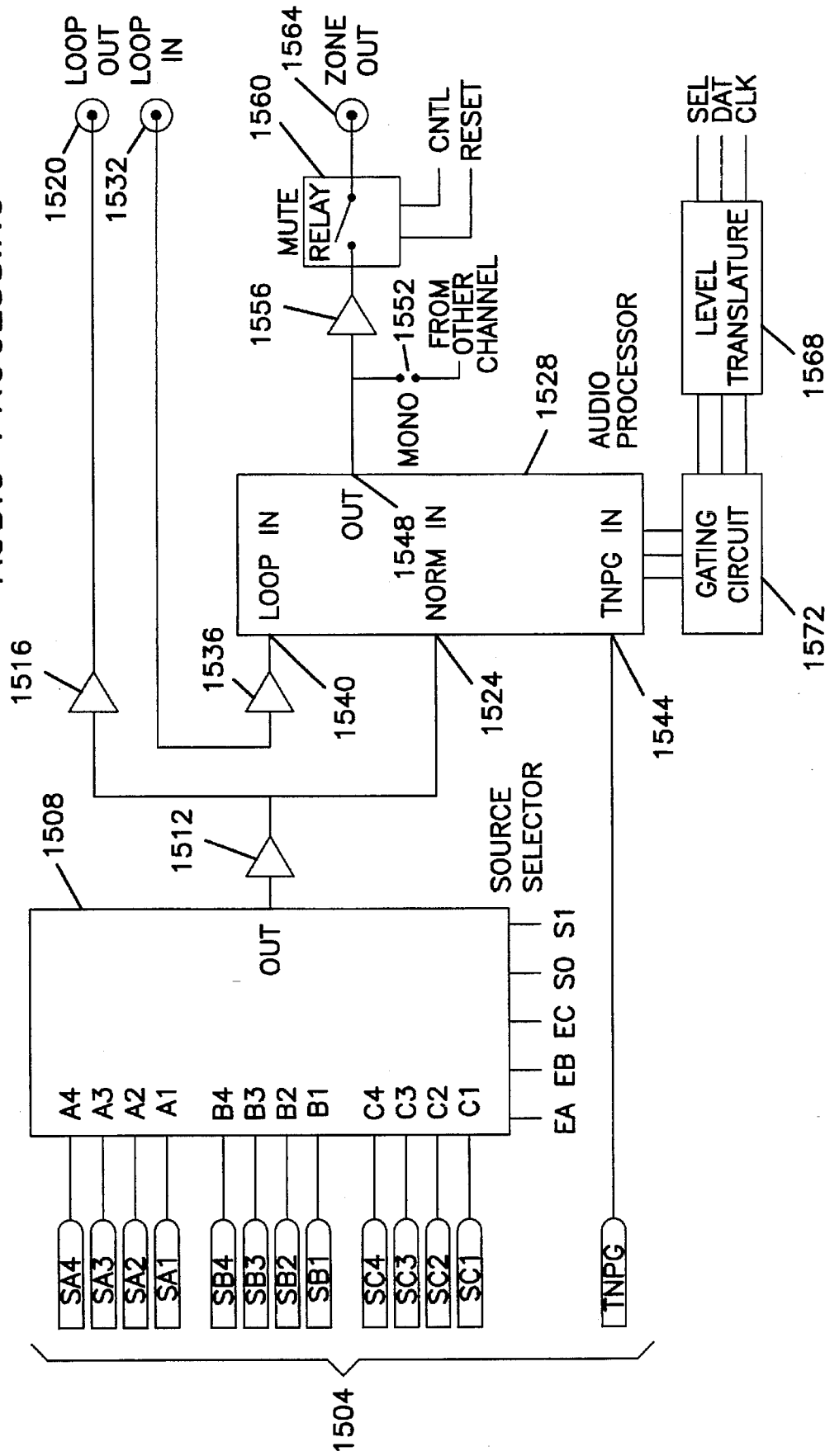

FIG. 15 illustrates, by block diagram, audio signal flow for one channel of one zone. The audio signal flow for the other channel is identical. The audio processing circuitry is coupled to the SBX interface for achieving control over the circuitry.

Twelve source busses are presented from a backplane connector 1504 to a source selector 1508, which selects one of ten possible sources in the zone. The output of the source selector 1508 is buffered by a conventional buffer 1512, such as a NE5532 type chip, and then fed through a conventional driver 1516, such as a NE5532 chip, to a LOOP OUT jack 1520 on the rear panel of the MCU. The selected source is also presented to a NORM IN port 1524 of an audio processor 1528. The audio processor 1528 may be implemented using a LMC1992 chip available from National Semiconductor.

A LOOP IN jack 1532 on the rear panel feeds a buffer 1536, such as a NE5532 chip. This signal is then routed to a LOOP IN port 1540 of the audio processor 1528. The TNPG bus from the backplane connector 1504 is taken directly to a TNPG IN port 1544 of the audio processor 1528.

The audio processor 1528 selects either the LOOP IN port 1540, the NORM IN port 1524, or the TNPG IN port 1544 for processing. Volume, bass and treble control are applied to the selected signal, and the final output is presented at an OUT port. A conventional mono jumper 1552 may be installed to mix in the output of the other channel's audio processor for a mono output. Note that two jumpers are installed for mono outputs from both ZONE OUT jacks.

The OUT signal from the audio processor 1528 is fed through a driver 1556, such as a NE5532 chip, and then appears at the normally-closed contact of a solenoid-driven mute relay 1560. The relay 1560 is ON during normal operation. The common terminal of the mute relay 1560 is connected to a ZONE OUT jack 1564 on the rear panel.

Control paths dedicated to control of the audio circuitry in FIG. 15 are coupled between the SBX interface and the audio circuitry as follows. Five control output lines from the SBX interface are routed to the source selector 1508. Three lines (EA, EB, EC) select the source group; the other two lines (S0, S1) select one of the four channels within the group.

Three control lines (SEL, DAT, CLK) are provided from the SBX interface for operating the audio processor 1528. These lines provide volume, bass and treble control for audio signals sent to each zone controlled by the dual zone module. Moreover, the three lines control the audio processor 1528 so as to provide doorbell-over-page, page-over-music priority for each zone, independent of any volume control setting. Also, a Do Not Disturb feature selectable from an inwall keypad or hand held remote control allows uninterrupted music in a zone by disabling page, doorbell, and telephone music mute functions in the zone.

The lines SEL, DAT and CLK are buffered by a conventional level translator 1568 which converts the 0 ... +5 V logic signals to the −6 V ... 0 V levels required by the audio processor chip. The signals are also gated by a gating circuit 1572 to prevent excessive noise from being generated in the audio processor 1528 while transactions not addressed to it are occurring. The gating circuit 1572 may be implemented using a 74HC132 chip.

The output mute relay 1560 is locally controlled by one output line (CNTL) from the SBX interface. The CNTL line provides mute control for each zone. The MCU Bus RESET line is also taken to the mute relay 1560, so that the mute relay 1560 will operate immediately during MCU power transitions.

Inwall/IR Block

Figure 16:
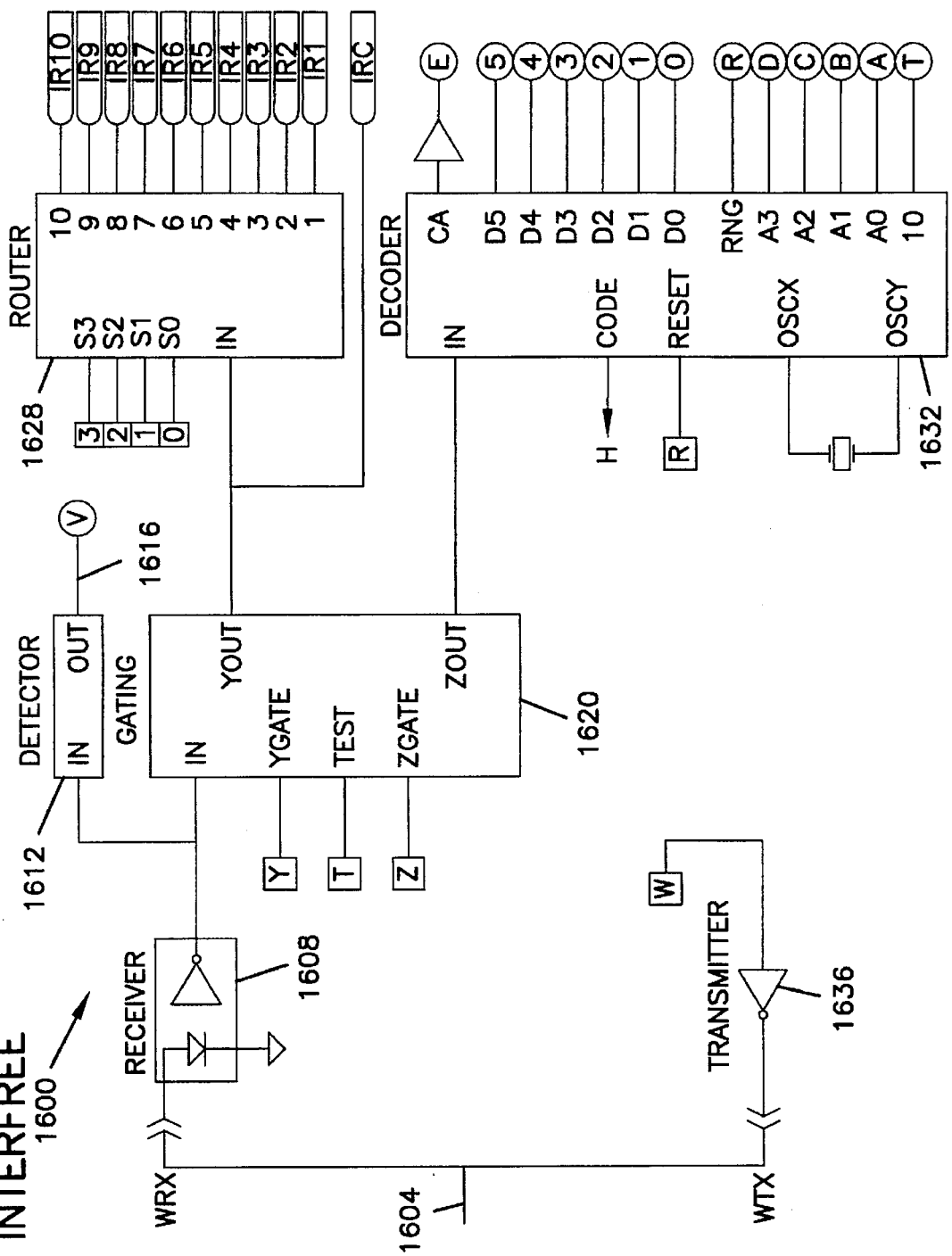

This section describes the circuits which process signals at an INWALL jack on the rear panel of the dual zone module. A block diagram of the circuitry of an inwall/IR block 1600 for one zone is shown in FIG. 16. The inwall/IR block 1600 is coupled to the SBX interface.

Referring to FIG. 16, signal points shown as a single character within a circle are read by the controller using the SBX system. Points shown as a signal character within a square are signals which are written by the controller over the SBX system. A complete description of these signals will be given below.

All Inwall and IR signals received from the INWALL jack 1604 are routed to an optically-coupled receiver 1608, such as a H11L1 chip. The output of the receiver 1608 is passed to a conventional detector 1612 which stretches received pulses, allowing the controller to sense IR activity on a V line 1616.

The receiver output also goes to a gating circuit 1620, which may be implemented with a 74HC132 chip. The gating circuit 1620 has two outputs. First, an output YOUT is gated by a YGATE input signal. YOUT flows to an input of a router 1628, which can place the signal on one of ten outputs, under the control of signals 3 ... 0. The router 1628 is implemented with a 74HC154 type chip. These router outputs are then connected to IR1 ... IR10 busses on the MCU backplane. The YOUT signal also bypasses the router 1628 for coupling to an IRC bus on the backplane.

Second, the gating circuit's ZOUT signal is gated by a ZGATE input signal, and can also be independently modulated by ZTEST. ZOUT passes to a decoder 1632, a specialpurpose IC which recognizes and decodes incoming commands. The decoder 1632 is implemented with a SAA3049 type chip. The decoder 1632 has its own 4 MHz crystal oscillator implemented at pins OSCX and OSCY, and can be RESET by the controller. The decoder 1632 has thirteen outputs available to be read by the controller.

The data stream which operates the Inwall display is modulated directly on the W line by the controller. This signal is buffered by a conventional transmitter 1636, then routed to the INWALL jack 1604 on the rear panel of the module.

Control paths dedicated to control of the inwall/IR block 1600 in FIG. 16 are coupled between the SBX interface and the inwall/IR block 1600 as follows. Five control outputs and fourteen control inputs are dedicated to control of the inwall/IR block 1600. They are:

3,2,1,0 (IRB3, IRB2, IRB1, IRB0) These four output lines select the MCU Bus IR line to which received IR signals will be directed.

Y (YGATE) This output prevents or allows received IR signals from reaching both the IRC line and the IR output router 1628.

Z (ZGATE) This output can be set to block received IR signals from reaching the decoder 1632.

T (ZTEST) This line can be modulated to allow the controller to test the operation of the decoder 1632.

R (RSTE) The decoder 1632 is reset when the controller asserts this line.

W (WALL) This line carries the signal generated by the controller to set the status indicators on the inwall keypad.

V (ACTV) ACTV is an input line which the controller checks to monitor IR activity in the zone.

E (IRCA) This input line allows the decoder 1628 to signal the controller that a command has been received.

5,4,3,2,1 (IRD5, IRD4, IRD3, IRD2, IRD1, IRD0) These six lines reflect the "data" portion of the last command received.

R,D,C,B,A (IRNG, IRA3, IRA2, IRA1, IRD0) These input lines allow the controller to determine the "range" and "address" of the most recently decoded command.

T (IRTO) This line shows the status of the "toggle" bit of the last command received from the zone.

Control

Figure 17:
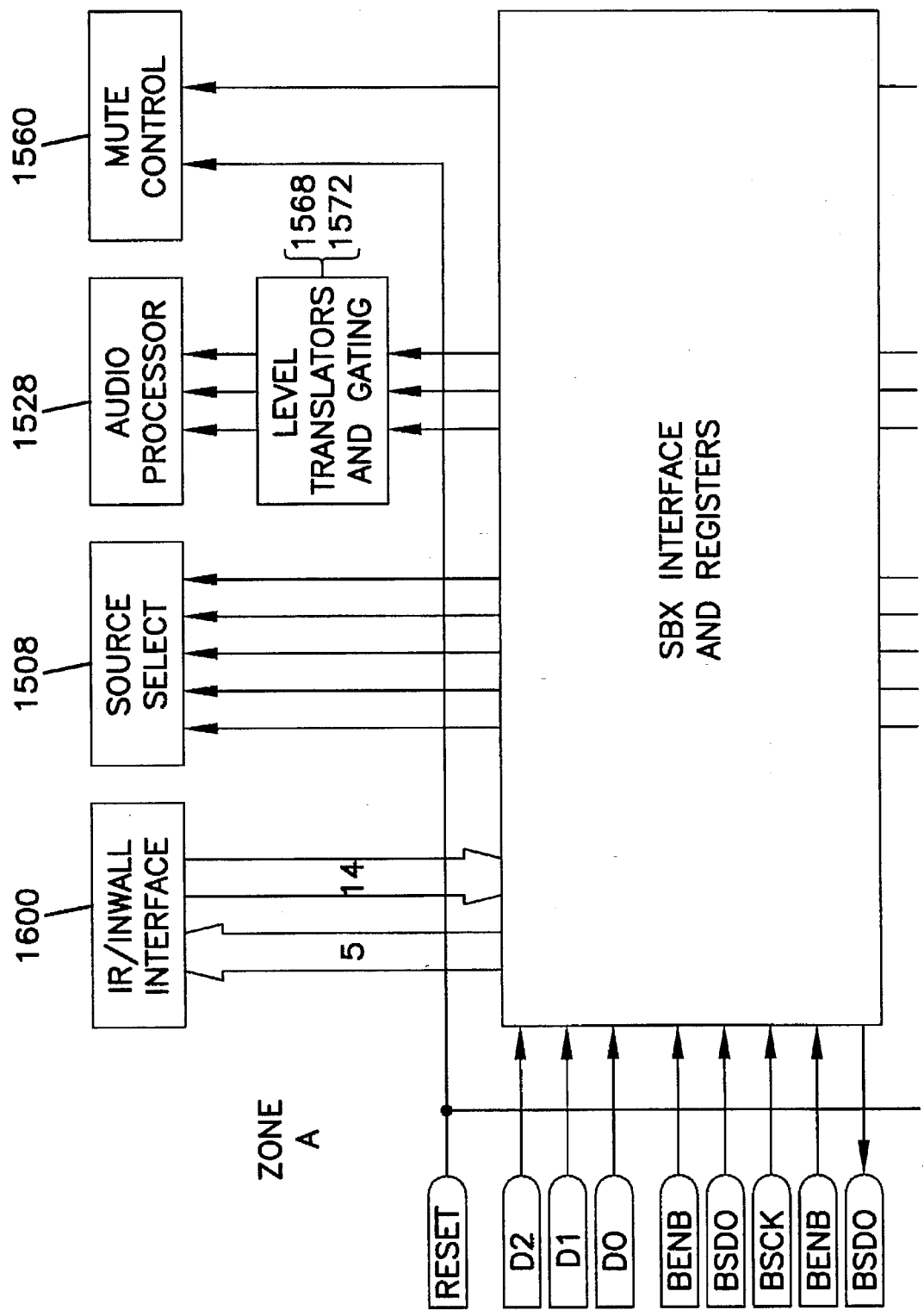

A block diagram showing the control paths on the dual zone output module appears in FIG. 17. A typical circuit for the SBX interface and registers is shown in greater detail in FIG. 22. Details are shown in FIG. 17 for Zone A only; Zone B shares the SBX interface, but is otherwise identical.

As previously stated, five control outputs and fourteen control inputs are dedicated to control of the IR/inwall block 1600. Five output lines are routed to the source selector 1508. Three control lines are provided for operating the audio processor 1528, these lines being buffered and gated by the level translators and gating circuit 1568 and 1572. Finally, the mute relay 1560 is locally controlled by one output line from the SBX interface, and the MCU bus RESET line is also taken to the mute relay 1560.

IR Output Module

An infrared output module connects to emitters delivering IR signaling from the MCU to a user's source equipment. The module provides dedicated remote control IR signals for up to 10 source miniature IR emitters via 3.5 mm phone jack outputs, and supplies the DC power required for the IR emitters. To accommodate duplicate source codes for similar equipment, the infrared output module steers IR commands to the appropriate source emitter only. Auxiliary emitter positions on the module sum the IR commands for all sources, and may be used with roomwide emitters instead of individual source emitters.

Figure 18:
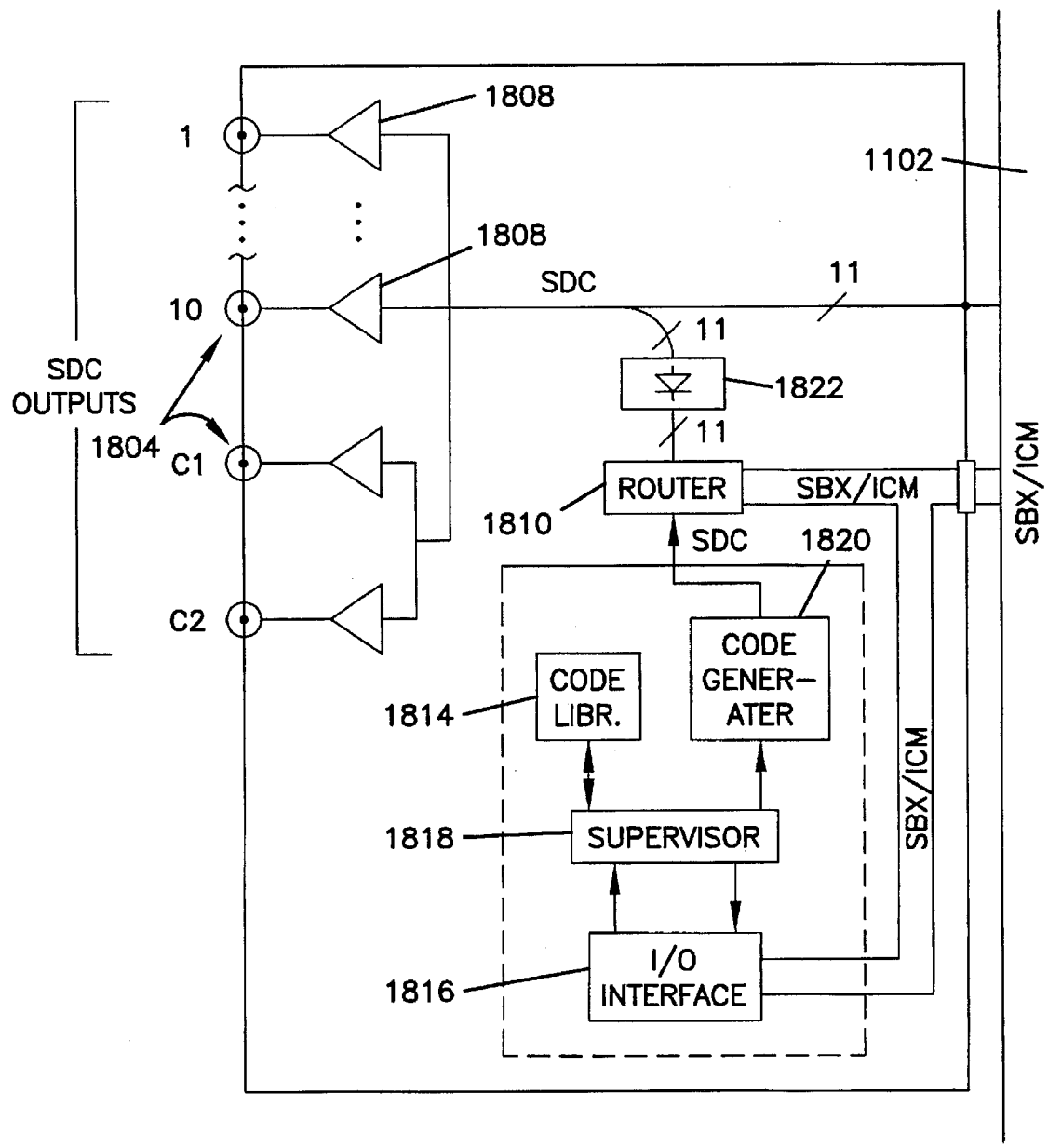

Referring now to FIG. 18, the SDC (or IR) output module is shown in expanded form providing ten SDC control outputs 1804 at phone jack outputs on the IR output module. The SDC control outputs 1804, which are driven by conventional transistor-based amplifiers 1808, are control signals for up to ten IR emitters connected to the SDC outputs 1 ... 10. SDC outputs C1 and C2 are auxiliary outputs which sum the IR commands for all sources, and may be used with roomwide emitters for IR blast control of a rack of source equipment.

At the MCU bus 1102, there are eleven corresponding dedicated IR signal lines which are intended to conduct IR signals from each zone to the IR output module. The IR signal lines are: IR1 ... IR10 (IR channels 1–10) which carry discrete signals bound for a single IR channel; and IRC (IR Common) which carries a mix of all IR signals, for use by "IR blasters" or other common-access devices.

There are two ways in which a user can send a command to a source. 1) Using a hand-held remote control, IR signals picked up at the in wall receiver are presented on one of ten IR signal lines; and 2) when an in-wall keypad, sends a command to the MCU requesting that an IR signal be transmitted on one of the ten SDC control outputs 1804, the MCU uses SDO to send an address to a router (or decoder) 1810 which routes control data to the targeted one of the ten SDC control outputs 1804. The control data which is sent through the router 1804 to the targeted SDC control output is obtained from a preprogrammed look-up memory (or code library ROM) 1814. Thus, in response to a command received on the SBX bus, an I/O interface circuit 1816 (FIG. 12e) feeds a supervisor circuit (or microcomputer) 1818 with a command, such as "play CD # 2;" the supervisor circuit 1818 then looks up the correct data to send to the targeted audio equipment in the ROM 1814 and transmits the code by latching the information into a code generator 1820, which in turn presents the data to the already-addressed router 1810. One of the router's outputs then drives the addressed IR signal line through a connected "OR-tied" diode 1822.

The IR signal lines are normally driven by the zone modules in "open-collector" fashion; that is, pullups are located on the IR output module.

Telephone Module

Figure 21:
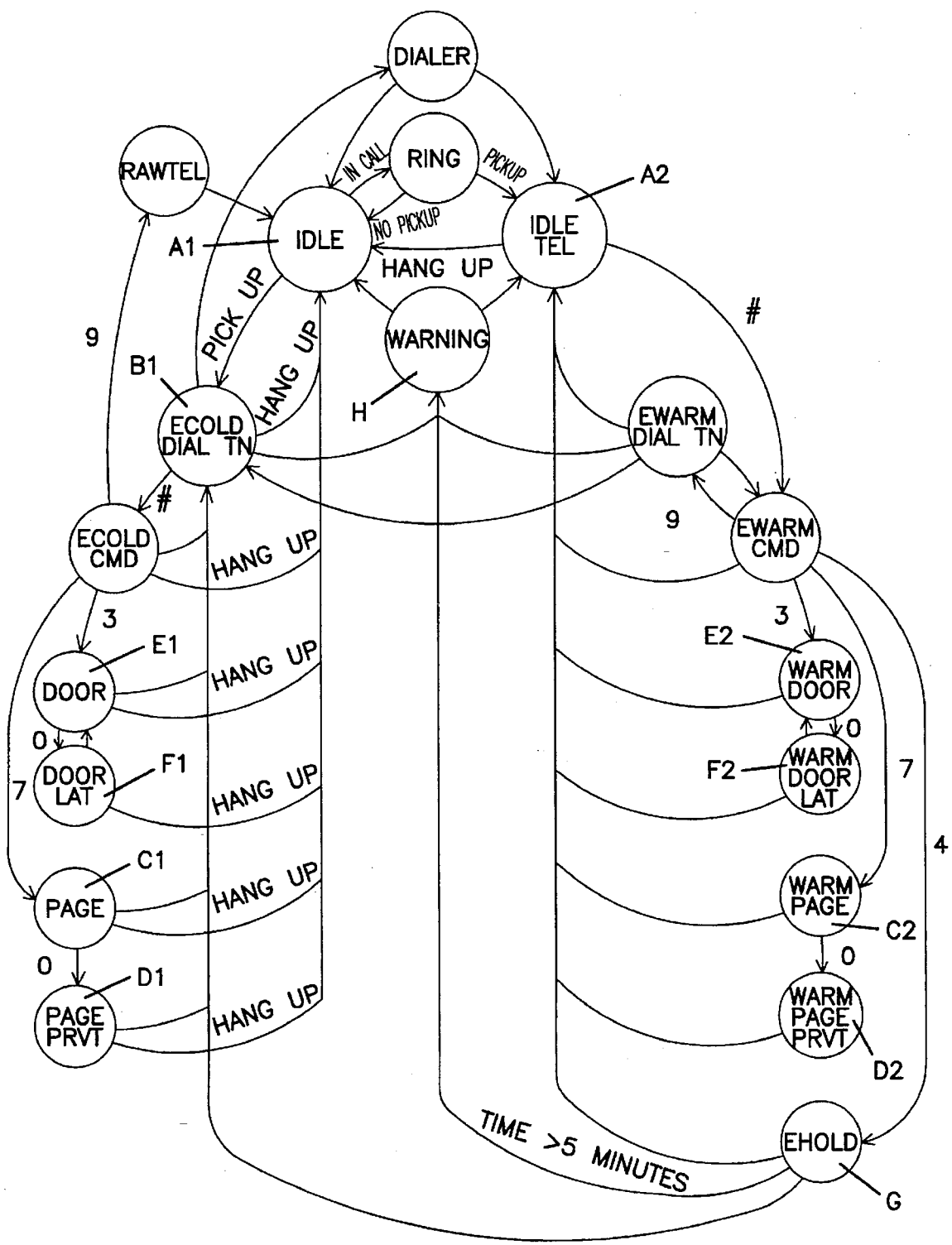
Figure 21A:
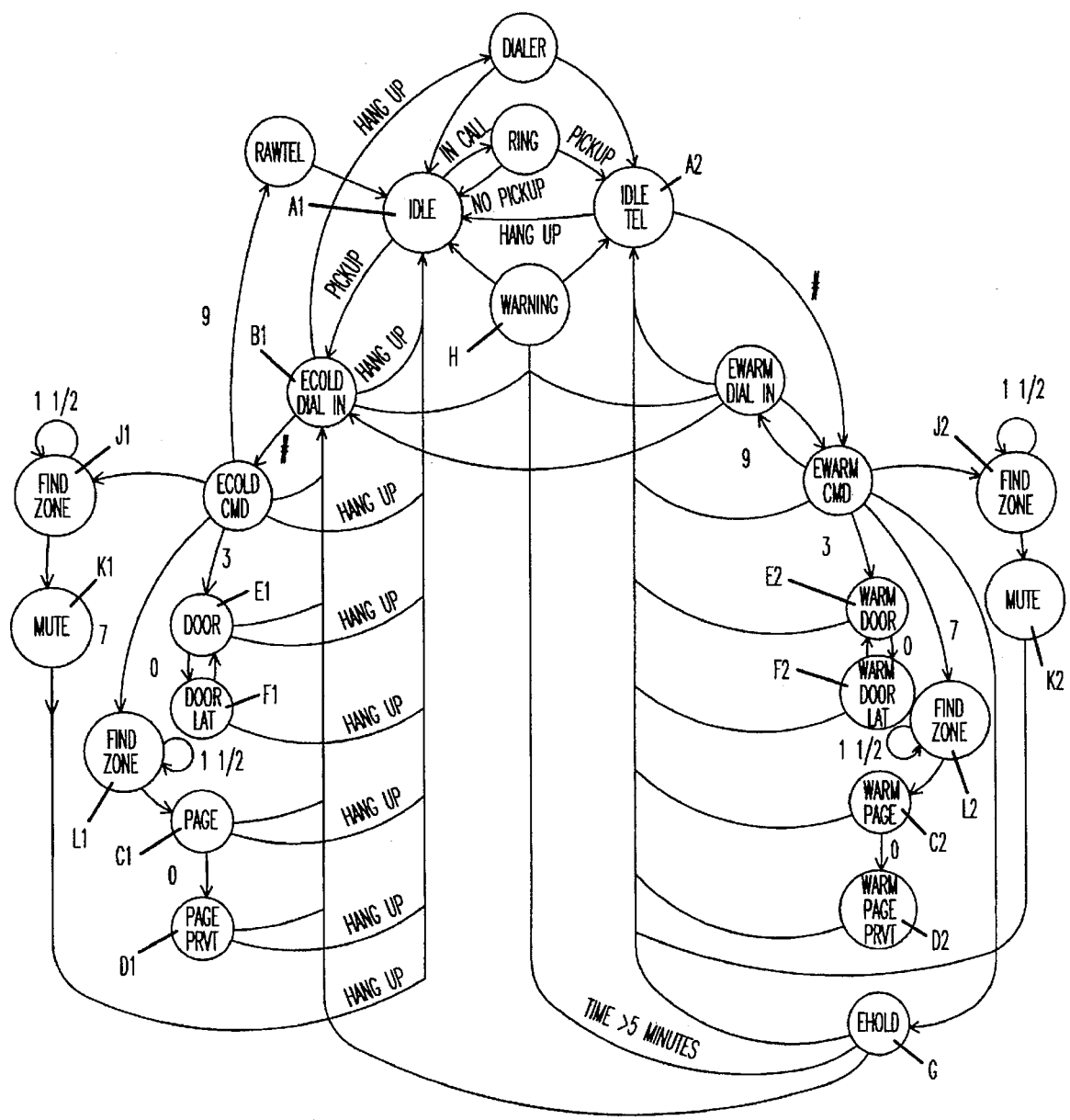

The telephone module adds increased functionality and integration to the home's telephone and communication system via standard tone telephones. The telephone module provides two distinct doorbells over the whole house system: a three-tone chime for a front door, and a two-tone chime for a second door. The controller 1101 of FIG. 12 operates in connection with a built-in key system interface on the telephone to initiate the performance of different telephone functions. Different key combinations dialed on a tone telephone, which represent different functions, are interpreted by the built-in key system interface on the telephone module so that the functions can be performed. FIG. 21 is a telephone firmware state table illustrating the different functions which can be performed from a tone telephone depending on the dialed key combination.

The state table in FIG. 21 can be divided into two main parts. The left-hand side of the state table illustrates telephone features which can be instigated from a telephone when a user is not talking to anyone on the line. Picking up the telephone without there being an incoming call brings one from state A1 "IDLE" to state B1 "ECOLD DIAL TN". The right-hand side of the state table illustrates telephone features which can be instigated when the user is already on the line with a caller in state A2 "IDLE TEL".

From states B1 or A2, a multitude of functions can be performed by pressing certain key combinations. For example, by dialing # plus 7, the station will be switched to a paging function (states C1 and C2) to broadcast a message. Furthermore, by dialing # plus 7, making an announcement, and then dialing 0, the station will accept a sound station for a private conversation (states D1 and D2). The conversation will not be broadcast over the music/paging system or over the door speaker. By dialing # plus 3, the station is switched to the optional door speaker (states E1 and E2). This feature is activated to answer a person at the door, to monitor outside activity, and to permit the operation of a latching device. By dialing # plus 3 plus 0, or dialing 0 when connected to the optional door speaker, a latching device can be activated (states F1 and F2). The device will operate as long as the # is pressed. Finally, by dialing # plus 4, the station will put an incoming call on hold (state G). Keeping a caller on hold for more than five minutes will cause a warning to sound (state H). When any receiver is taken off the hook, the conversation will resume.

On the left-hand side of the state table, return to state B1 "ECOLD DIAL TN" after performing a special telephone function is achieved by pressing any button on the telephone not corresponding to a specific function. Return to state A1 "IDLE" after performing a special telephone function is achieved by hanging up the telephone. On the right-hand side of the state table, return to state A2 "IDLE TEL" after performing a special telephone function occurs if the user presses any non-function specific button.

Figure 19:
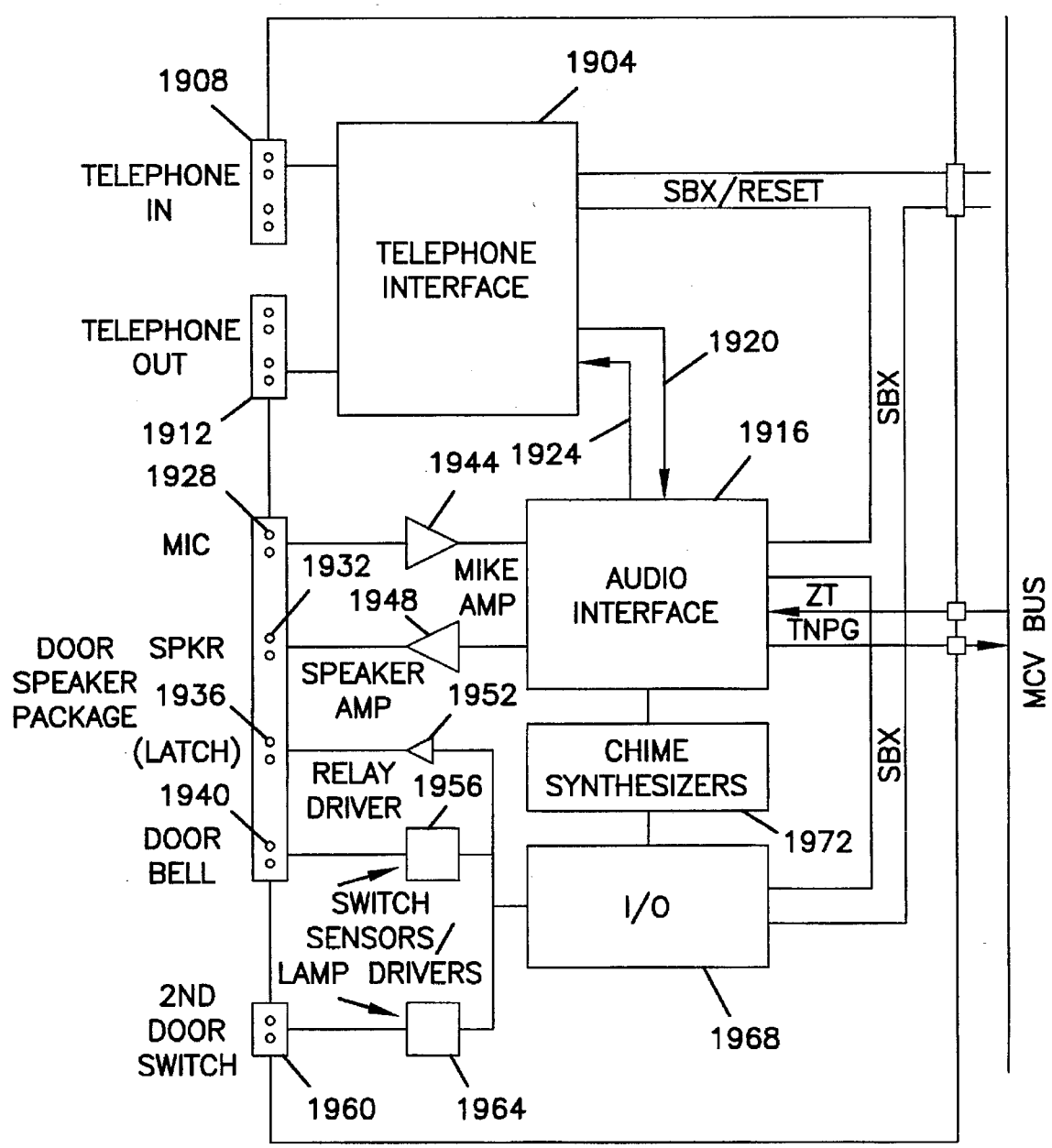

Turning now to FIG. 19, an MCU controlled telephone module is shown providing similar features as the telephone module discussed in connection with FIGS. 4 et seq. supra. SBX control signals and the RESET line are coupled to a telephone interface circuit 1904, which is implemented using a conventional DTMF decoder/encoder type circuit. The telephone interface 1904 is connected to a telephone input 1908 for receiving an incoming telephone line and to a telephone output 1912 from which a line extends to a homeowner's telephone. The telephone interface 1904 is coupled to an audio interface 1916 via lines 1920 and 1924. The audio interface 1916 is also coupled to the SBX control system. The audio interface 1916 is implemented using an audio interface chip, such as an AMS2406, and conventional relays.

An in-house dial tone signal (ZT) and the TNPG (tone, page) signal are respectively coupled to the audio interface 1916 from the MCU bus 1102 and from the MCU bus 1102 to the audio interface 1916.

The telephone module includes a door speaker interface jack having a microphone line 1928, a door speaker line 1932, a door latch line 1936, and a doorbell line 1940 for various types of signal processing. For example, signals at the microphone line 1928 are routed through an amplifier 1944 to the audio interface 1916 and to the MCU backplane for zone module processing; and signals sent to the door speaker line 1932 are routed from the telephone input 1908, through the telephone interface 1904 and the audio interface 1916, and through a speaker amplifier 1948 to the doorspeaker line 1932.

Relay Output Module

Figure 20:
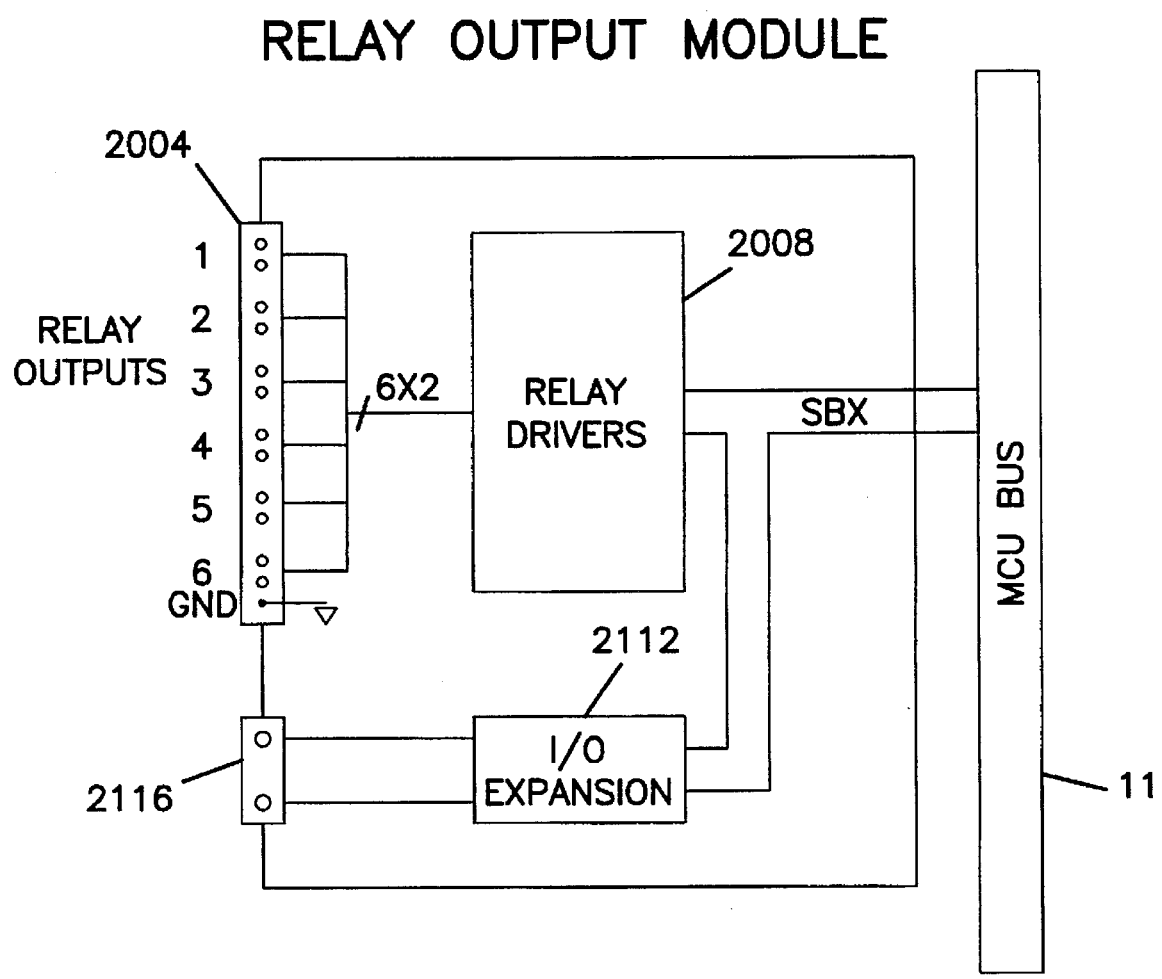

Referring to FIG. 20, the relay output module may be added to the MCU to provide six dry contact relay outputs 2004 for control of customized type functions. Such customized functions may include Power ON/OFF, appliances, lighting, and video screen control functions. The relay output module is activated by relay on/off buttons on the hand held infrared remote control. The relay outputs 2004 are driven by relay drivers 2008 under control of the SBX system. The relay drivers 2008 are implemented using ARNB5 type chips, and SBX control of the relay drivers 2008 is implemented using a UCN5821A type chip.

The relay output module may be designed to include an input/output expansion 2112 under SBX system control so that an additional MCU can be coupled to a main MCU via the I/O expansion outputs 2116 in a master-slave relationship. The additional MCU acts as a slave to the main master MCU.

INWALL KEYPAD UNIT

An inwall keypad unit provides remote system control from within different zones of a distribution network having the MCU as its hub. It is capable of controlling both MCU functions and source equipment functions. The unit has five custom-configurable source label slots, and it can be daisy chained for multiple rooms to control the same zone (four maximum with no more than 20 per MCU).

Primary, secondary, and tertiary commands can be initiated through the inwall keypad unit. These commands are routed from the inwall keypad unit to the MCU, where the command is processed and carried out. First, there are several primary commands which can be given through the inwall keypad unit. A "Zone ON/OFF (standby)" command turns a zone ON or OFF. A "Select Source" command can be pressed to toggle through source selection. A selected source can be played by pressing a "Play" command. A "Volume UP" command is pressed to turn zone volume up, while a "Volume DOWN" command is pressed to turn zone volume down.

Secondary commands can also be initiated through the inwall keypad unit. Pressing a "Do Not Disturb" command deactivates all audio to a zone except for music, while pressing a "Mute Music" command cuts off music in the zone. A "NEXT Selection" command is used to choose the next selection, fast forward, next pre-set, etc. A "PRIOR Selection" command is used to choose a prior selection, rewind, prior pre-set, etc. A "STOP Play" command stops a selected source from playing.

Finally, tertiary commands including "NEXT CD", "PRIOR CD", and "RANDOM CD" can be initiated through the inwall keypad unit. "NEXT CD" and "PRIOR CD" only work with a compact disc changer. "NEXT CD" chooses the next disc in a CD changer, while "PRIOR CD" chooses the prior disc in a CD changer. "RANDOM CD" initiates random play on a compact disc.

A combination of secondary and tertiary functions can be custom programmed by the installer to cause the MCU to initiate any valid source command. Refer to Appendix A, Section 6 in the Installation Manual.

Figure 22:
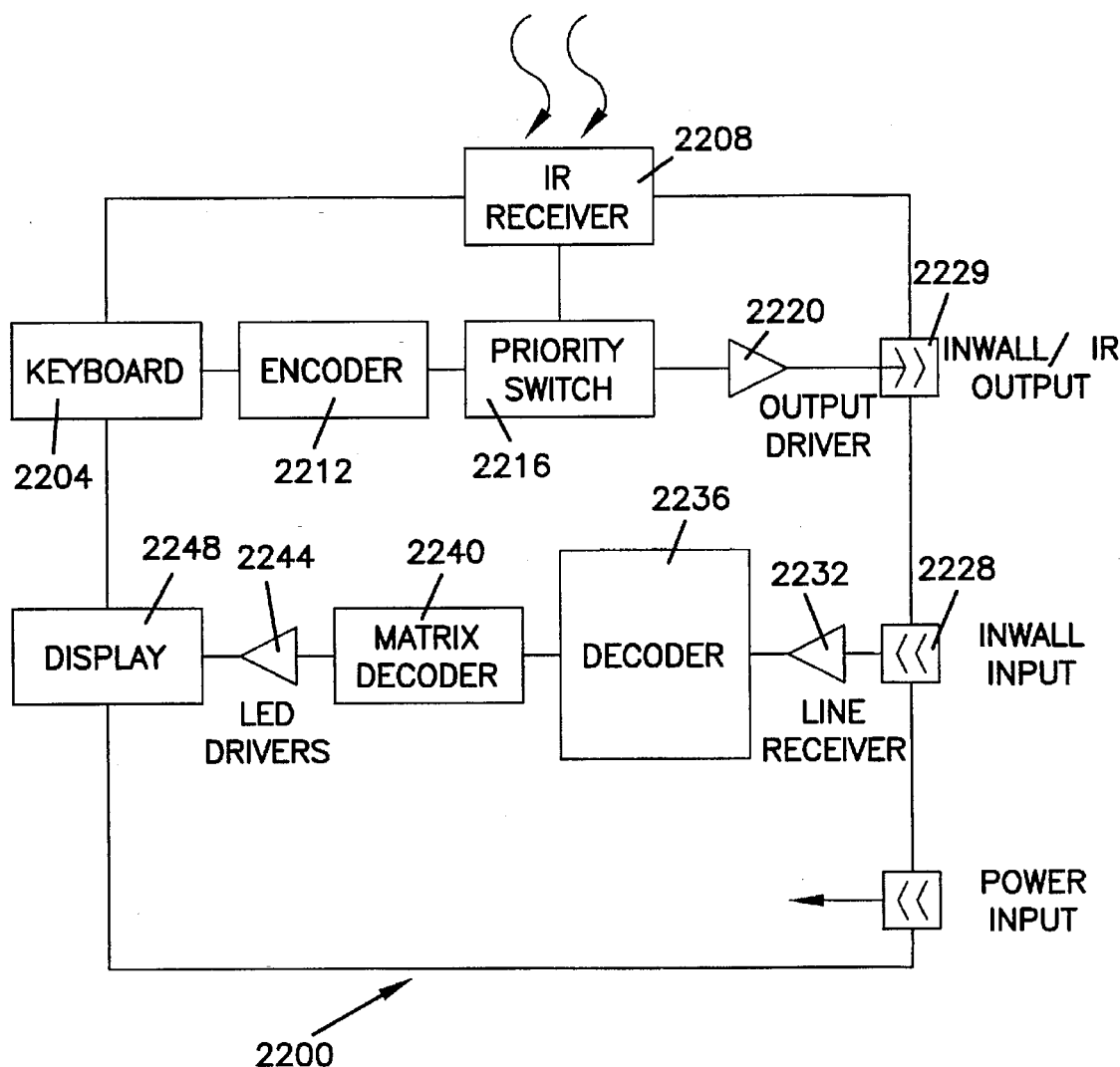

Referring now to FIG. 22, there is shown a block diagram of an inwall keypad unit 2200. The ornamental design of the inwall keypad unit is disclosed in U.S. patent application Ser. No. 818,230 to Farenelli et al. The inwall keypad unit 2200 can receive input commands from either a keyboard 2204 or by infrared coupling with an IR receiver 2208. The IR receiver 2208 is manufactured by Video Link, Division of Xantech Corporation, 12950 Bradley Avenue, Sylmar, Calif. 91342, with slight modifications to meet the requirements of the EDN system. An encoder 2212 encodes a command initiated at the keyboard 2204, and the encoded command is then passed to a priority switch 2216. Input commands at both the keyboard 2204 and the IR receiver 2208 are routed through the priority switch 2216 and transmitted to an output driver 2220. If input commands are initiated at both the keyboard 2204 and the IR receiver 2208, the priority switch 2216 gives priority to local inputs at the keyboard 2204 over remote control inputs at the IR receiver 2208. After being fed through the output driver 2220, the input command is routed to an inwall/IR output 2224 on the inwall keypad unit 2200. From the inwall/IR output 2224, the command is routed to an inwall jack on a dual zone module of the MCU.

Signals in the opposite direction and from the MCU begin at inwall input 2228, are passed to a line receiver 2232, and then to decoders 2236 and 2240. The output of the decoder 2240 feeds LED drivers 2244 using for example a SAA3004 type Signetics chip, which are arranged to drive the display 2248.

LED DISPLAY

Figure 23A:
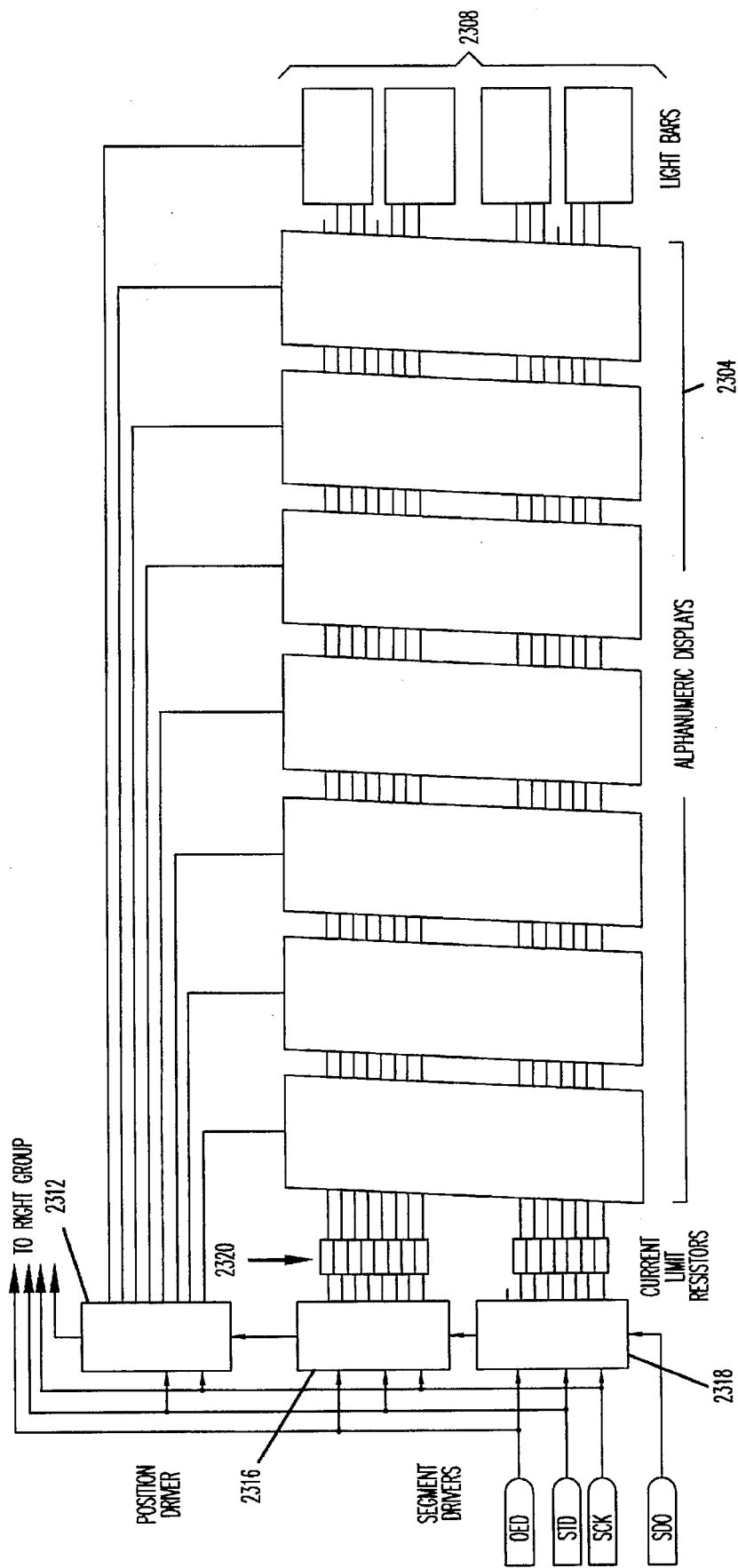

The LED display board consists of two identical groups of circuits, a LEFT group and a RIGHT group. The block diagram in FIG. 23A shows circuitry for the LEFT group only. Both groups include seven 14-segment alphanumeric displays 2304, and four 3-LED light bars 2308. The alphanumeric displays 2304 are common-anode type, which may be implemented using IEE3982 chips. The four light bars 2308 are wired with all anodes connected; the light bars are thus addressed together as the eighth display position in the group. The light bars are implemented with LB75 chips.

Each group also includes three display driver ICs. There is one position driver 2312 with eight current-source outputs, each output connected to the common anode of one display position. The position driver 2312 is implemented with a UCN5821A chip. There are two segment drivers 2316 and 2318, each with eight current-sink outputs, connected via current-limiting resistors 2320 to the bussed cathode pins of the alphanumeric displays 2304 and the light bars 2308. The segment drivers 2316 and 2318 are implemented with UCN5895A chips.

The display operates in multiplexed fashion—only one display position in each group is actually illuminated at any given instant. The multiplexing is performed in software by the controller. The overall refresh rate of the display is 80 Hz.

Figure 23B:
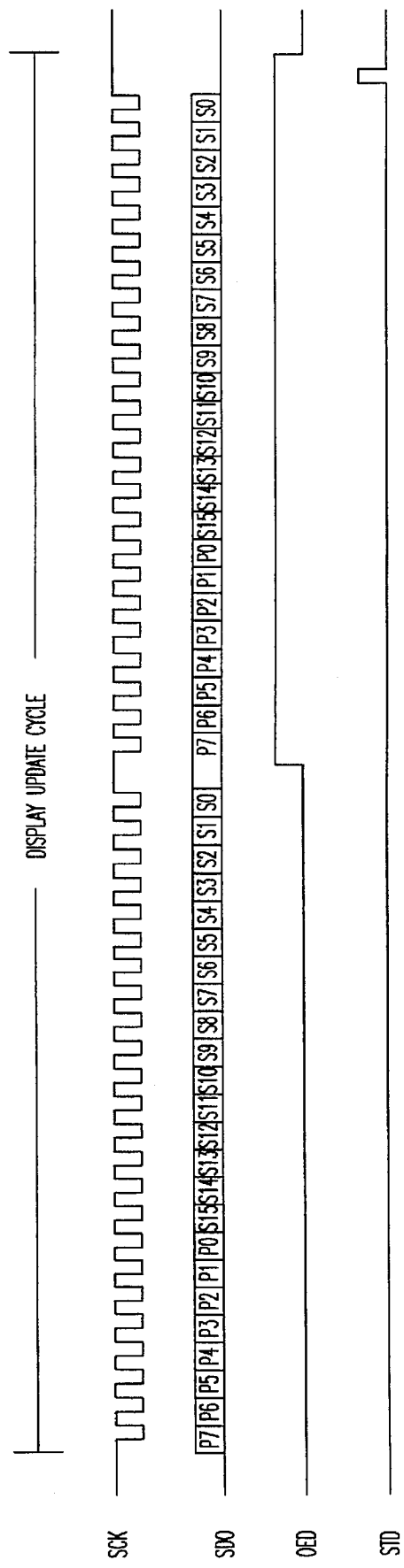

The entire display system is accessed serially by the controller via the SBX control lines SCK, SDO, OED, and STD. The timing of a data transfer from the controller to the LED display is shown in FIG. 23B. With OED low, eight position bits and sixteen segment bits are transferred via the SDO line to serial shift registers contained in the position driver 2312 and the segment drivers 2316 and 2318. The position bits indicate which display position will be illuminated, while the segment bits determine which segments of the display position are to be illuminated.

Next, OED goes high and the position and segment bits are transferred to the outputs of their respective drivers, thus illuminating the appropriate segments on one of the display positions. At the same time, a new set of position and segment bits are serially fed into the drivers 2312, 2316 and 2318 via the SDO line. Finally, the STD line strobes the drivers to indicate the end of a display update cycle.

Flow Charts For The MCU Controller

Figure 24:
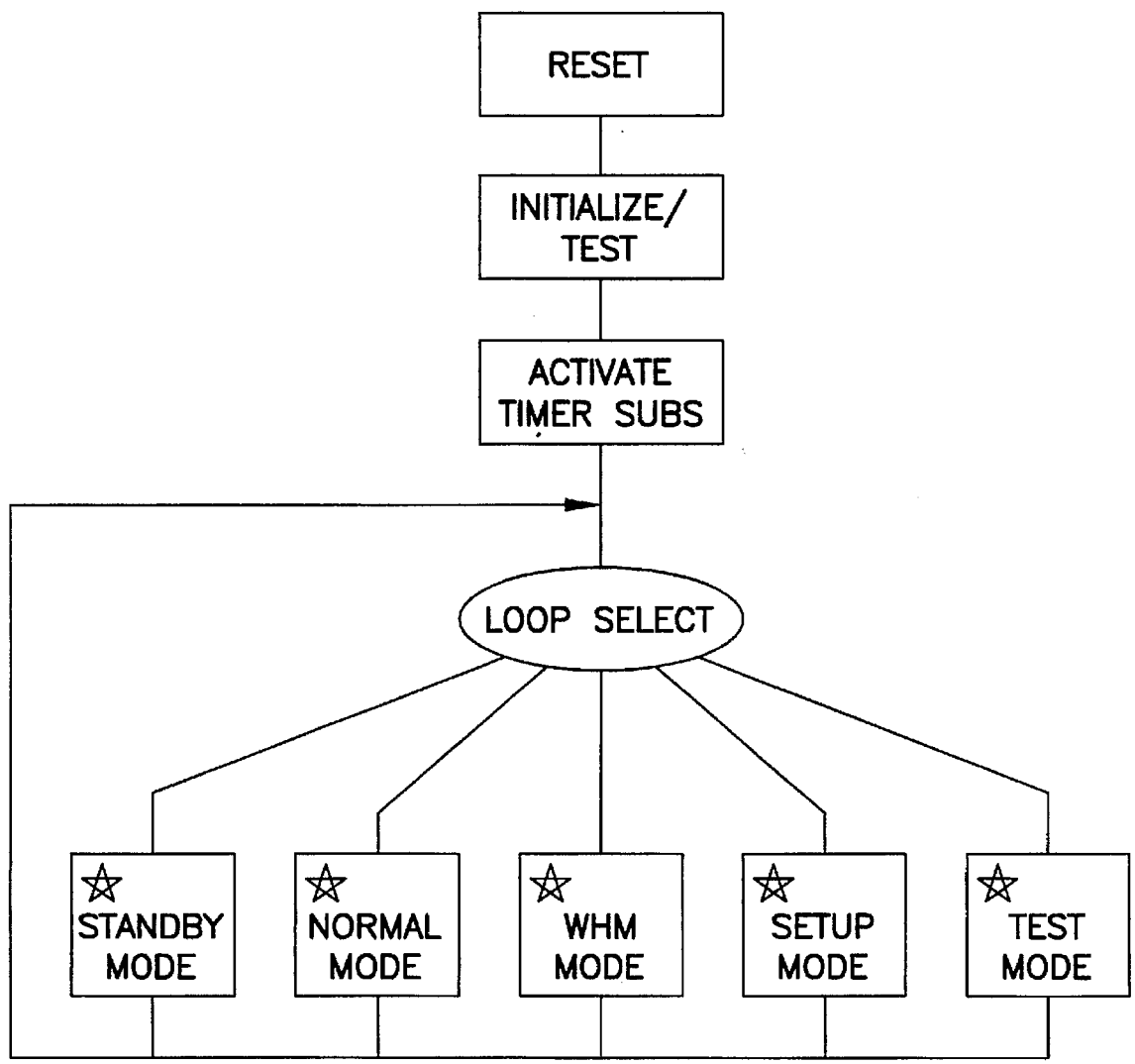
FIGS. 24–40 are flow charts illustrating a method for programming a microcomputer used in the master control unit discussed in connection with FIGS. 12–23b.

FIG. 24 illustrates an overall background procedure which may be used to program the microcomputer (CPU) 1207 of FIG. 12d. The illustrated program flow is based on a timer-based interrupt routine service system. From reset, the CPLI is initialized and the timers which set off the interrupts for servicing the subroutines are activated. Once activated, the CPU begins to service periodically a standby routine, a normal mode routine, a WHM (whole house music) mode routine and set-up and test mode routines.

Figure 25:
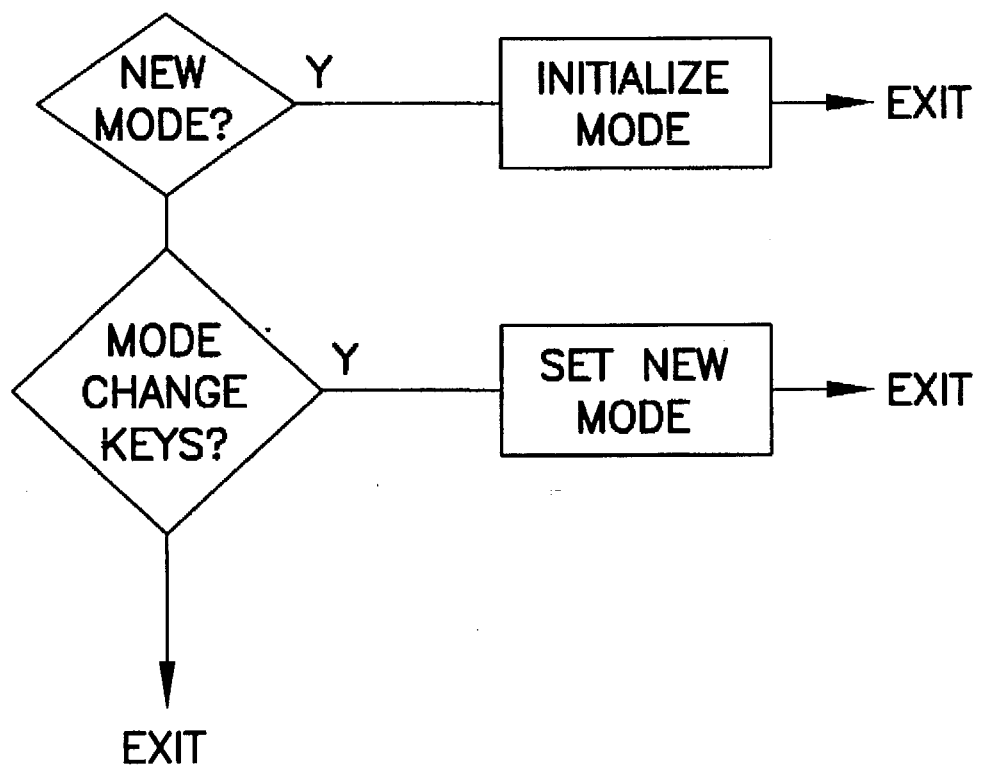

The standby routine is illustrated in FIG. 25 which begins with a decision block inquiring whether a new mode is being programmed for the EDN system. If so, flow proceeds to initialize that mode; otherwise, flow proceeds to a second decision block inquiring if the power key has been selected. As discussed in appendix A, Ch. 6 (attached hereto), the power key is used in conjunction with several of the other keys to begin programming functions. Thus, if the power key has been depressed, flow proceeds to set up the new mode; otherwise, the routine is exited.

Figure 26:
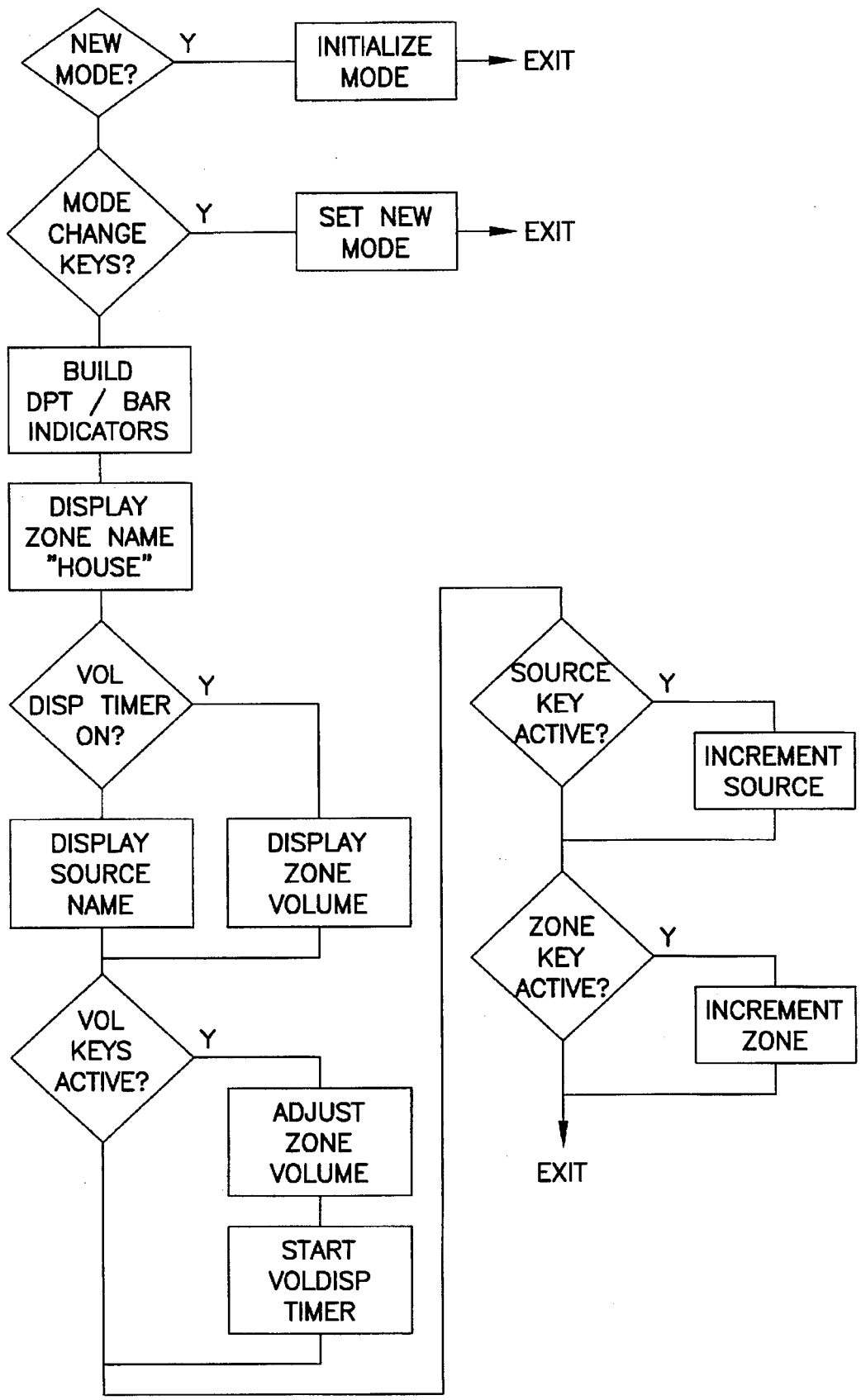

FIG. 26 illustrates the normal mode routine. As with the previous routine, the CPU checks if a new mode is being programmed. If so, the CPU initializes that new mode; otherwise, flow proceeds to a second decision block to determine if a mode is being changed. If so, flow proceeds to change the previously programmed mode; otherwise, flow proceeds to refresh the displays and perform the normal programming functions. For example, the CPU next performs a test to determine if the volume display timer is on. This timer is set to inform the CPU that the zone volume is be displayed rather than the source name. If the volume keys are active, the CPU monitors the volume control keys for adjustment and then sets a volume display timer to time out from the volume-keys-activity state. Next, if either the source key or the zone key is active, the CPU increments the source or zone to allow the user to continue programming the next source or zone.

Figure 27:
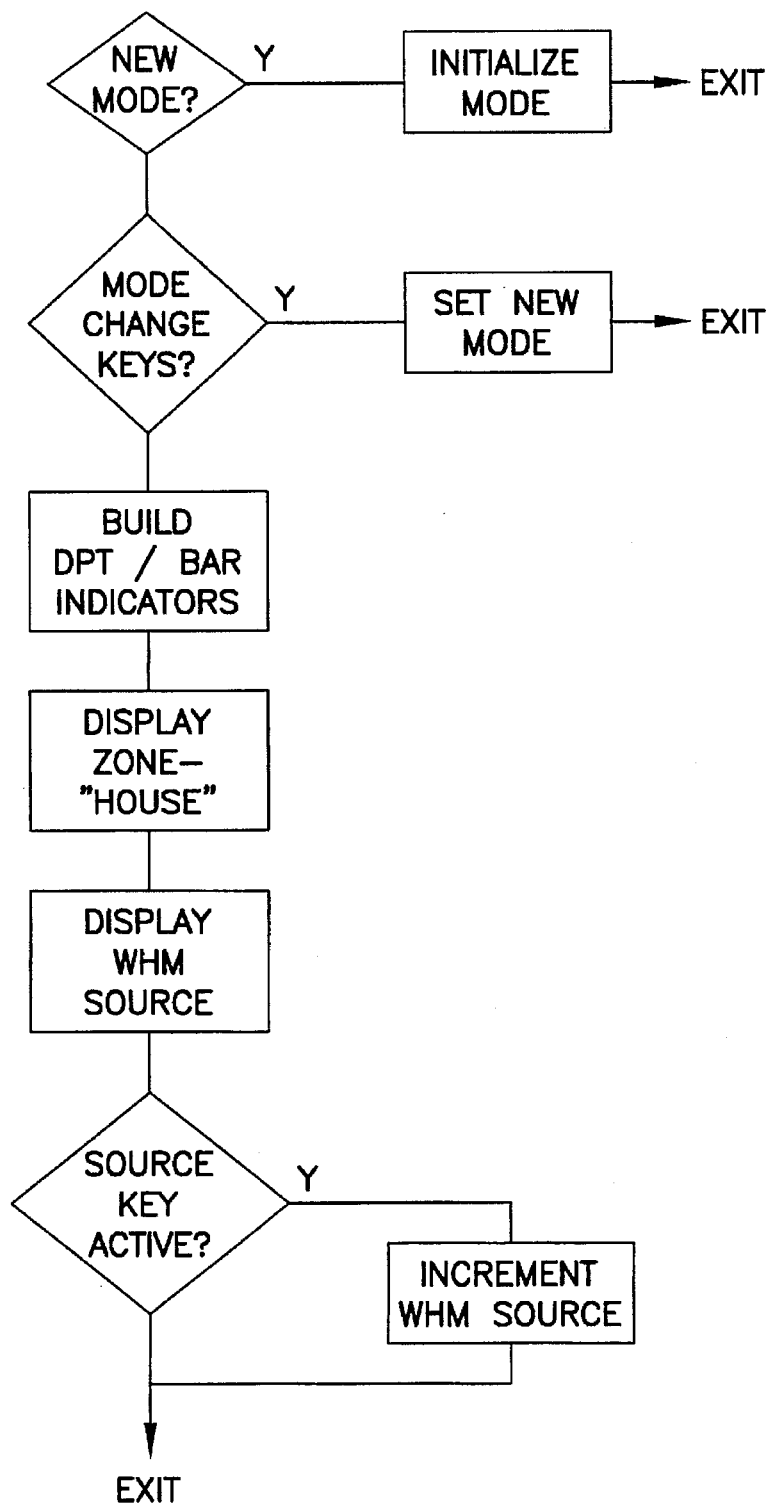

FIG. 27 illustrates the WHM mode routine. As with the previous routines, the CPU first handles new mode programming. Next, flow proceeds to refresh the displays and to indicate on the display from which source the whole house mode is originating. If the source key is active, the CPU increments to select the next source as the potential target whole house source.

Figure 28:
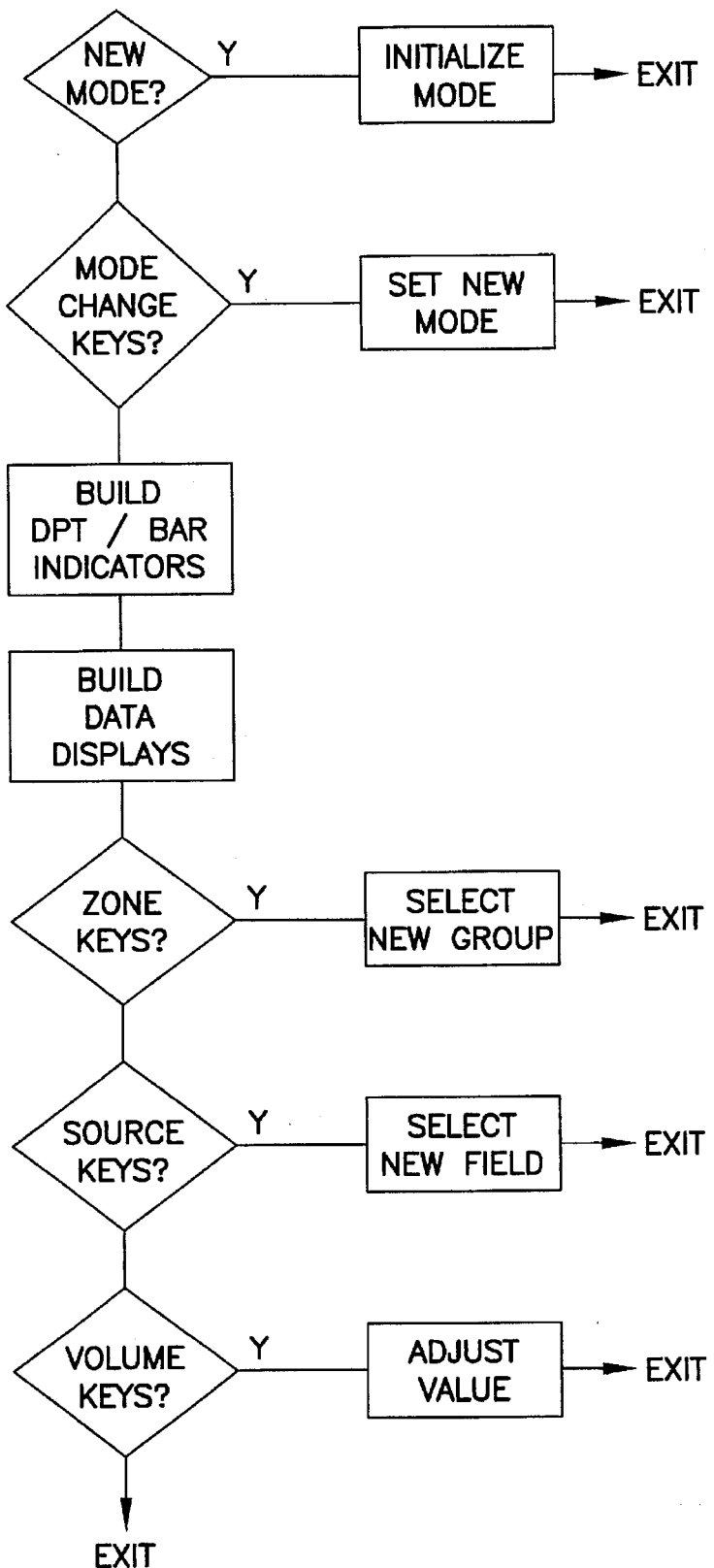
Figure 29:
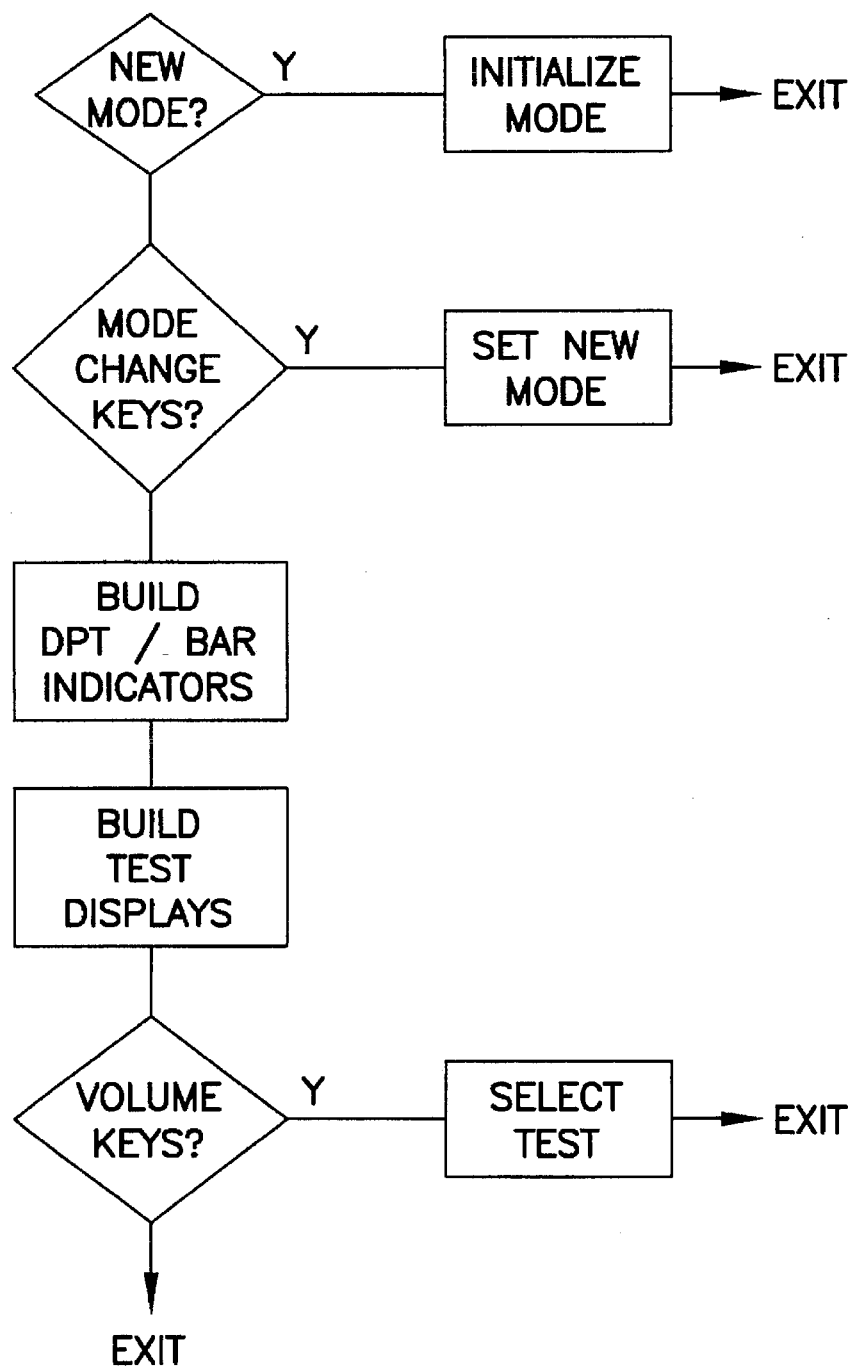

While they are two different routines, FIGS. 28 and 29 are somewhat similar. The setup routine of FIG. 28 and the test routine of FIG. 29 also first handle new (and change) mode programming. After refreshing the displays, the setup mode routine performs tests to determine if the zone key, the source key or the volume keys have been selected. If so, flow proceeds from the respective test to select a new group (for the zone key), to select a new field (for the source key) and to adjust the value (for the volume keys). Similarly, after refreshing the displays, the test mode routine perform a test to determine if the volume keys have been selected. If so, flow proceeds to select the next test.

Figure 30:
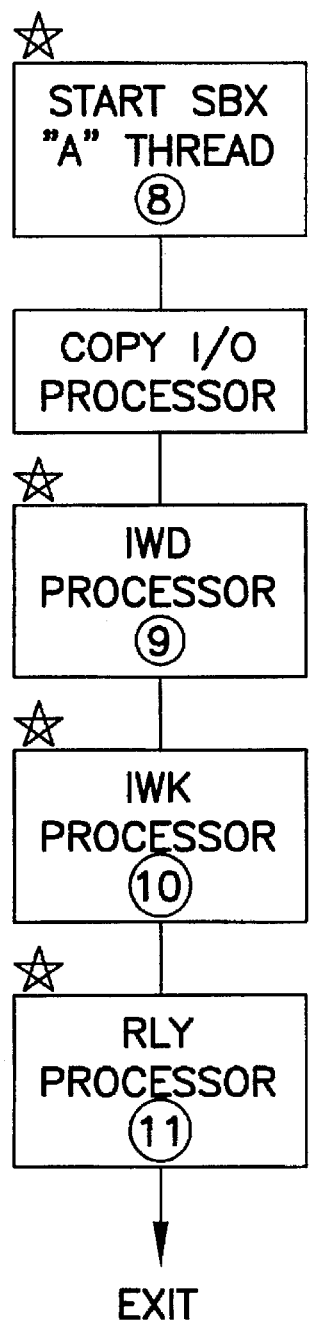
Figure 31:
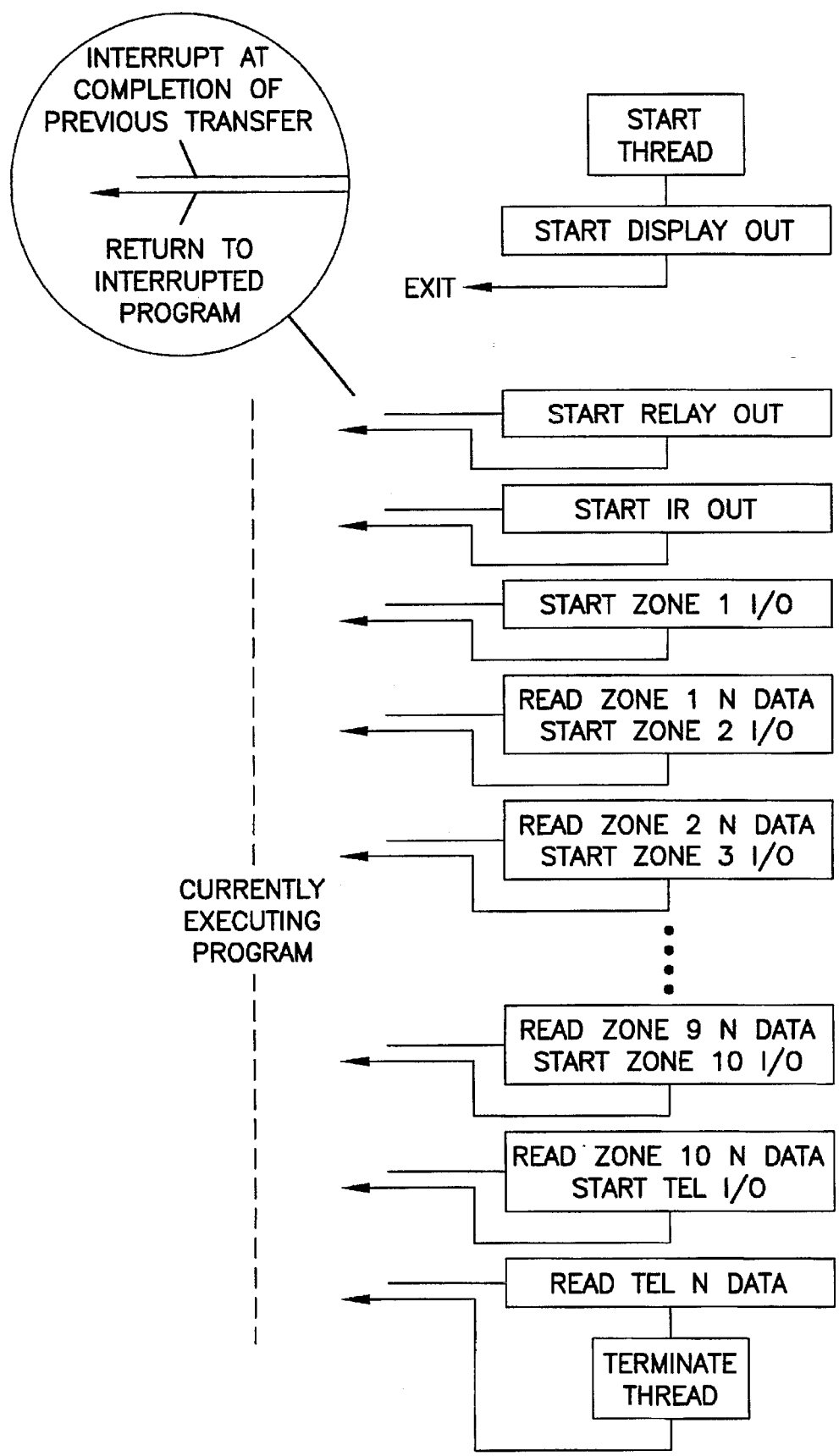
Figure 32:
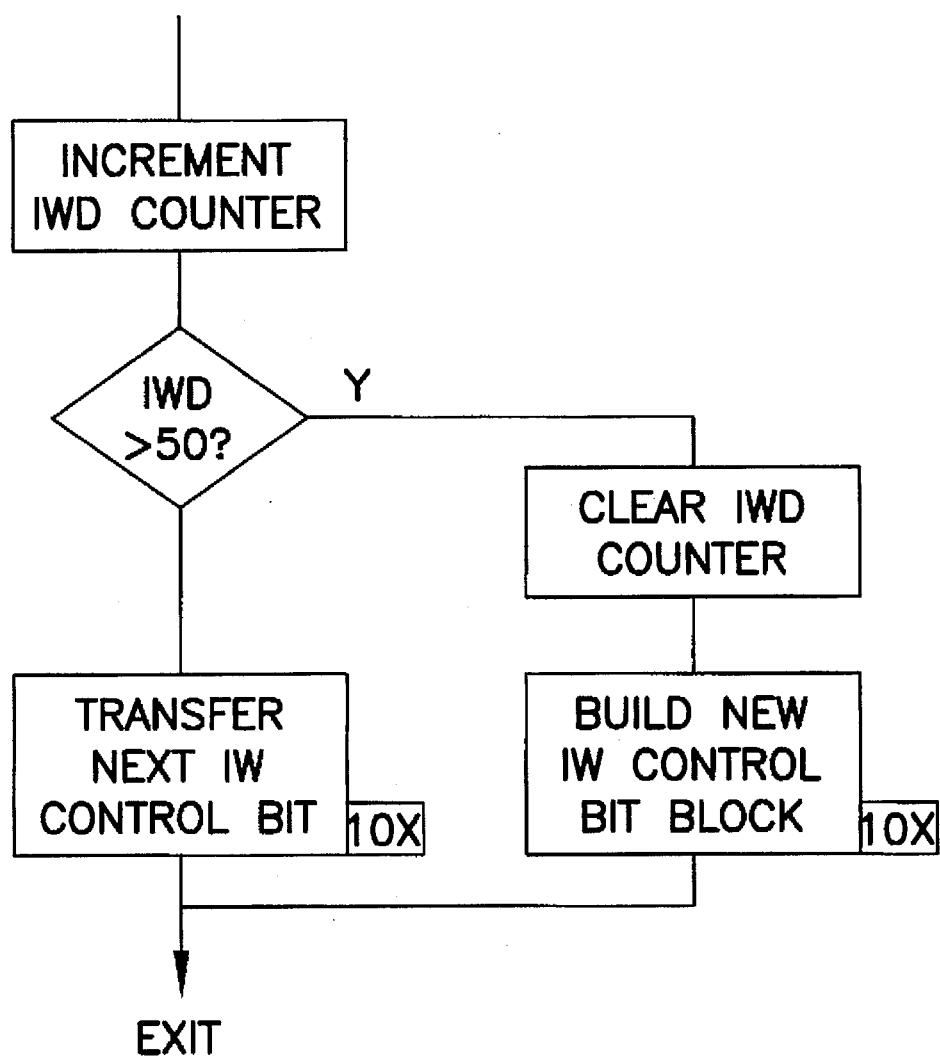
Figure 33:
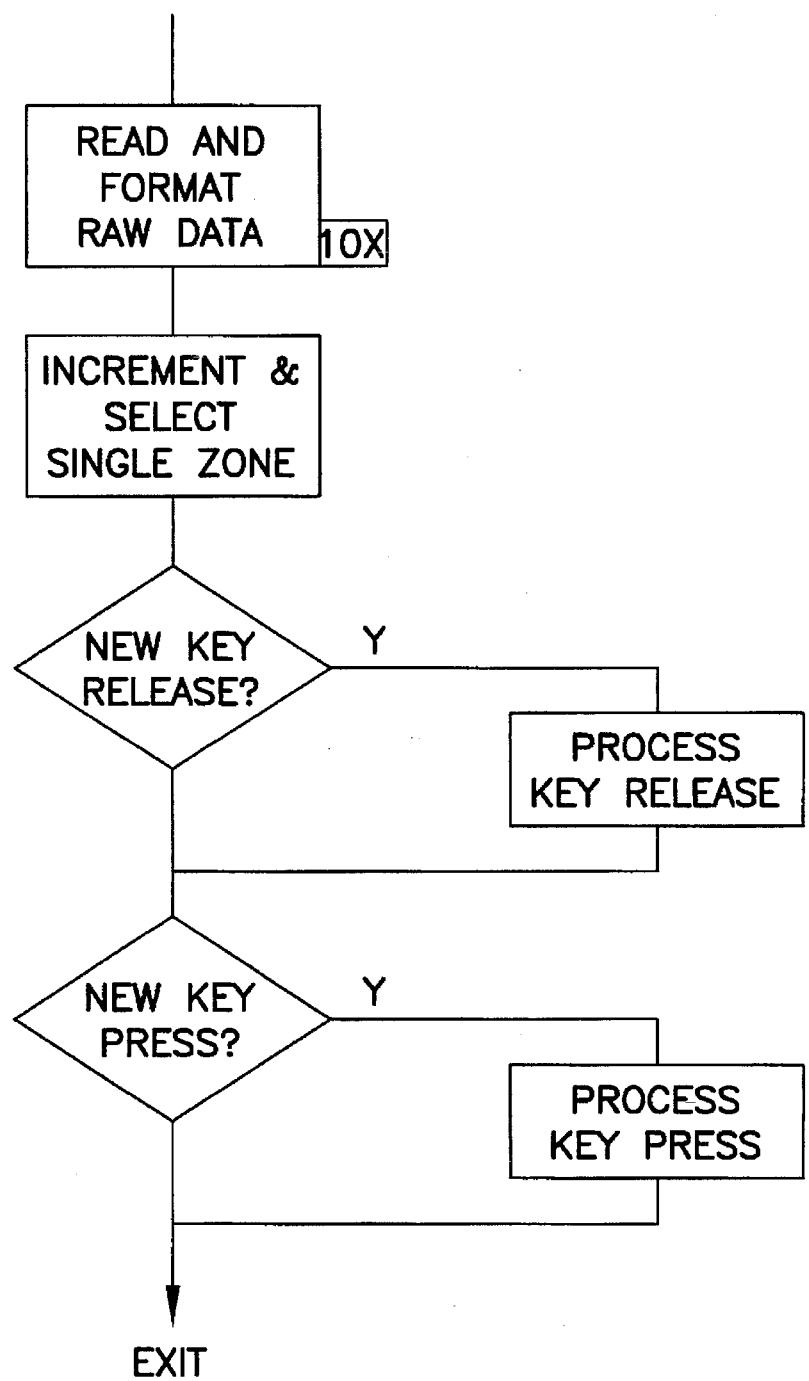
Figure 34:
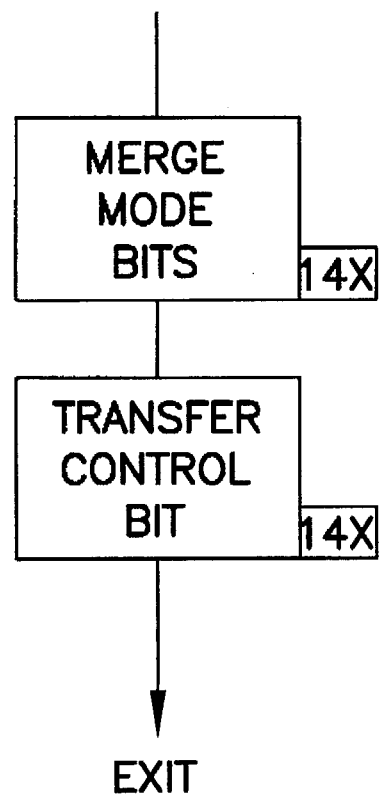
Figure 35:
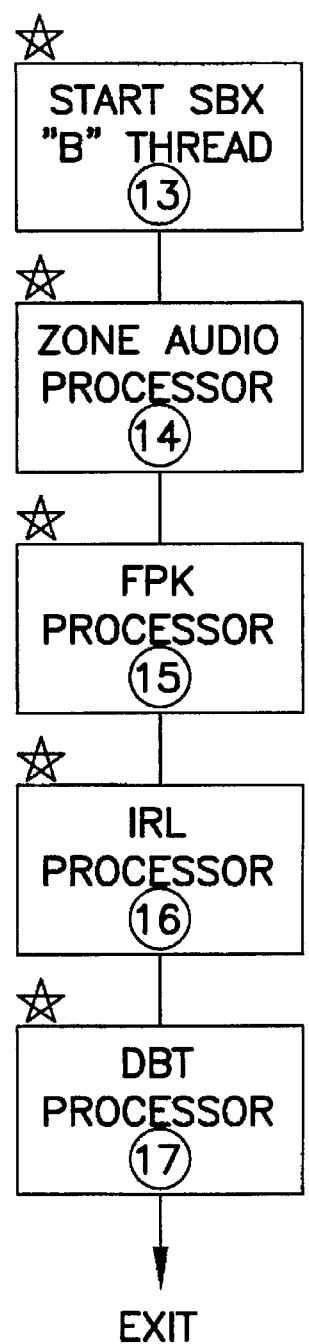

FIGS. 30–40 illustrate the interrupt service routines which force the CPU to temporarily exit the previously discussed routines in response to a first timer "A". Referring to FIG. 30, the first timer interrupts at a rate of about 400 Hz., or about every 2.5 milliseconds. This routine begins (FIG. 31) by executing one of several portions required for SBX communications. After each portion is completed, a return from interrupt command is executed by the CPU. Next, the CPU reads and copies into memory the status of the I/O buffers so that the data thereat is not lost. In the blocks expanded at FIGS. 32 and 33, the data and keys for the inwall devices are processed. In FIG. 32, the next inwall control bit is retrieved by the CPU so long as the data word bit block has not exceeded 50. In FIG. 33, the raw data keyed into the inwall is read and formatted, the selected zone is designated and the key release/depression is processed. In the block expanded at FIG. 34, the CPU processes data for the relays (I/O control module) by first merging mode bits for the output and then transmitting the control bit.

Figure 36:
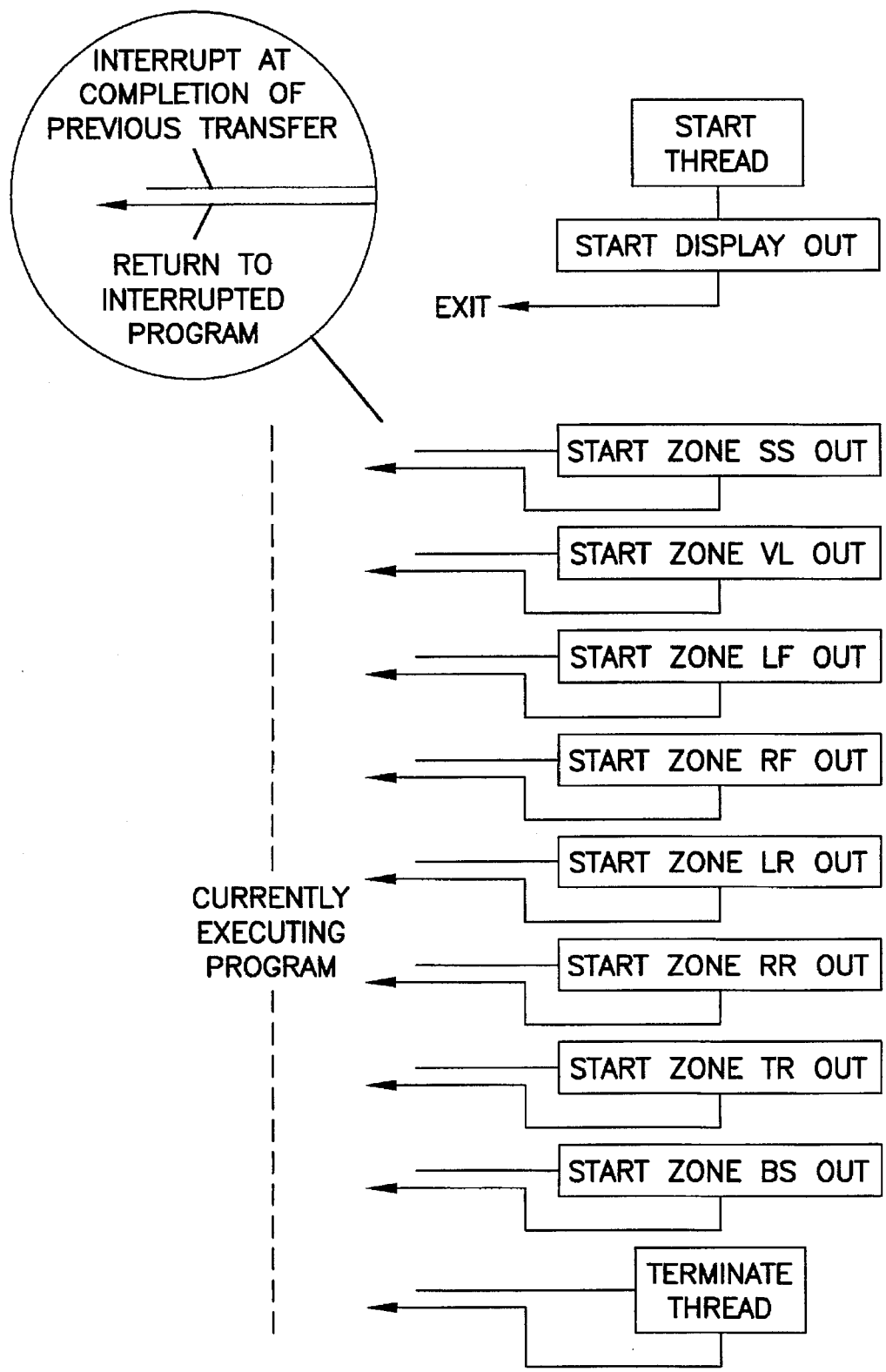
Figure 37:
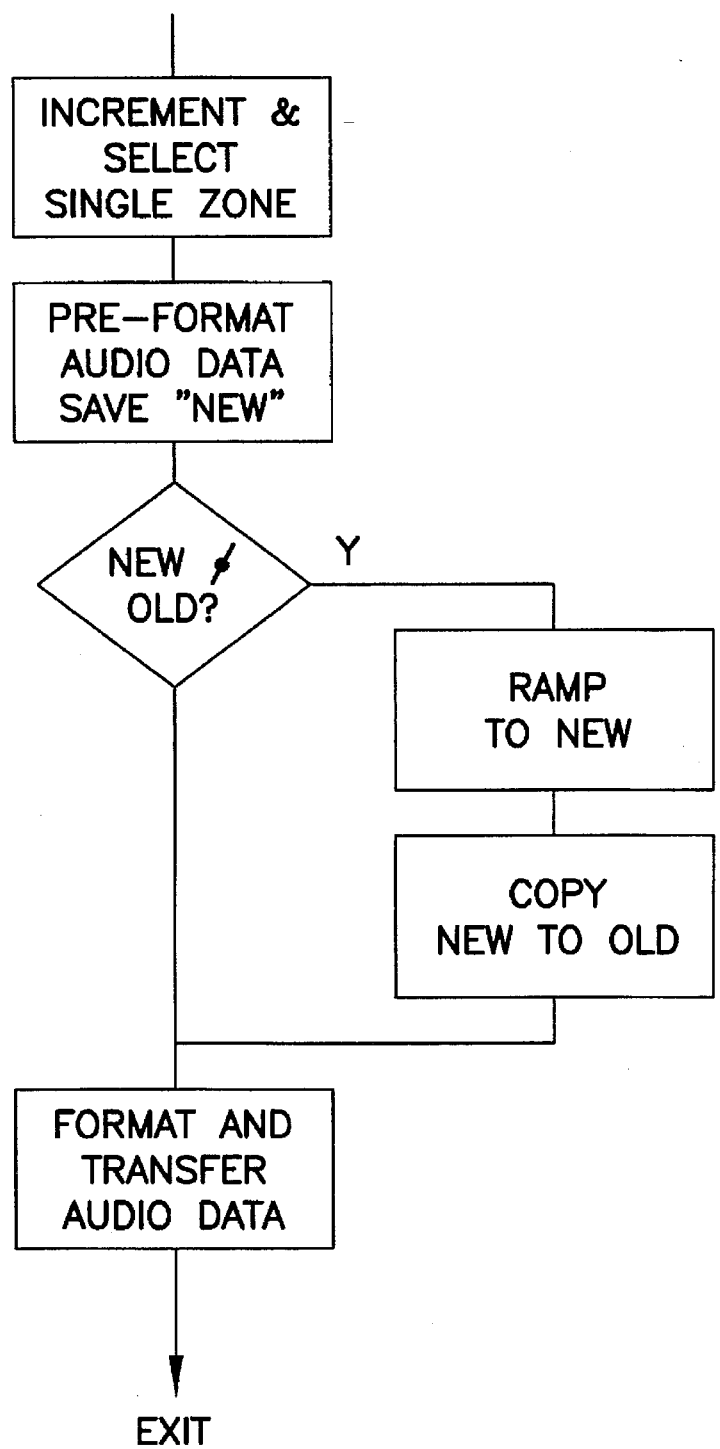
Figure 38:
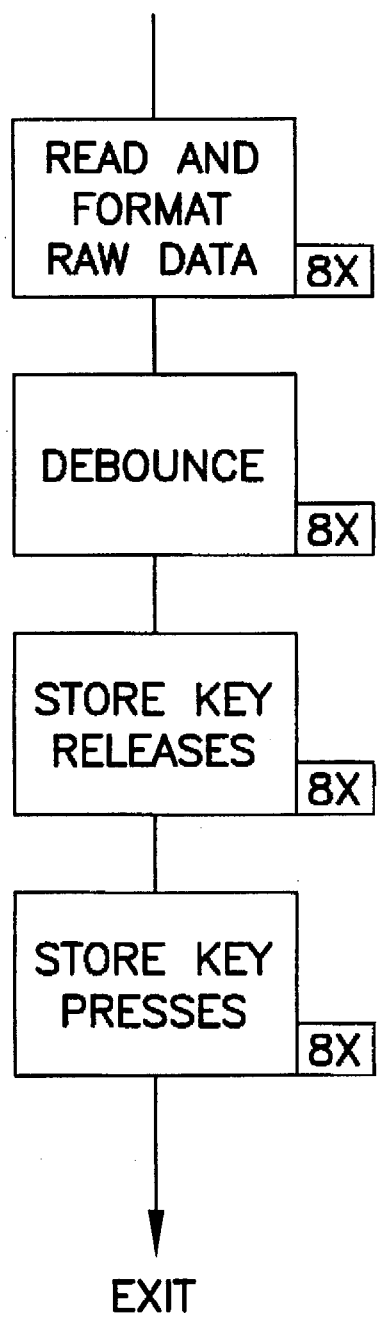
Figure 39:
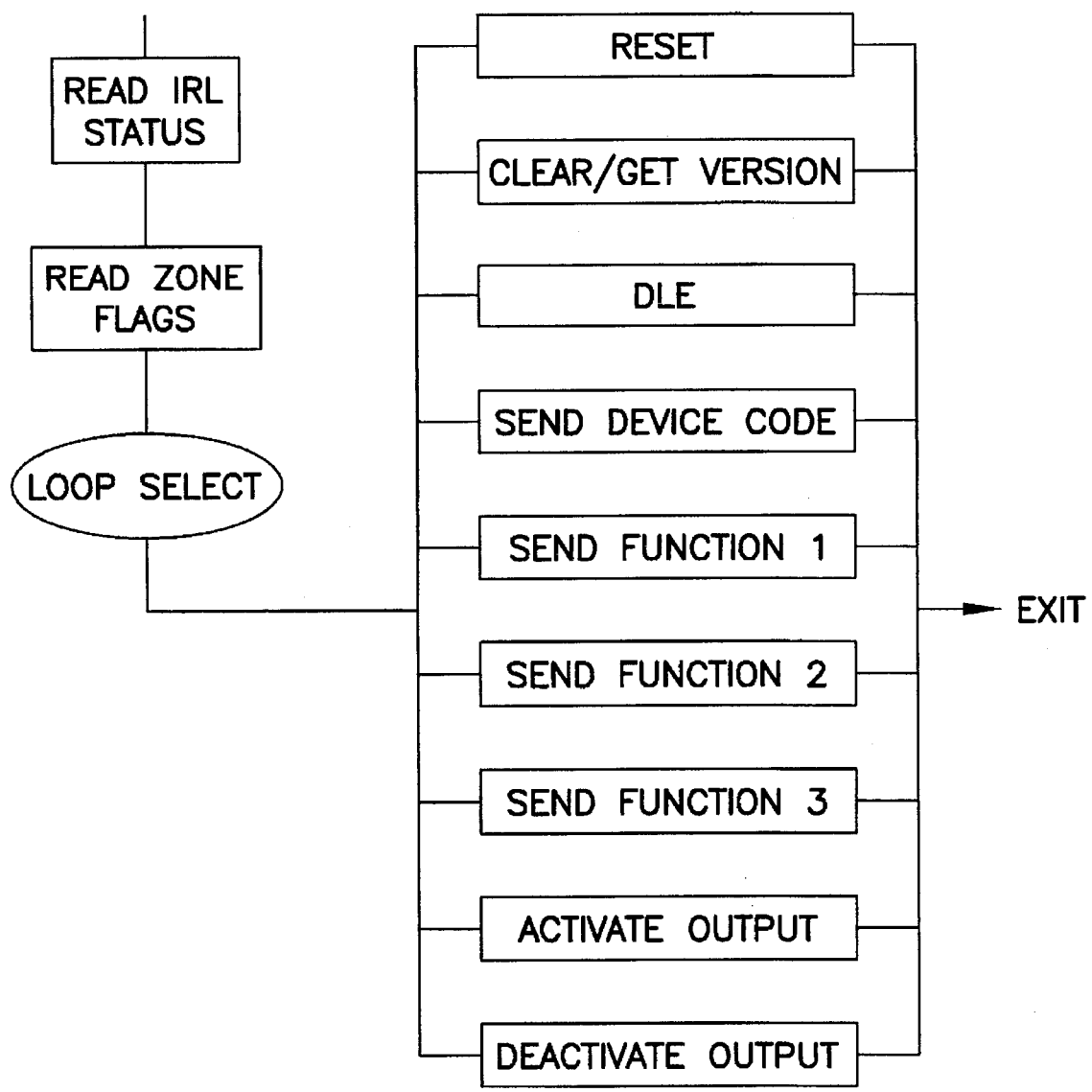
Figure 40:
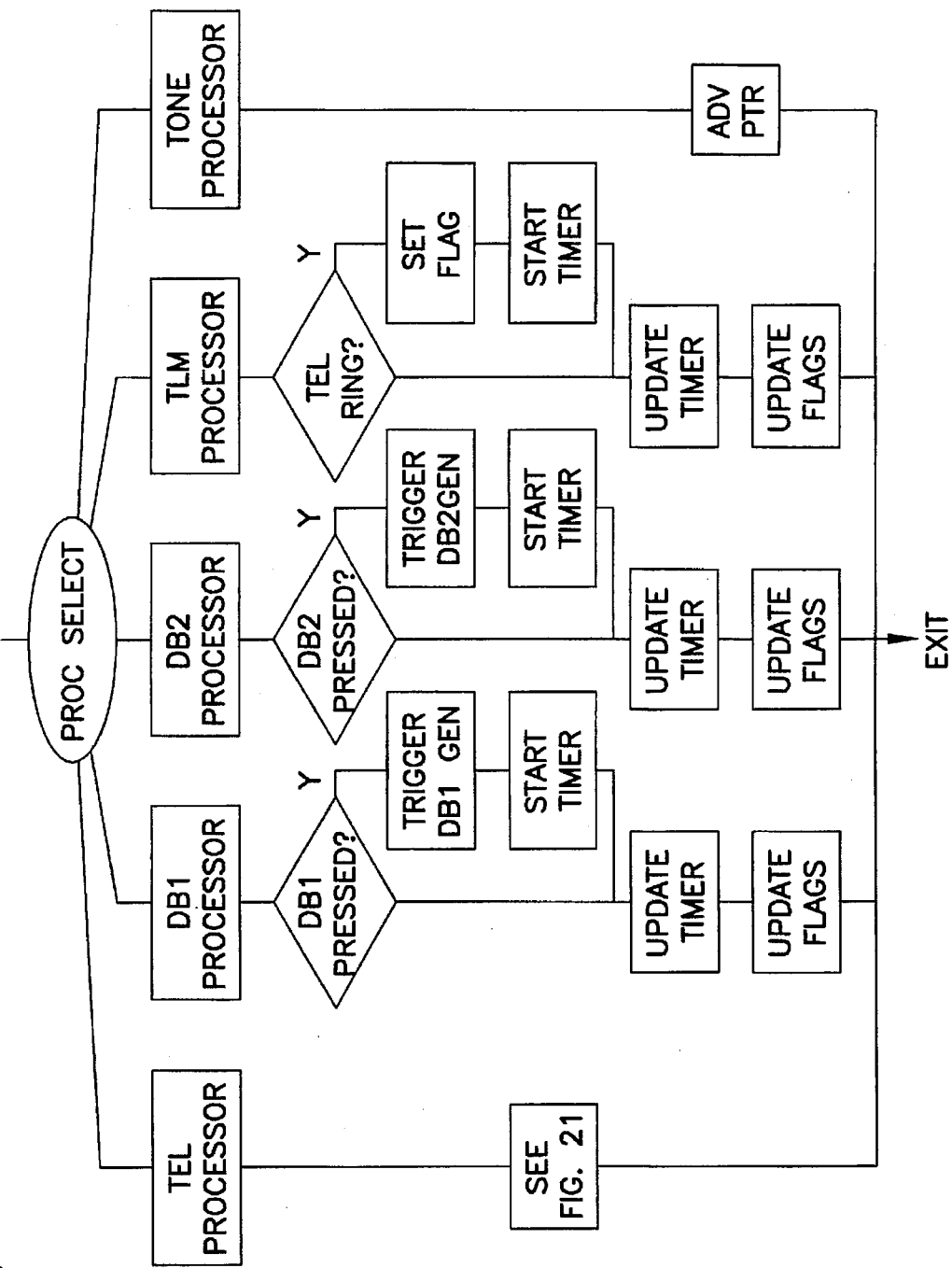

FIGS. 35–40 similarly illustrate the interrupt service routines which force the CPU to temporarily exit the routines in response to a second timer "B". As with FIG. 31, the CPU continues to regularly process the SBX bus at the beginning of each entry into the second timer interruption routine, as depicted in FIG. 36. FIG. 37 illustrates the audio processing steps for the zone modules. FIGS. 38 and 39 respectively illustrate the processing for the front panel keyboard and for the infrared controls. FIG. 40 illustrates the processing for the two doorbells (db1 and db2) and for telephone signalling (referring to FIG. 21).

Accordingly, the inventive EDN system provides extremely flexible, expandable architecture for audio and telephone distribution and control. The system works with homeowner's existing electronic equipment, it accesses and controls any source from any room, it monitors different sources from different locations with the possibility of all zones or any combination playing at the same time, and its flexibility permits virtually any configuration.

A user in any zone may listen to and control any source and may independently control the volume, bass, and treble for that zone. The system provides doorbell-over-page, page-over-telephone mute, telephone mute-over-music priority for each zone, independent of the volume control setting. Moreover, due of its the programming capabilities, any of the audio functions can be turned in any or several zones by programming the MCU not to transmit to the zone(s). For example, "Do Not Disturb" is a selectable feature from the In-Wall Keypad or Hand Held Remote Control which allows uninterrupted music in the zone; that is, it disables page, doorbell, and telephone music mute functions in the zone.

The system provides a transparent channel from the In-Wall Keypad to the source emitter for IR control of individual source components. This offers the capability to choose which source equipment is to be controlled even if it has the same IR code as another piece of source equipment; that is, two sources of the same model. The system has a telephone interface card that adds increased functionality and integration to the home's telephone and communication system via standard tone telephones. For further information concerning the features and benefits that may be provided by the illustrated embodiments, reference may be made to Series HD Product Data Sheets, attached hereto as Appendix B.

Those skilled in the art will readily recognize that various modifications and changes may be made to the present invention without departing from the true spirit and scope thereof, which is set forth in the following claims.

What is claimed is:

1. An electronically controlled audio distribution system for use in a facility, the system having designated audio zones, including a first zone and a second zone, with each zone representing a separate and distinct facility area in which signals are broadcasted, comprising:

a plurality of signal generating devices including a first signal generating device including a music generator, located at a first facility location and a second signal generating device including a doorbell generator, located at a second facility location that is distally removed from the first facility location, each said signal generating device generating a signal for audio broadcast independently of the other signal generating devices;

a plurality of user-input controllers including a first user-input controller located in the first zone and a second user-input controller located in the second zone, each of the plurality of user input controllers including input circuitry for sending a plurality of command signals to control at least one of the plurality of signal generating devices; and a master controller having a programming circuit with an input for receiving priority-command signals to program the master controller with a routing priority for each of said plurality of signals respectively generated by said signal generating devices, and including a signal routing circuit, responsive to the programming circuit, for routing a selected one of said plurality of signals respectively by said signal generating devices with a highest priority in response to two or more of the signals being simultaneously presented for broadcast to the same zone and in accordance with the routing priority programmed in the master controller, the master controller thereby routing signals for broadcast in the designated audio zones and permitting at least one of the plurality of signal generating devices to be controlled from various facility areas via the plurality of user-input controllers.

2. An electrically controlled audio distribution system, according to claim 1, wherein at least one of the user-input controllers includes input circuitry, responsive to manual interaction by a user, for disabling at least a selected one of the plurality of signals respectively generated by said signal generating devices from being broadcast in at least one zone.

3. An electronically controlled audio distribution system, for use in a facility, the system having designated audio zones, including a first zone and a second zone, with each zone representing a separate and distinct facility area in which signals are broadcasted, comprising:

a plurality of signal generating devices including a first signal generating device located at a first facility location and a second signal generating device located at a second facility location that is distally removed from the first facility location, each said signal generating device generating a signal for audio broadcast independently of the other signal generating devices;

a plurality of user-input controllers including a first user-input controller located in the first zone and a second user-input controller located in the second zone, each of the plurality of user input controllers including input circuitry for sending a plurality of command signals to control at least one of the plurality of signal generating devices; and a master controller having a programming circuit with an input for receiving priority-command signals to program the master controller with a routing priority for each of said plurality of signals respectively generated by said signal generating devices, and including a signal routing circuit, responsive to the programming circuit, for routing a selected one of said plurality of signals respectively by said signal generating devices with a highest priority in response to two or more of the signals being simultaneously presented for broadcast to the same zone and in accordance with the routing priority programmed in the master controller, the master controller thereby routing signals for broadcast in the designated audio zones and permitting at least one of the plurality of signal generating devices to be controlled from various facility areas via the plurality of user-input controllers;

wherein said plurality of signal generating devices includes a music generator, a doorbell generator, and a page generator.

4. An electronically controlled audio distribution system, according to claim 3, wherein the first signal generating device includes at least one of the following: a music generator, a doorbell generator, and a page generator.

5. An electronically controlled audio distribution system, according to claim 3, wherein the second signal generating device includes at least one of the following: a music generator, a doorbell generator, and a page generator.

6. An electrically controlled audio distribution system, according to claim 3, wherein each of the user-input controllers includes input circuitry, responsive to manual interaction by a user, for disabling at least one of the signals generated by the doorbell and page generators from being broadcasted in at least one zone, so that the signal generated by the music generator is broadcasted without interruption.

7. An electronically controlled audio distribution system, according to claim 6, wherein the input circuitry for disabling are part of a common input circuit.

8. An electronically controlled audio distribution system for use in a facility, the system having designated audio zones, including a first zone and a second zone, with each zone representing a separate and distinct facility area in which audio signals are broadcasted, comprising:

a plurality of signal generating devices, including first signal generating device located at a first facility location and a second signal generating device located at a second facility location that is distally removed form the first facility location, each said signal generating device generating a signal for audio broadcast independently of the other signal generating devices;

a plurality of in-wall keypads, each in-wall keypad located in a separate and distinct zone and including input circuitry for sending a plurality of user-generated command signals to control at least one of the signal generating devices and including a remote-signal input circuit for receiving remotely generated command signals to control at least one of the signal generating devices;

a hand-held controller for sending the remotely generated command signals;

a master controller having a programming circuit with an input for receiving priority-command signals to program the master controller with a routing priority for each of said first and second signals respectively generated by said signal generating devices, and including a signal routing circuit, responsive to the programming circuit, for routing a selected one of said first and second signals with a highest priority in response to said first and second signals being simultaneously presented for broadcast to the same zone and in accordance with the routing priority programmed in the master controller, the master controller thereby routing signals for broadcast in the designated audio zones and permitting at least one of the plurality of signal generating devices to be controlled from various facility areas via the in-wall keypads and the hand-held remote controller;

a programming device, communicatively coupled to the programming circuit of the master control unit, including input means for altering the programmed routing priority; and the plurality of signal generating devices including at least three of the following: a door bell signal generator generating a door bell signal, a telephone generating an audio signal, a pager generating a pager signal, and a music source generating music.

9. An electronically controlled audio distribution system, according to claim 8, wherein the first signal generating device includes at least one of the following: a music generator, a doorbell generator, and a page generator.

10. An electronically controlled audio distribution system, according to claim 8, wherein the second signal generating device includes at least one of the following: a music generator, a doorbell generator, and a page generator.

11. An electronically controlled audio distribution system, according to claim 8, wherein the programmed routing priority is arranged with the following priority from highest priority to lowest priority: door bell signal over paging signal, paging signal over telephone audio signal, telephone audio signal over music.

12. An electronically controlled audio distribution system for use in a facility, the system having designated audio zones, including a first zone and a second zone, with each zone representing a separate and distinct facility area in which signals are broadcasted, comprising:

a plurality of signal generating devices including a first signal generating device including a music generator, located at a first facility location and a second signal generating device including a doorbell generator, located at a second facility location that is distally removed from the first facility location, each said signal generating device generating a signal for audio broadcast independently of the other signal generating devices;

a plurality of user-input controllers including a first user-input controller located in the first zone and a second user-input controller located in the second zone, each of the plurality of user input controllers including input circuitry for sending a plurality of command signals to control at least one of the plurality of signal generating devices; and a circuit controller having a programming circuit with an input configured and arranged to receive priority-command signals to program the circuit controller with a routing priority for each of said plurality of signals respectively generated by said signal generating devices, and including a signal routing circuit, configured and arranged to respond to the programming circuit, by routing a selected one of said plurality of signals respectively by said signal generating devices with a highest priority in response to two or more of the signals being simultaneously presented for broadcast to the same zone and in accordance with the routing priority programmed in the master controller.

* * * * *

UNITED STATES PATENT AND TRADEMARK OFFICE
CERTIFICATE OF CORRECTION

PATENT NO. : 5,666,428

DATED : September 9, 1997

INVENTOR(S) : Farinelli et al.

It is certified that error appears in the above-identified patent and that said Letters Patent is hereby corrected as shown below:

In column 12, line 33: "N.H." should read --NH--.

In column 15, line 61: "requiting" should read --requiring--.

In column 19, line 20: "CRAM)" should read --(RAM)--.

In column 19, line 66: "them" should read --there--.

In column 27, line 61: "CPLI" should read --CPU--.

In column 30, line 17, claim 2: "electrically" should read --electronically--.

In column 31, line 3, claim 6: "elect ally" should read --electronically--.

Signed and Sealed this

Fifth Day of May, 1998

Attest:

Attesting Officer

BRUCE LEHMAN

Commissioner of Patents and Trademarks